US007634756B2

(12) United States Patent
Bjornson et al.

(10) Patent No.: US 7,634,756 B2
(45) Date of Patent: Dec. 15, 2009

(54) METHOD AND APPARATUS FOR DATAFLOW CREATION AND EXECUTION

(76) Inventors: Robert Dean Bjornson, 159 Bradley St., New Haven, CT (US) 06511; James Patrick McCusker, III, 3 Burlwood Dr., Burlington, CT (US) 06013; James Edwin Wing, 265 College St., #3D, New Haven, CT (US) 06510-2421; Andrew H. Sherman, 4 E. Hill Rd., Woodbury, CT (US) 06798; Stephen B. Weston, 89 Carleton St., Hamden, CT (US) 06517

( * ) Notice: Subject to any disclaimer, the term of this patent is extended or adjusted under 35 U.S.C. 154(b) by 835 days.

(21) Appl. No.: 10/994,871

(22) Filed: Nov. 22, 2004

(65) Prior Publication Data
US 2005/0160398 A1    Jul. 21, 2005

Related U.S. Application Data

(60) Provisional application No. 60/523,570, filed on Nov. 20, 2003.

(51) Int. Cl.
*G06F 9/45* (2006.01)
(52) U.S. Cl. ........................................ 717/107
(58) Field of Classification Search ............ 717/107
See application file for complete search history.

(56) References Cited

U.S. PATENT DOCUMENTS

| 5,555,201 A | 9/1996 | Dangelo et al. |
| 5,625,823 A | 4/1997 | Debenedictis et al. |
| 5,701,256 A | 12/1997 | Marr et al. |
| 5,828,894 A | 10/1998 | Wilkinson et al. |
| 5,873,052 A | 2/1999 | Sharaf |
| 5,884,303 A | 3/1999 | Brown |
| 5,999,729 A | 12/1999 | Tabloski et al. |

(Continued)

OTHER PUBLICATIONS

Harvey et al. The Effectiveness of Task-Level Parallelism for High-Level Vision, ACM 1990, pp. 156-167 http://portal.acm.org/citation.cfm?id=99163.99181.

(Continued)

*Primary Examiner*—John Chavis
(74) *Attorney, Agent, or Firm*—Stolowitz Ford Cowger LLP

(57) ABSTRACT

A method for creating and executing a computer workflow using a graphical user interface. A plurality of executable components is defined wherein the executable components are based on an input, an output, metadata and a sub-interpreter. Each of the executable components represents a computer-implemented computational process that is performed on one or more inputs to the executable component and that generates one or more outputs based on a predefined computational algorithm. A graphical user interface is defined that allows a user to visually create the computer workflow on a user display by selecting from a library of said executable components. The user graphically connects one or more input terminals of selected executable components with one or more output terminals of second selected executable components. For each selected executable component, the one or more input terminals graphically correspond to the one or more inputs to the predefined computational algorithm associated with the executable component. The one or more output terminals graphically correspond to the one or more outputs generated by the predefined computational algorithm associated with the executable component.

17 Claims, 43 Drawing Sheets

U.S. PATENT DOCUMENTS

| | | | |
|---|---|---|---|
| 6,009,422 | A | 12/1999 | Ciccarelli |
| 6,088,044 | A | 7/2000 | Kwok et al. |
| 6,112,225 | A | 8/2000 | Kraft et al. |
| 6,289,334 | B1 | 9/2001 | Reiner et al. |
| 6,523,030 | B1 | 2/2003 | Horowitz |
| 6,691,109 | B2 | 2/2004 | Bjornson et al. |
| 6,850,925 | B2 | 2/2005 | Chaudhuri et al. |
| 6,985,898 | B1 | 1/2006 | Ripley et al. |
| 7,017,147 | B2 * | 3/2006 | Hayase et al. ............... 717/108 |
| 7,137,116 | B2 | 11/2006 | Parkes et al. |
| 7,184,967 | B1 * | 2/2007 | Mital et al. .................... 705/8 |
| 7,231,390 | B2 | 6/2007 | Blair |
| 7,240,328 | B2 | 7/2007 | Beckett et al. |
| 7,333,980 | B2 | 2/2008 | Bjornson et al. |
| 2001/0053957 | A1 | 12/2001 | Blair et al. |
| 2002/0199034 | A1 | 12/2002 | Beckett et al. |
| 2003/0055813 | A1 | 3/2003 | Chaudhuri et al. |
| 2005/0066304 | A1 * | 3/2005 | Tattrie et al. ................ 717/101 |

OTHER PUBLICATIONS

Camp, "High-Throughput BLAST," Silicon Graphics, Inc., 15 pp (Sep. 1998).

BTG Product Overview, 4 pp.

Scientific Computing Associates Inc., Paradise Product Overview, 2 pp (1995).

Paradise: User's Guide and Reference Manual, Veresion 6.2, Scientific Computing Associates (Apr. 2000).

"SGI Bioinformatics Performance Report," Silicon Graphics, Inc., 10 pp (Summer 2000).

Davidson et al., "Facilitating Transformations in a Human Genome Project Database," ACM, p. 423 (1994).

Yona et al., "A Unified Sequence-Structure Classification of Protein Sequences: Combining Sequence and Structure in a Map of the Protein Space", RECOM, p. 308 (2000).

Chakravarthy, "Divide and Conquer: A Basis for Augmenting a Conventional Query Optimizer with Multiple Query Processing Capabilities," IEEE, p. 482 (1991).

Jiang et al., "Dynamic Parallel Query Processing for Distributed Objects," 9th International Workgroup on Database and Expert System Applications Proceedings, p. 699 (Aug. 1998).

Salazar et al., "On An Efficient Parallelization of Exhaustive Sequence Comparison Algorithms on Message Passing Architectures," Oxford University Press, vol. 10, No. 5, p. 509 (1994).

Yap et al., "Parallel Computation in Biological Sequence Analysis," IEEE Transactions on Parallel and Distributed Systems, vol. 9, No. 3, p. 283 (Mar. 1998).

Gao et al., Multithreaded Implementation of a Biomolecular Sequence Alignment Algorithm-Software/Information Technology, IEEE, p. 494, (2000).

Wang et al., "Parallel R-Tree Search Algorithm or DSVM," Proceedings of 6th International Conference on Database System for Advanced Applications, p. 19 (Apr. 1999).

Kosky et al. "Facilitating transformations in a human genome project database", ACM 1994, pp. 423-432.

* cited by examiner

METHOD AND APPARATUS FOR DATAFLOW CREATION AND EXECUTION

REFERENCE TO RELATED APPLICATIONS

This application claims the benefit of U.S. Provisional Application No. 60/523,570 filed on Nov. 20, 2003, entitled "Method and Apparatus for Dataflow Creation and Execution" and U.S. patent application Ser. No. 10/610,133 entitled "Method and Apparatus for Dataflow Creation and Execution" filed Jun. 30, 2003.

FIELD OF THE INVENTION

The invention relates to methods and systems for creating and executing a computer dataflow using a graphical user interface.

BACKGROUND OF THE INVENTION

In many industries, information technology platforms for technical computing have become key differentiators and drivers of business growth. For companies in these industries—including the biotechnology, pharmaceutical, geophysical, automotive, and aerospace industries, among others—a new class of business-critical technical computing problems has arisen. These problems are complex, with solutions often involving multiple computational steps with large quantities of data passing from one step to the next. In addition, the individual computational steps themselves are often computer intensive and very time consuming.

The life science industry offers some of the best examples of this new class of applications. In pharmaceutical R&D, for example, users often query dozens of different databases using a variety of search and analysis tools, moving data from one analysis to the next in "pipelined" dataflows. These dataflows, which are both computationally intensive and logistically complex, are essential parts of the R&D process, because without them, it would be impossible to adequately investigate the large amount of data coming out of modern, highly automated laboratories.

Pipelined dataflows are also becoming part of the computing infrastructure that supports clinical medicine. Major medical centers are beginning to use complex heterogeneous databases and applications for analyzing clinical, genetic, and demographic information to make final treatment decisions. Such infrastructure is becoming a differentiator for major medical institutions.

The new class of technical computing problems described above pose a number of substantial computational challenges. First, they require huge amounts of CPU horsepower and other computational resources. For a number of years, the platforms of choice for large computations have been clusters or local-area networks of small-to-moderate-size commodity machines. Such clusters have rapidly replaced traditional large multiprocessing supercomputers for most high performance computing tasks, due largely to the substantial cost-performance advantages they offer. However, individual clusters are insufficient to meet the voracious demands of complex technical computing dataflows. This has led to a new type of high-performance computing platform based on the concept of a "computing grid" (analogous to a utility grid) made up of multiple interconnected clusters. Computing grids have a wealth of resources—CPUs, storage, communication, etc.—that may be applied to technical computations, but management of such diverse collections of resources is difficult, and effective software solutions are only now beginning to appear.

A second major challenge arises because solutions to the new class of problems must access and integrate massive amounts of data from large numbers of distinct sources. Algorithms for technical computation traditionally assume that all required data is stored locally and that the costs of data access are almost always dominated by the costs of computation. For many problems of the type considered here, however, the data may reside at numerous sites and may be stored in very diverse formats. For such problems, the costs of accessing the data and integrating it into the computational process may easily outstrip the costs of the computations themselves. This challenge is motivating the development of new data management tools capable of efficiently accessing and integrating such widely distributed data.

Finally, a third major challenge relates to the way that users manage the execution of the kind of large, complex dataflows required to solve mission-critical technical computing problems. These dataflows typically include a number of computer-intensive steps, and it is usually necessary to perform complex transformations as data is transferred between steps. Traditionally, running such dataflows has required substantial amounts of time and effort from a skilled user capable of starting and monitoring each computational step, dealing with potential processing errors, transforming the data between steps, and moving data among the different computers where computations may take place. Such a manual process is a significant impediment to the effective use of complex dataflows, since it wastes valuable time of skilled users and its tedium increases the likelihood of errors. The need to overcome such operational hurdles is driving the development of application management tools to automate and accelerate dataflow processing.

Application integration/interoperability or acceleration are essential requirements to solve this new class of technical computing problems. Application accelerators and dataflow systems are the two main tools used to address these requirements. Application accelerators are designed to improve the performance of individual, stand-alone applications. Most accelerators have evolved from a number of tools such as MPI, PVM, or Linda that were created originally to accelerate applications using special parallel programming techniques designed to exploit static sets of "worker" machines. Today, the most common application accelerators are more flexible, allowing them to exploit a set of widely distributed workers that may evolve dynamically throughout the course of a computation. However, particularly among the so-called "peer-to-peer" application accelerators touted for use on computing grids, there are often substantial tradeoffs for this flexibility that may make the accelerators unsuitable for large classes of applications. The tradeoffs include such things as limitations on file transfers to or from the worker machines, restricted or prohibited communications among the workers, constraints on the specific combinations of hardware, operating systems, and programming languages that are permitted; and restrictions or inefficiency due to security, encryption, or other requirements. In addition, in many cases, the use of application accelerators by end users may be severely limited by the fact that most of the accelerators require modification of application source code in order to deal with the transfer of data to and from the workers.

Dataflow systems take an entirely different approach to acceleration, focusing not on individual applications, but on complex pipelines of applications called dataflows that may be thought of visually as flowcharts (including logic and loops), where the flowchart boxes correspond to specific applications or data accesses. Such dataflows are common in many industries, and they are ubiquitous in the life sciences.

Almost all members of the new class of mission-critical technical computing problems are, in fact, solved by dataflows, not individual applications, since the solutions require accessing data from numerous sources, applying multiple types of analysis, and making significant logistic decisions during the computational process. The key issues in dataflow systems are application integration/interoperability (including data conversion and data flow among the applications in the dataflows) and performance improvement by means of sophisticated application-specific scheduling. The best dataflow systems are able to address these issues without access to the source code of individual applications used in the dataflows; this broadens the applicability of such systems substantially as compared with the application accelerators discussed above.

Traditionally, users have applied dataflow via two approaches. The simpler one is completely manual; a user starts up the program for each step by hand, and reformats and transfers the data between steps either by hand or by using simple scripts or programs. The only real advantage of the manual method is that it is relatively easy to use and can cater to a wide variety of situations. For example, one step may require visiting a web site, filling out a form, clicking a button or two on the screen, and cutting/pasting data from the output screen into a file or the input screen for the next step. Another step may require logging into a remote machine, transferring some files, running a command-line program on the remote machine, and then transferring the result files back to the user's machine. None of this is automated, but at least the procedures are straightforward enough so that most users can perform them.

The manual approach has many drawbacks, of course. Dataflow execution is very time-consuming and error-prone, and the user must pay constant attention to ensure correct results. The traditional alternative has been to implement "automated" dataflows by writing complex scripts using a standard scripting language. Once the script is written, a user can execute the dataflow from a command line by running the script and providing whatever specific parameters and files may be required. Shell scripting languages in various operating systems are widely used for dataflow development. The Perl scripting language is a common choice for OS-independent scripts, but there are a number of others such as Python, Jython, and even Java that are more modern and may well be better choices depending on the types of data manipulations required between the computer-intensive steps of the dataflow.

Regardless of the choice of scripting language, however, script creation is effectively the same as programming. The developer uses an editor to create a dataflow script that invokes each of the computer-intensive steps as independent programs. The invocations often take place on the machine where the script executes (leading to a sequential computation), but scripting languages may make it possible (though not necessarily easy) to invoke the programs on remote machines. In between these program invocations, the developer inserts whatever code is required to handle errors that might arise, perform the data manipulations required to convert the data from the output format of one step to the input format of the next, and move data around among multiple machines (if different steps run on different machines). The data operations themselves may be coded in the scripting language, or they may be implemented by invoking a separate program to filter the data in some way, but they are rarely designed to be reused in other dataflows. Correct dataflow operation is entirely the responsibility of the developer, and it is unusual to encounter dataflow scripts that operate correctly in more than a few environments that happened to be important to the developer when the dataflow was created.

SUMMARY OF THE INVENTION

The present invention provides for a method for creating and executing a computer workflow using a graphical user interface. A plurality of executable components is defined wherein the executable components are based on an input, an output, metadata and a sub-interpreter. Each of the executable components represents a computer-implemented computational process that is performed on one or more inputs to the executable component and that generates one or more outputs based on a predefined computational algorithm. A graphical user interface is defined that allows a user to visually create the computer workflow on a user display by selecting from a library of said executable components. The user graphically connects one or more input terminals of selected executable components with one or more output terminals of second selected executable components. For each selected executable component, the one or more input terminals graphically correspond to the one or more inputs to the predefined computational algorithm associated with the executable component. The one or more output terminals graphically correspond to the one or more outputs generated by the predefined computational algorithm associated with the executable component. At least one selected executable component comprises a splitter component having one or more splitter input terminals that graphically correspond to a splitter input to a splitter algorithm associated with the one splitter component. Each splitter input terminal receives its splitter input at a single splitter input time. Each splitter component has one or more splitter output terminals that graphically correspond to a splitter output generated by the splitter algorithm associated with the splitter component. The splitter output terminals produce splitter output at a plurality of splitter output times. The splitter output comprises a plurality of consistent splitter output sets, wherein each splitter output terminal produces a splitter output. The splitter algorithm associated with the splitter component generates the consistent splitter output sets in a specific order by operating on the splitter input. Each consistent splitter output set flows separately downstream to one or more other selected executable components. For each of the splitter components, there is at least one joiner component associated with the splitter component having one or more joiner input terminals that graphically correspond to a joiner input to a joiner algorithm associated with the joiner component. Each joiner input terminal receives joiner input at a plurality of joiner input times. The joiner component has one or more joiner output terminals that graphically correspond to a joiner output generated by the joiner algorithm associated with the joiner component. The joiner input comprises a plurality of consistent joiner input sets, wherein each joiner input terminal receives a joiner input. For each of the consistent splitter output sets generated by the splitter algorithm associated with the associated splitter component, exactly one corresponding consistent joiner input set arrives at the joiner input terminals of the joiner component. The joiner algorithm associated with the joiner component produces joiner outputs at its joiner output terminals upon completed execution of said joiner algorithm, each joiner output terminal producing a joiner output at a single joiner output time. The joiner algorithm associated with the joiner component may begin execution when the consistent joiner input set corresponding to the first generated consistent splitter output set arrives in-order, when all the consistent joiner input sets arrive or when a consistent joiner input set arrives in any-order.

The present invention provides for a method for creating and executing a computer workflow using a graphical user interface. A plurality of executable components is defined wherein the executable components are based on an input, an output, metadata and a sub-interpreter. Each of the executable components represents a computer-implemented computational process that is performed on one or more inputs to the executable component and that generates one or more outputs based on a predefined computational algorithm. A graphical user interface is defined that allows a user to visually create the computer workflow on a user display by selecting from a library of said executable components. The user graphically connects one or more input terminals of selected executable components with one or more output terminals of second selected executable components. For each selected executable component, the one or more input terminals graphically correspond to the one or more inputs to the predefined computational algorithm associated with the executable component. The one or more output terminals graphically correspond to the one or more outputs generated by the predefined computational algorithm associated with the executable component. For at least one selected executable component, the graphical user interface allows the user to designate each of the one or more input terminals as an input terminal selected from the group consisting of a required input terminal and an optional input terminal. For each selected executable component, the inputs received on each of the one or more input terminals comprise an input selected from the group consisting of valid data for the associated predefined computational algorithm and a special NoValue marker. For each selected executable component, the associated predefined computational algorithm is executed when the selected executable component has received inputs on all of its input terminals, provided that no input received on a required input terminal comprises the NoValue marker. For each selected executable component, one output is delivered to each output terminal upon completing the execution of the associated predefined computational algorithm, each of said outputs comprising exactly one output selected from the group consisting of valid data and NoValue markers. If the selected executable component receives a NoValue marker on one or more of the required input terminals, the selected executable component delivers one NoValue marker to each output terminal and performs no other action.

The present invention provides for a method for creating and executing a computer workflow using a graphical user interface. A plurality of executable components is defined wherein the executable components are based on an input, an output, metadata and a sub-interpreter. Each of the executable components represents a computer-implemented computational process that is performed on one or more inputs to the executable component and that generates one or more outputs based on a predefined computational algorithm. A graphical user interface is defined that allows a user to visually create the computer workflow on a user display by selecting from a library of said executable components. The user graphically connects one or more input terminals of selected executable components with one or more output terminals of second selected executable components. For each selected executable component, the one or more input terminals graphically correspond to the one or more inputs to the predefined computational algorithm associated with the executable component. The one or more output terminals graphically correspond to the one or more outputs generated by the predefined computational algorithm associated with the executable component. A graphical user interface is also provided that allows a user to visually create a metaworkflow on a user display by editing a metworkflow template. The metaworkflow has a metaworkflow input, a metaworkflow output, a set of metaworkflow input terminals, and a set of metaworkflow output terminals. The metaworkflow consists of a metaworkflow associated executable expression and two metaworkflow associated executable subworkflows, consisting of a first metaworkflow associated executable subworkflow and a second metaworkflow associated executable subworkflow. Each of the two metaworkflow associated executable subworkflows has a set of corresponding metaworkflow associated input terminals that is identical to the set of metaworkflow input terminals. Each of the two metaworkflow associated executable subworkflows has a set of corresponding metaworkflow associated output terminals that is identical to the set of metaworkflow output terminals. Each of the metaworkflow input terminals is graphically connected to the corresponding metaworkflow associated input terminals of each of the two metaworkflow associated executable subworkflows. Each of the metaworkflow output terminals is graphically connected to each of the metaworkflow associated output terminals of the two metaworkflow associated executable subworkflows. Each of the two metaworkflow associated executable subworkflows delivers one output to each of the metaworkflow output terminals. The metaworkflow associated executable expression comprises a computer-implemented computational process performed on the metaworkflow input that computes a single value comprising a distinguishable value by executing a predefined associated computational algorithm. If the metaworkflow associated executable expression computes the distinguishable value, then the first metaworkflow associated executable subworkflow is executed. If the metaworkflow associated executable expression does not compute the distinguishable value, then the second metaworkflow associated executable subworkflow is executed.

The present invention provides for a method for creating and executing a computer workflow using a graphical user interface. A plurality of executable components is defined wherein the executable components are based on an input, an output, metadata and a sub-interpreter. Each of the executable components represents a computer-implemented computational process that is performed on one or more inputs to the executable component and that generates one or more outputs based on a predefined computational algorithm. A graphical user interface is defined that allows a user to visually create the computer workflow on a user display by selecting from a library of said executable components. The user graphically connects one or more input terminals of selected executable components with one or more output terminals of second selected executable components. For each selected executable component, the one or more input terminals graphically correspond to the one or more inputs to the predefined computational algorithm associated with the executable component. The one or more output terminals graphically correspond to the one or more outputs generated by the predefined computational algorithm associated with the executable component. A graphical user interface is provided that allows a user to visually a metaworkflow on a user display by editing a metworkflow template. The metaworkflow has a metaworkflow input, a metaworkflow output, a set of metaworkflow input terminals, a set of metaworkflow output terminals. The metaworkflow consists of a metaworkflow associated executable expression and two metaworkflow associated executable subworkflows, consisting of a first metaworkflow associated executable subworkflow and a second metaworkflow associated executable subworkflow. Each of the two metaworkflow associated executable subworkflows has a set of corresponding metaworkflow associated input terminals that is identical to the set of metaworkflow input terminals. The first metaworkflow associated executable subworkflow has a set of corresponding metaworkflow associated output terminals that is identical to the set of metaworkflow input terminals. The second metaworkflow associated executable subworkflow has a set of corresponding metaworkflow associated output terminals that is identical to the set of metaworkflow output terminals. The metaworkflow associated executable expression comprises a computer-implemented computational process performed on the metaworkflow input that computes a single value comprising a distinguishable value by executing a predefined associated computational algorithm. If the metaworkflow associated executable expression computes the distinguishable value, then the first metaworkflow associated executable subworkflow is executed and the first metaworkflow associated executable subworkflow delivers no outputs to the metaworkflow output terminals. If the first metaworkflow associated executable subworkflow is executed, the first metaworkflow associated executable subworkflow delivers one output to each of its metaworkflow associated output terminals upon completion of the execution of the first metaworkflow associated executable subworkflow. After the execution of the first metaworkflow associated executable subworkflow, a new copy of the metaworkflow is created. After the new copy of the metaworkflow is created, the outputs delivered to the metaworkflow associated output terminals of the first metaworkflow associated executable subworkflow are delivered to input terminals of the new copy of the metaworkflow. After the outputs are delivered to input terminals of the new copy of the metaworkflow, the execution of the metaworkflow terminates and the new copy of the metaworkflow is executed. If the metaworkflow associated executable expression does not compute the distinguishable value, then the second metaworkflow associated executable subworkflow is executed. If the second metaworkflow associated executable subworkflow is executed, then upon completion of the execution of the second metaworkflow associated executable subworkflow, the second metaworkflow associated executable subworkflow delivers one output to each of the metaworkflow output terminals and the execution of the metaworkflow terminates.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Figure 1:
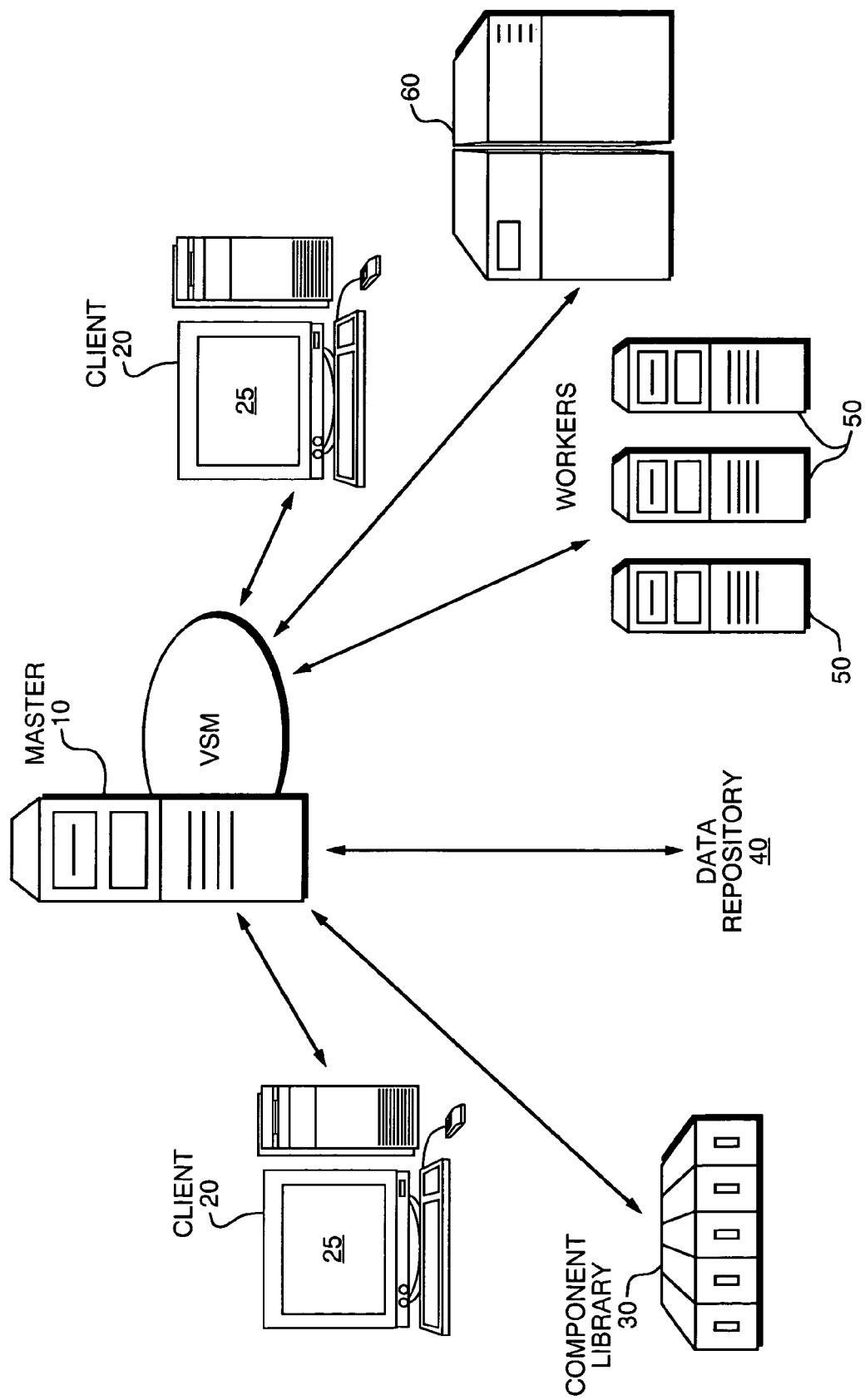
FIG. 1 illustrates a system used in connection with the present invention.

FIG. 1 illustrates system 1 that may be used to carry out the methods of the present invention. System 1 includes master computer 10, user computer(s) 20, graphical user interface (GUI) 25, component library 30, data repository 40, worker computer(s) 50, and virtual shared memory (VSM) 60. The master computer 10 includes a master program which accepts job requests from the user computer(s) 20, posts tasks in VSM 60, and temporarily stores completed task results until the entire job is finished. Worker computer(s) 50 retrieve data and tasks and execute the computational portions of dataflows. The number of worker computer(s) 50 may change at any time and may include a wide range of different types of computers running any standard operating system. GUI 25 runs on each user's desktop machine, enabling users to create and execute components and dataflows. The component library 30 is a shared database that stores information about the programs, components and dataflows in system 1. Multiple copies of components are stored in the component library 30 and these components are downloaded from the component library 30 when the worker computer(s) 50 pick up tasks from a central task list. The data repository 40 is a network storage facility that stores data (or, in some cases, information that makes it possible to find and access data stored elsewhere) and provides a standardized place to find input data or store results. VSM 60 is a shared object repository for controlling the execution of tasks and storing the results.

The components stored in the component library 30 consist of executable programs or scripts, along with some descriptive information (known as metadata). Each component includes four arguments: input and output arguments, metadata and the executable itself. The executable portion of a component typically runs a computational algorithm or retrieves data from a database or other data source. The component's metadata may be written in any parseable form describing the component's inputs and outputs and its data files. It also describes the component's sub-interpreter that should be invoked for the component invocation. It may optionally include information such as the type of object methods for a java component and how to construct a command line for a compiled executable sub-interpreter. Components may be readily shared, modified, debugged, and reused. Tables 1 and 2 illustrate XML for a java Adder component and a command line component that invokes a Perl script, respectively.

TABLE 1

```
version="1.0" encoding="UTF-8"?>
<component
  type=
"com.turbogenomics.turbohub.component.java.JavaComponentType">
    <description>Integer Addition</description>
    <schedulerGroup/>
    <dependencies/>
    <inputs>
        <pin name="i0" javatype="int"/>
        <pin name="i1" javatype="int"/>
    </inputs>
    <outputs>
        <pin name="out" javatype="int"/>
    </outputs>
    <content>
        <java>
            <execMethod>add</execMethod>
            <className>com.turbogenomics.turbohub.components.Adder
            </className>
            <inputMethod name="i0">setIn0</inputMethod>
            <inputMethod name="i1">setI1</inputMethod>
            <outputMethod name="out">getResult</outputMethod>
        </java>
    </content>
</component>
<?xml version="1.0" encoding="UTF-8"?>
```

TABLE 2

```
<component
  type=
"com.turbogenomics.turbohub.component.cli.CliComponentType">
    <description>Hello Perl</description>
    <schedulerGroup/>
    <dependencies/>
    <inputs>
        <pin name="in" javatype="java.lang.String"/>
    </inputs>
    <outputs>
        <pin name="out" javatype="java.lang.String"/>
        <pin name="err" javatype="java.lang.String"/>
    </outputs>
    <content>
        <files>
            <file id="in">
                <contents><inputValue name="in"/></contents>
            </file>
            <file id="_out" copyto="out"/>
            <file id="_err" copyto="err"/>
            <file id="s">
                <contents><resource name="script"/></contents>
                <!--If you want to specify script
                name <child>hello.pl</child>-->
            </file>
        </files>
        <cli>
            <executable>perl</executable>
            <args>
                <arg><filePath ref="s"/></arg>
                <arg><filePath ref="in"/></arg>
            </args>
        </cli>
    </content>
</component>
```

Each component is executed by passing its definition to a generic interpreter. This interpreter determines the type of component, and the appropriate subinterpreter that will actually execute the component. The interpreter creates an instance of the correct subinterpreter and passes execution of the component to that subinterpreter, as illustrated in lines 1-2 of Table 2. The subinterpreter reads the rest of the component definition, which is customized to the needs of this particular type of component. The subinterpreter handles the inputs, creates the execution environment, and actually runs the component. It gathers the outputs, and passes them back to the generic interpreter, which forwards the outputs to their destination. Table 3 illustrates pseudo-code for a component sub-interpreter.

TABLE 3

```
Interpreter(component def) {   read component def,
    determine appropriate subinterpreter
    Interpreter i = create subinterpreter
    i.instantiate(component def)
    outputs = i.invoke(component def, inputs)
    pass outputs to destination}
```

System 1 may include pre-built application components and user created components. The pre-built application components may include components for such common tasks as displaying results in html for viewing in a web browser, or storing various types of computational results to data repository 40. It may also include components used to solve computations in biotechnology, pharmaceutical, geophysical, engineering, chemistry, automotive, aerospace, or finance disciplines. Examples include programs such as FORMATDB, BLASTALL (and other members of the BLAST suite of programs such as BLASTP), CLUSTALW, HMMBUILD, HMMCALIBRATE, HMMSEARCH, FLUENT, PTRAN AND GAUSSIAN.

The user created components are created via GUI 25. During the component creation process, the user defines the component's resources, inputs, outputs and executable files. Using GUI 25, the user may create four types of components: command line components; java components; jython components; and dataflow components. A command line component is a component that wraps a command. It describes the files needed for the proper running of an executable, the environment needed by the executable, and the exact form of the command line required by the executable. It is created after creating the original executable. Any of the parts (files, environment, command line) may be based on constant values, input values, property values, or values from a global map. In addition, the files may include data from resource files that were submitted when the component was sent to the component library 30. A Jython component wraps Jython code with the input and output pins accessed through Jython variables. It consists of a set of python scripts, one of which is the main script, executed as the component. Java components wrap Java classes, invoke methods on that class, and use the get and set methods for the inputs and outputs. A dataflow component includes more than one component whereas a command line component, a java component and a jython component exist independently of a dataflow component.

Figure 2A:
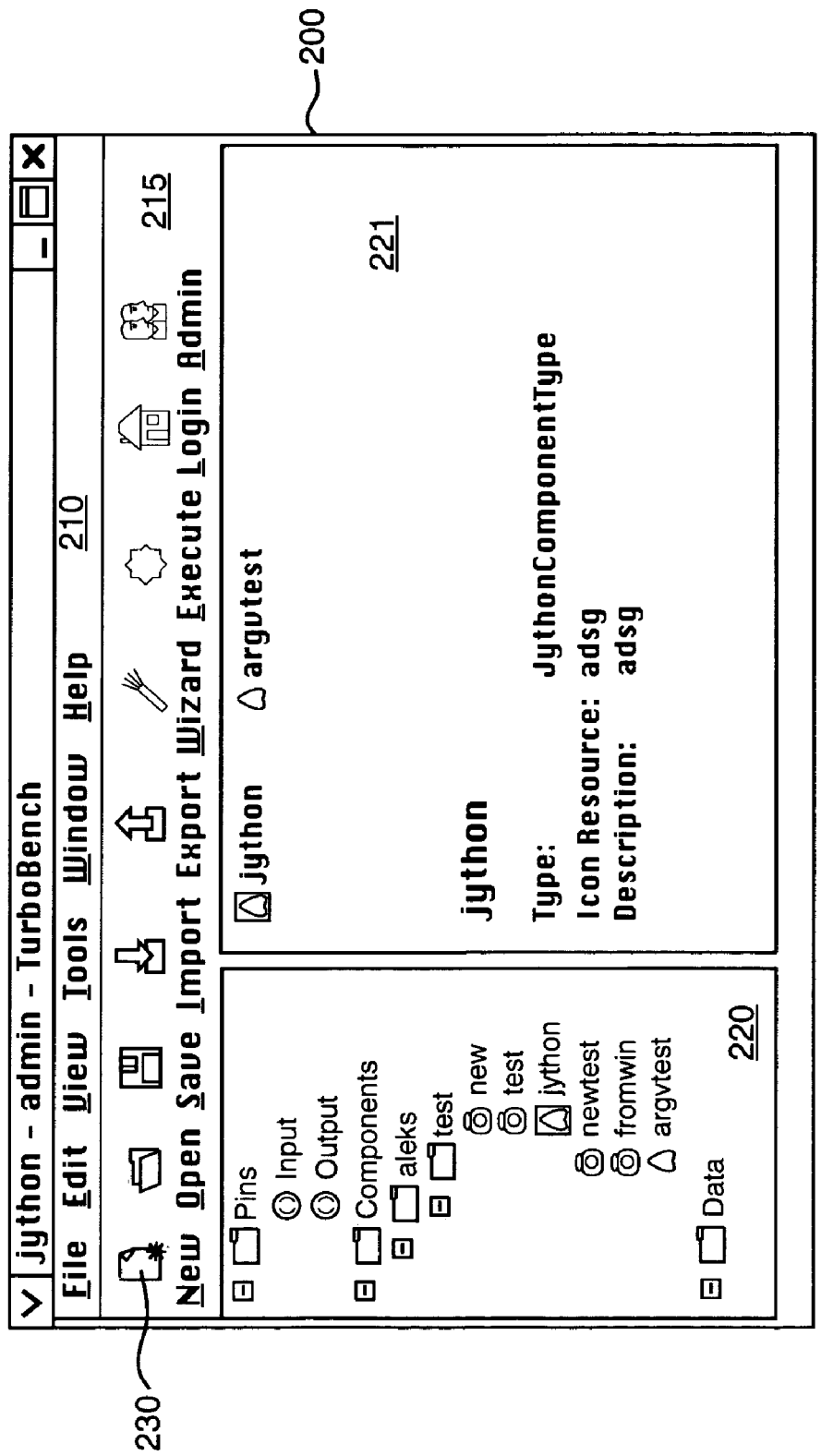
FIGS. 2A through 2M illustrate an exemplary graphical user interface that may be used for creating a command line component in connection with the present invention.
Figure 2B:
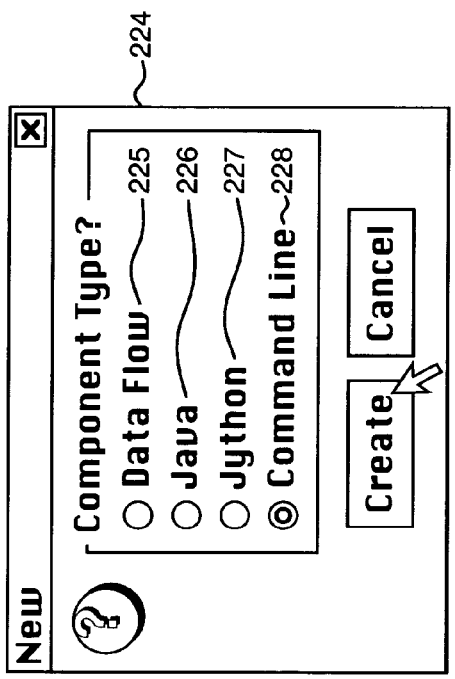
Figure 2C:
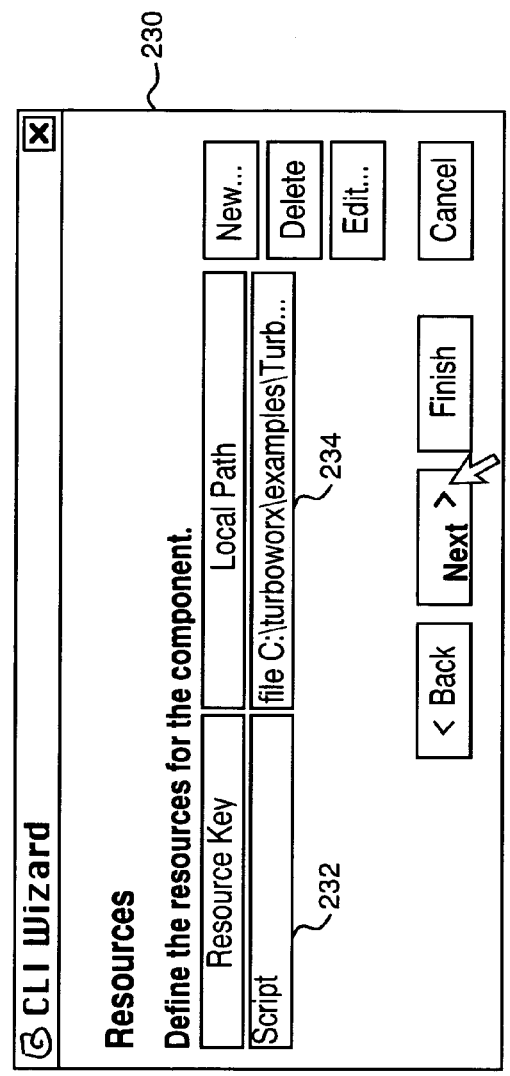
Figure 2D:
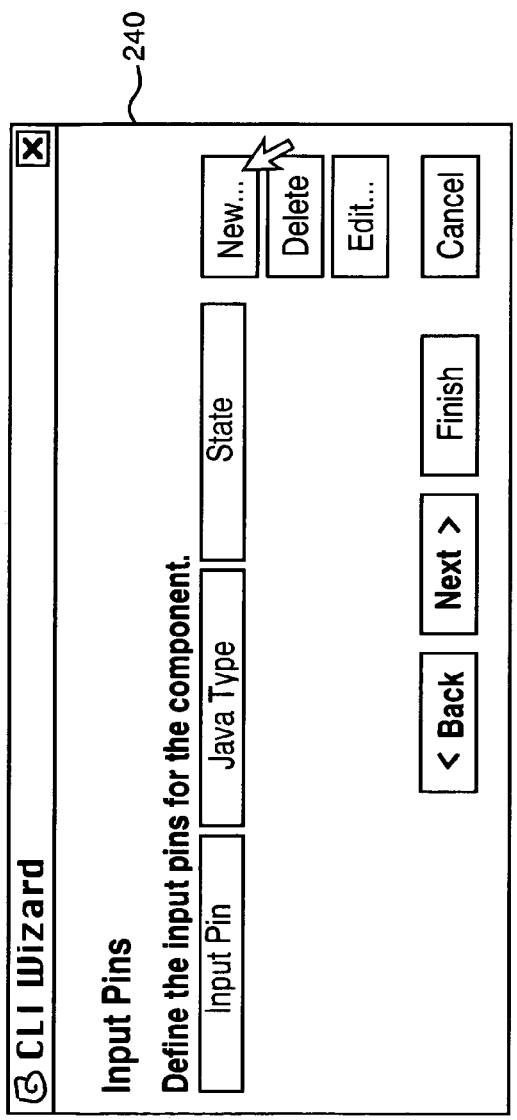
Figure 2E:
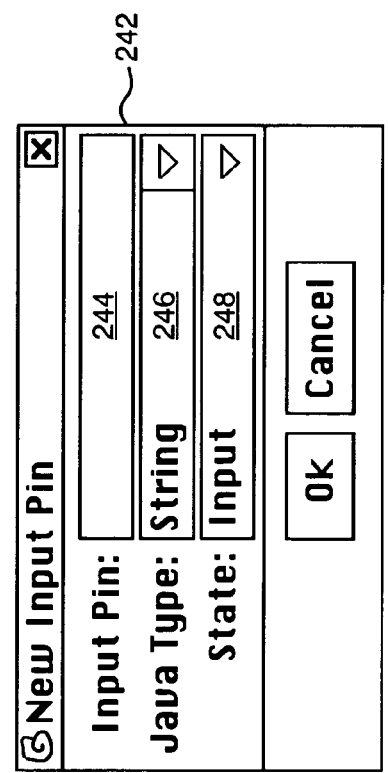
Figure 2F:
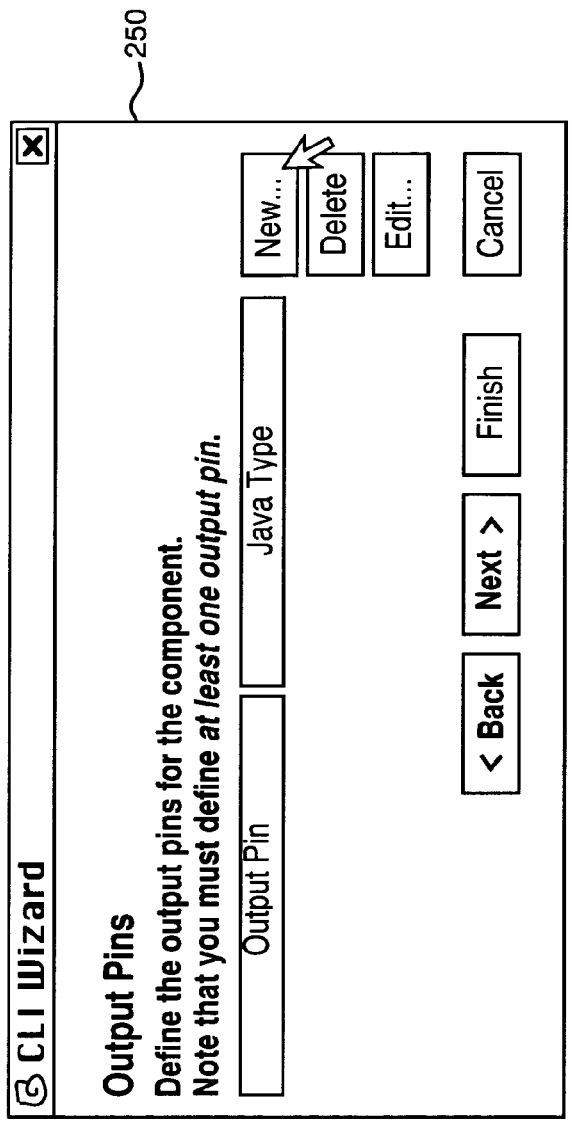
Figure 2G:
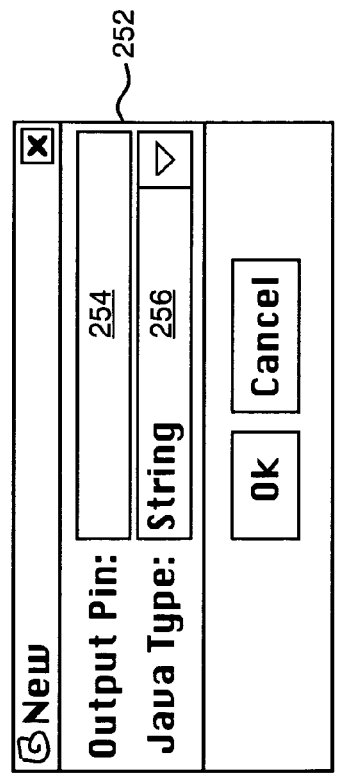

The creation of an exemplary command line component is illustrated in FIGS. 2A-2M. The main screen 200 of GUI 25 contains a button bar 215, a menu bar 210, a left panel 220 and right panel 221. The left panel 220 is used for displaying input and output pins and the library of pre-built and user-created components. Right panel 221 is used to create components and dataflow components. To create a component, the user first clicks the new button 230, on screen 200, to display the component type screen 224, FIG. 2B. After selecting the command line type 228 the user must define the component's resource file name 232 and path 234 as in screen 230, FIG. 2C. Resources are files associated and stored with the component definition. These resources vary depending on the executable or script used to create the component. As shown in FIG. 2D, the user then defines the input pins, using screen 240, which are data retrieved from VMS 60. The data is supplied to VMS 60 by the component, other components, the user, or the data repository 40. The input pin is then assigned a name 244, the java type 246 and state 248 in screen 242, as shown in FIG. 2E. The user then creates an output pin, screen 250, by assigning a name 254 and identifying the java type 256 in screen 252, FIGS. 2F and 2G.

Figure 2H:
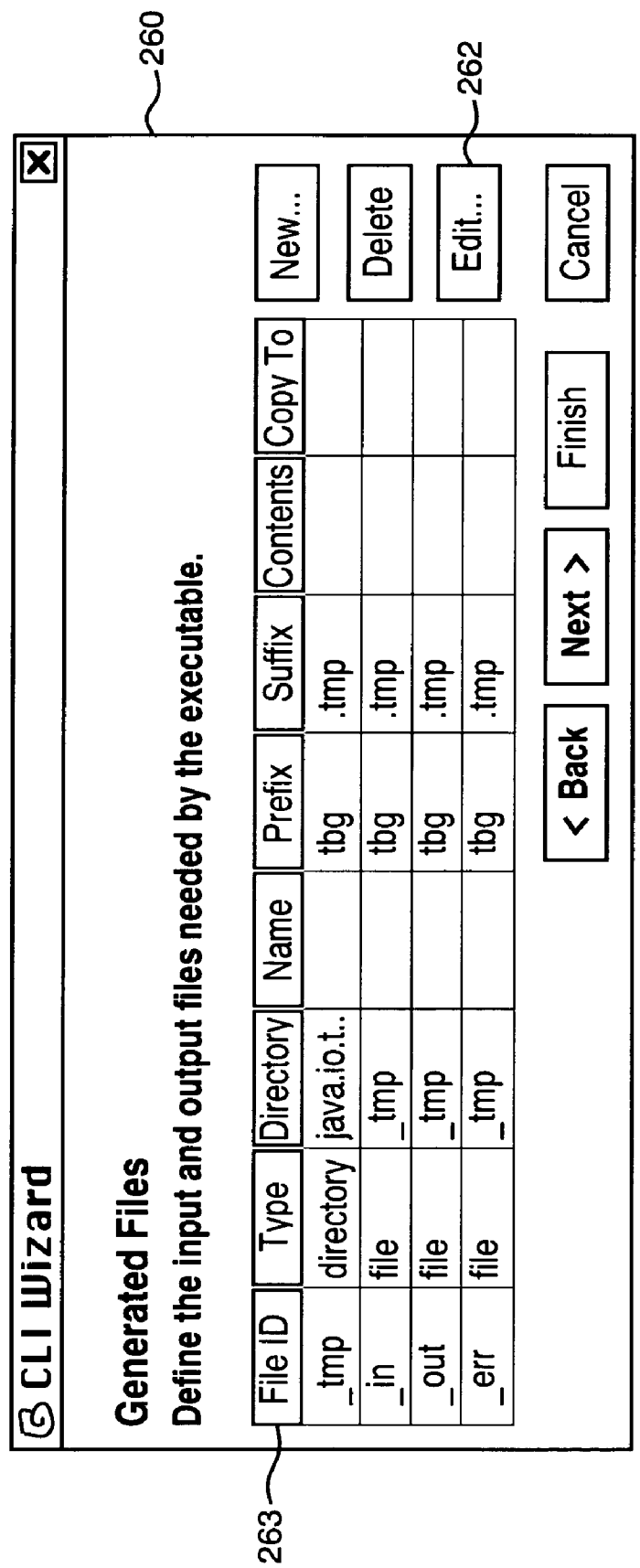
Figure 2J:
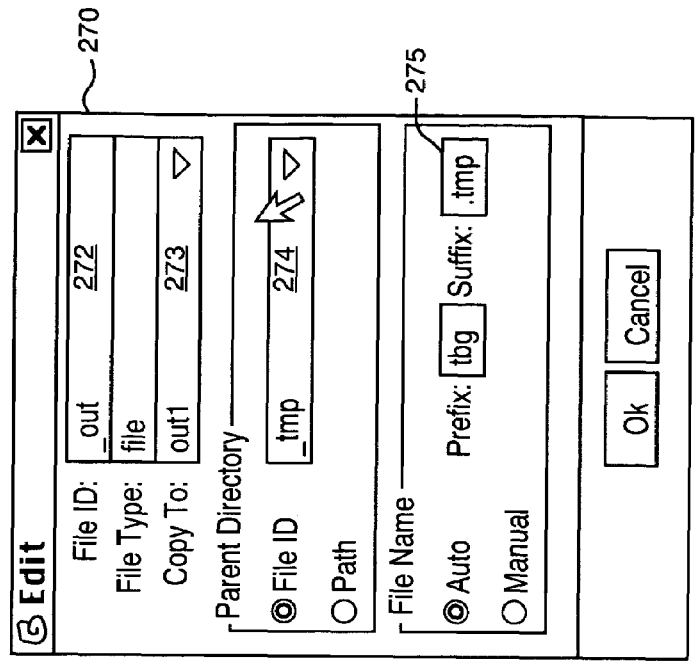
Figure 2I:
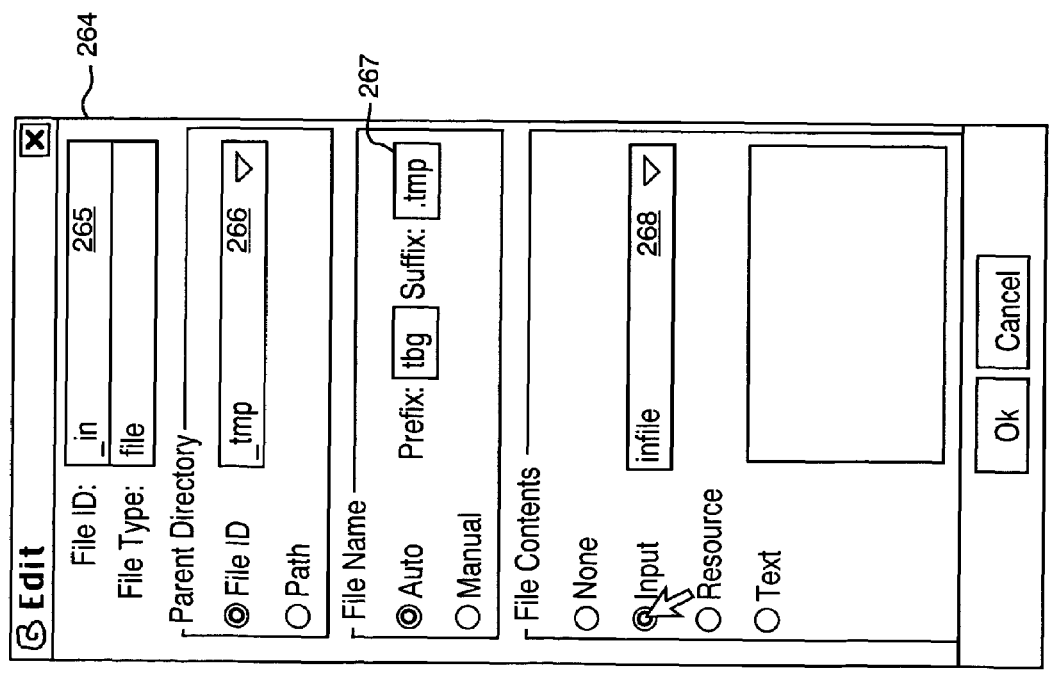
Figure 2K:
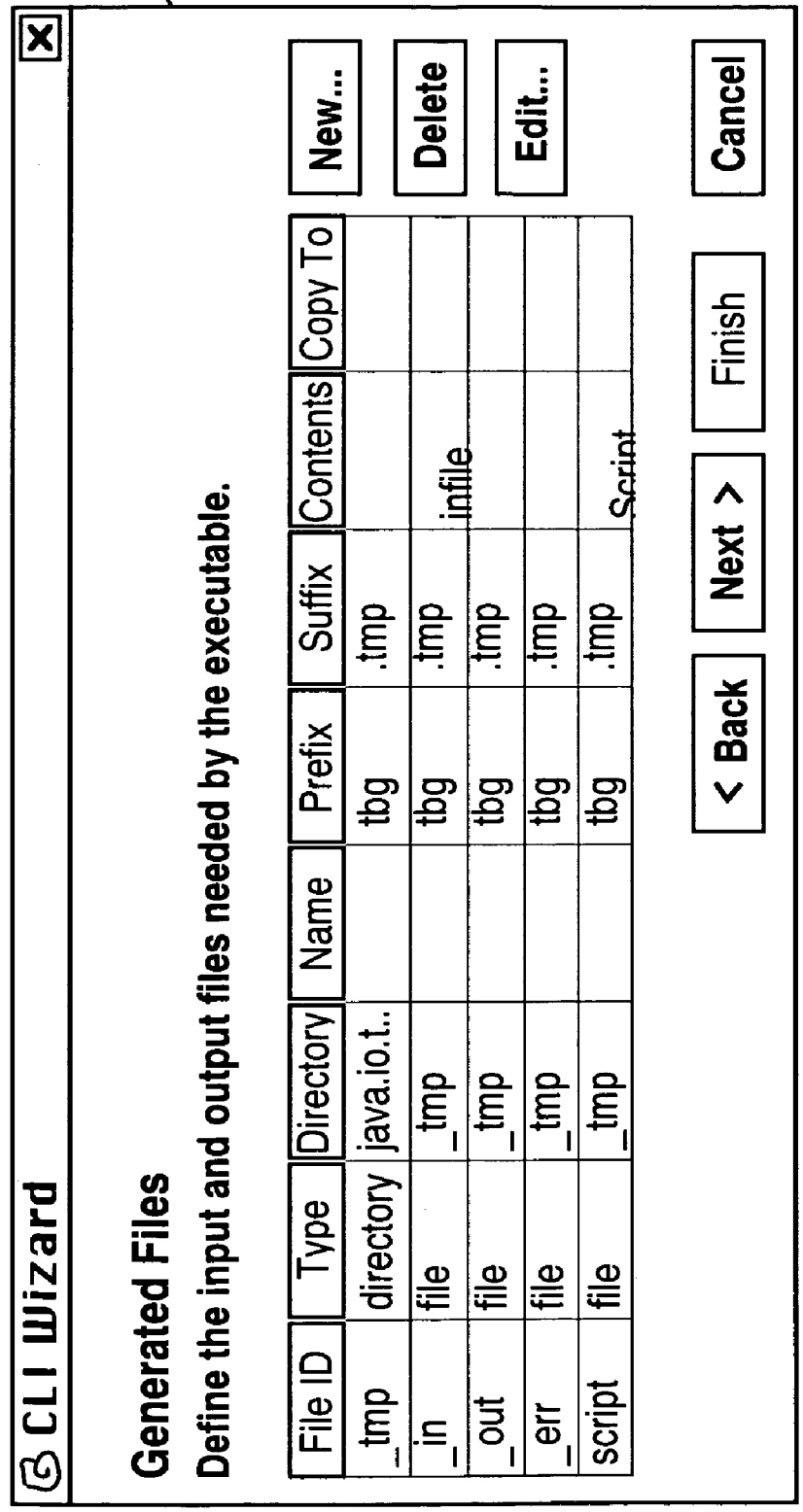

When the input(s) of the selected component has a data type that does not match the output(s) of the selected component, the GUI 25 determines whether or not a corresponding data converter exists. If a corresponding data converter does not exist, the GUI 25 prompts the user to perform a data mapping between the input data type and the output data type. To map the input, the user highlights _in from the file ID column 263 and then clicks the edit button 262 of the generated files screen 260 to map the data input as illustrated in FIG. 2H. The edit file dialog screen 264 appears and the user must click the input option 268 and enter the default values for the parent directory 266 and the file name 267 entries, FIG. 2I. To map the data output, the user highlights _out from the file ID column 263 and then clicks the edit button 262 of the generated files screen 260, FIG. 2J. The user then chooses the output option in the copy to entry 273, specifies where to send the results in entry 274 and enters the suffix of the result file name 275 in the edit file dialog screen 270, FIG. 2J. The generated files screen 278 is shown in FIG. 2K.

Figure 2L:
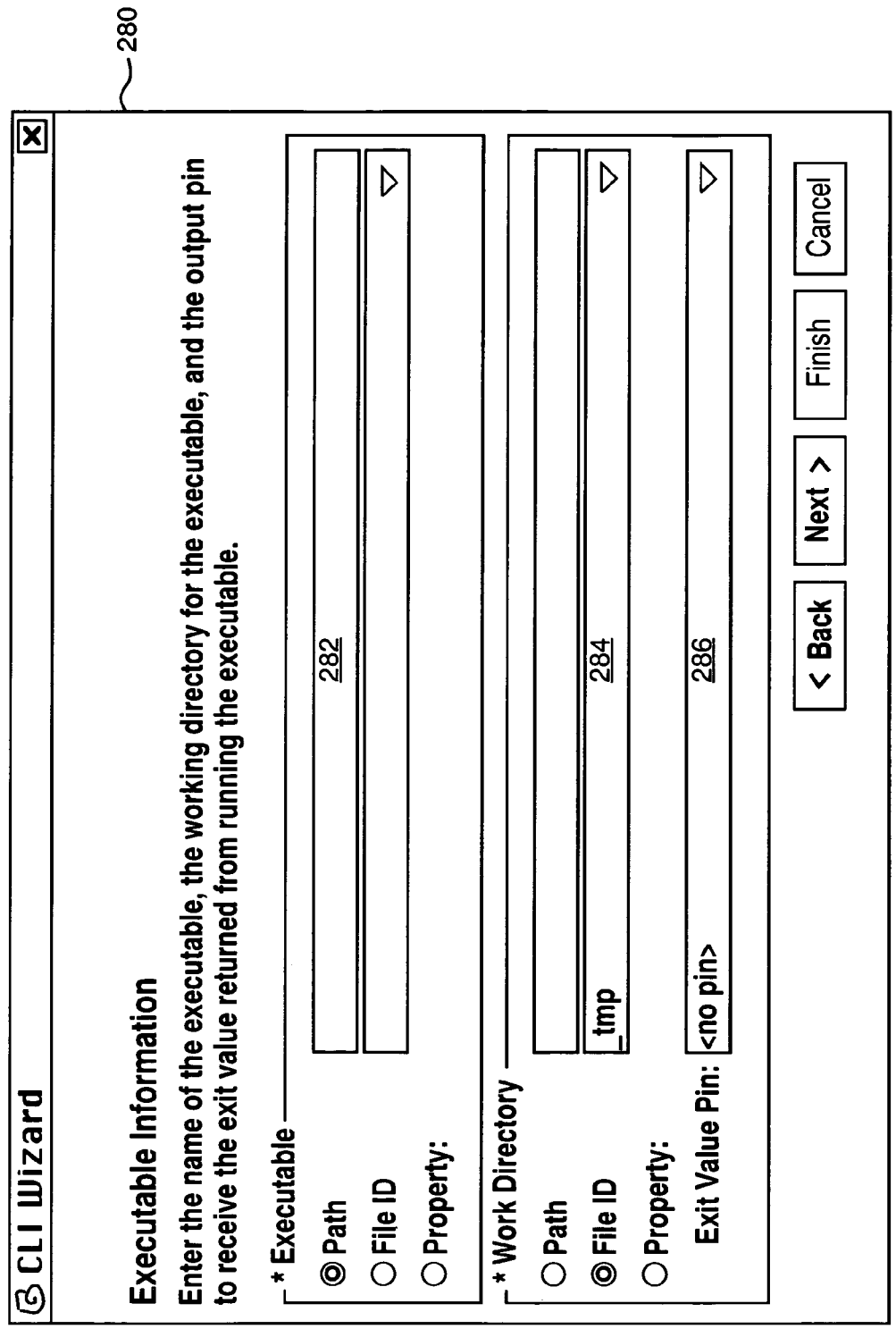
Figure 2M:
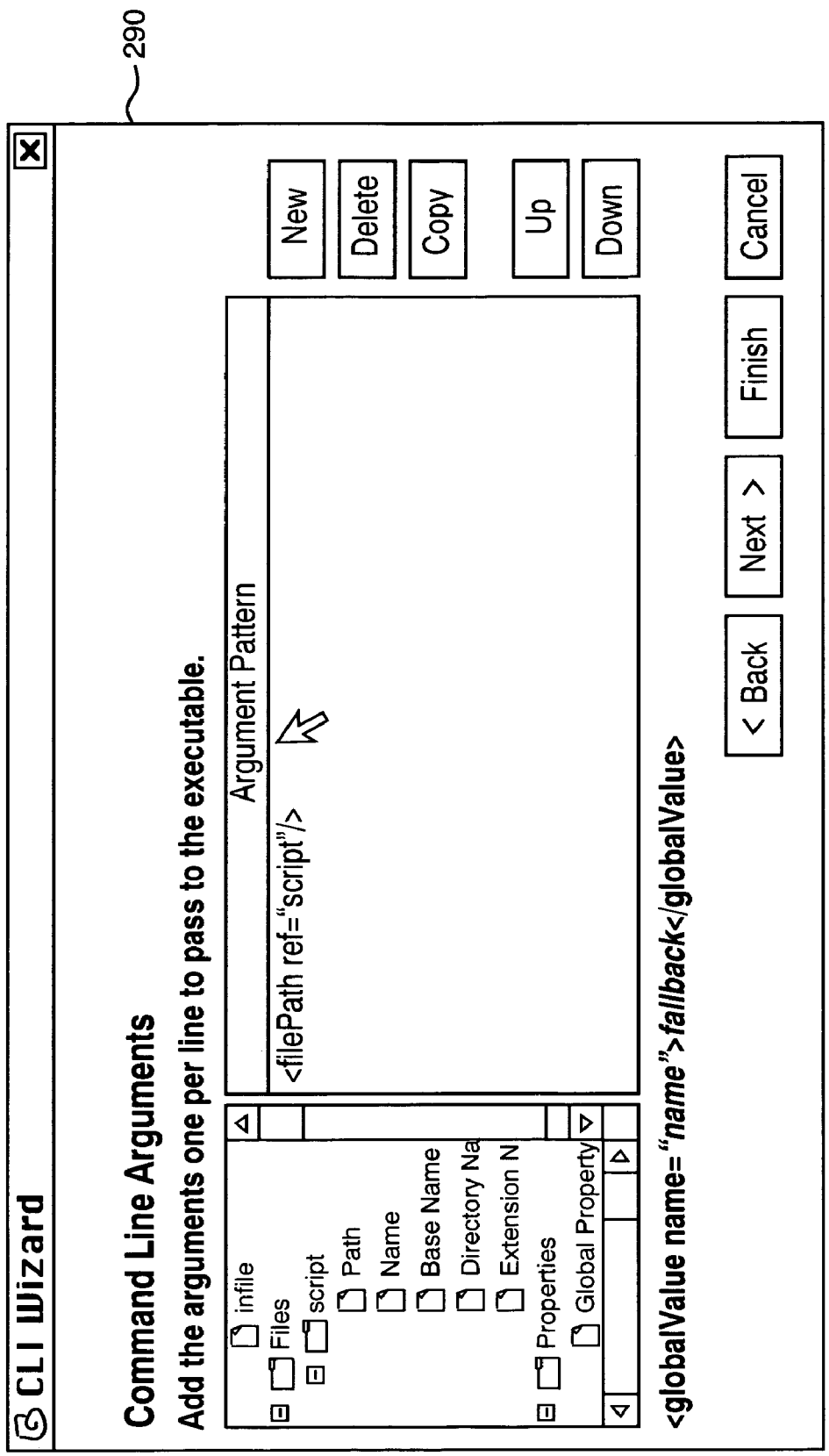

Lastly, the user also enters the executable name 282, the working directory 284 and the exit value pin 286 for the executable via screen 280, FIG. 2L. The work direction option allows the user to specify the temporary place where all the executable task are performed. The command line argument screen 290, FIG. 2M, allows the user to add an argument.

Figure 3A:
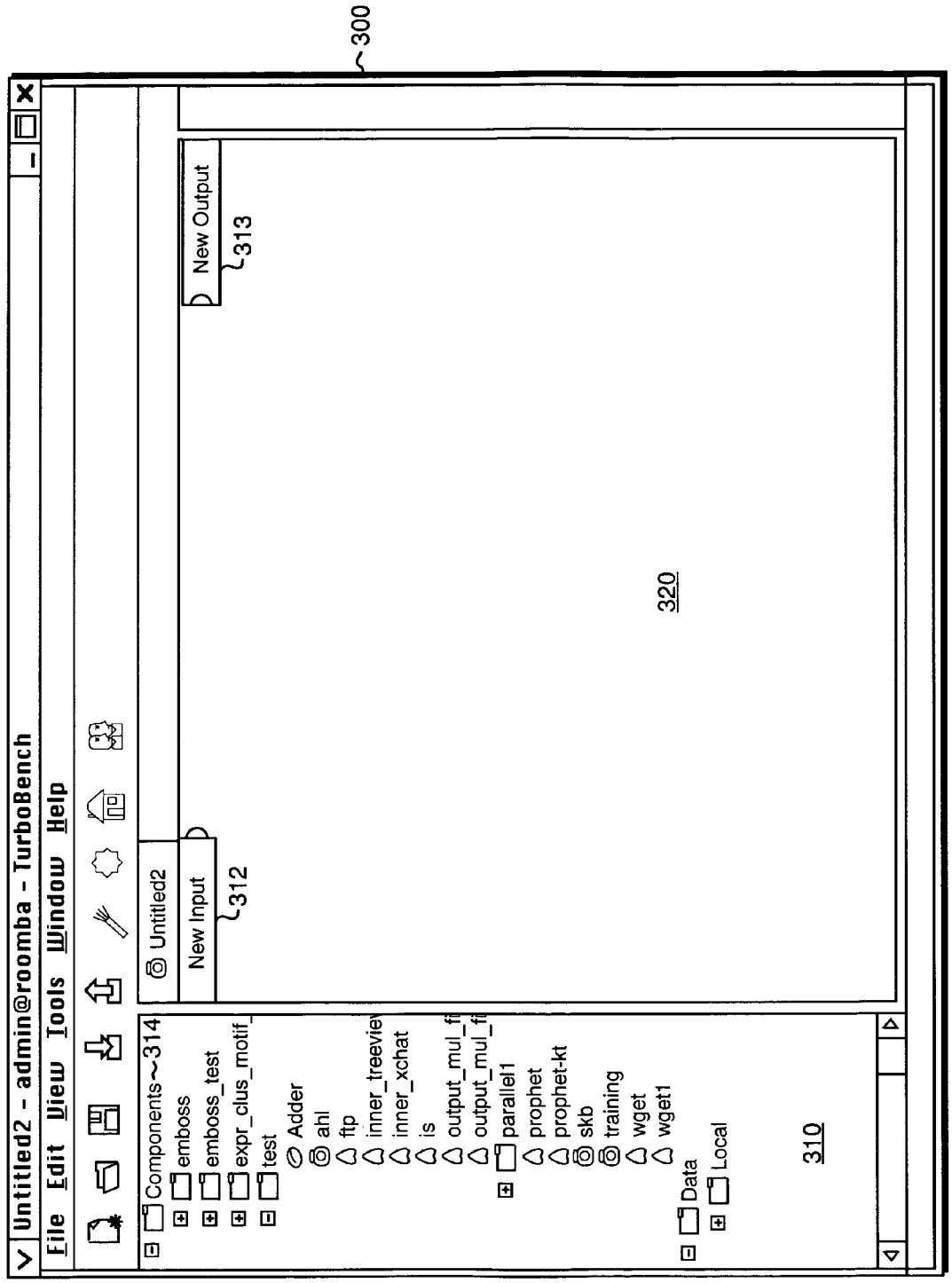
FIGS. 3A through 3F illustrate an exemplary graphical user interface that may be used for creating a dataflow component in connection with the present invention.
Figure 3B:
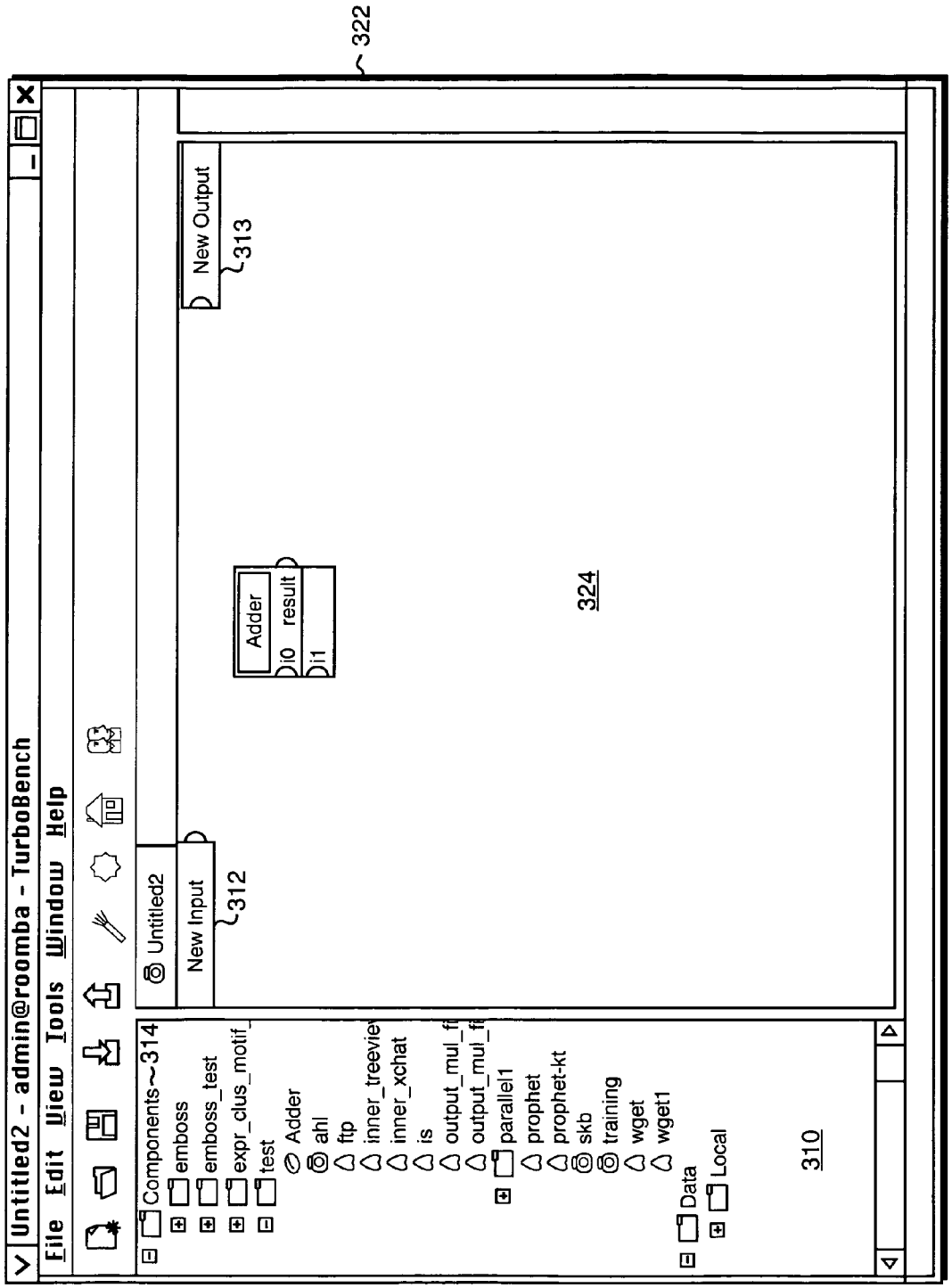
Figure 3C:
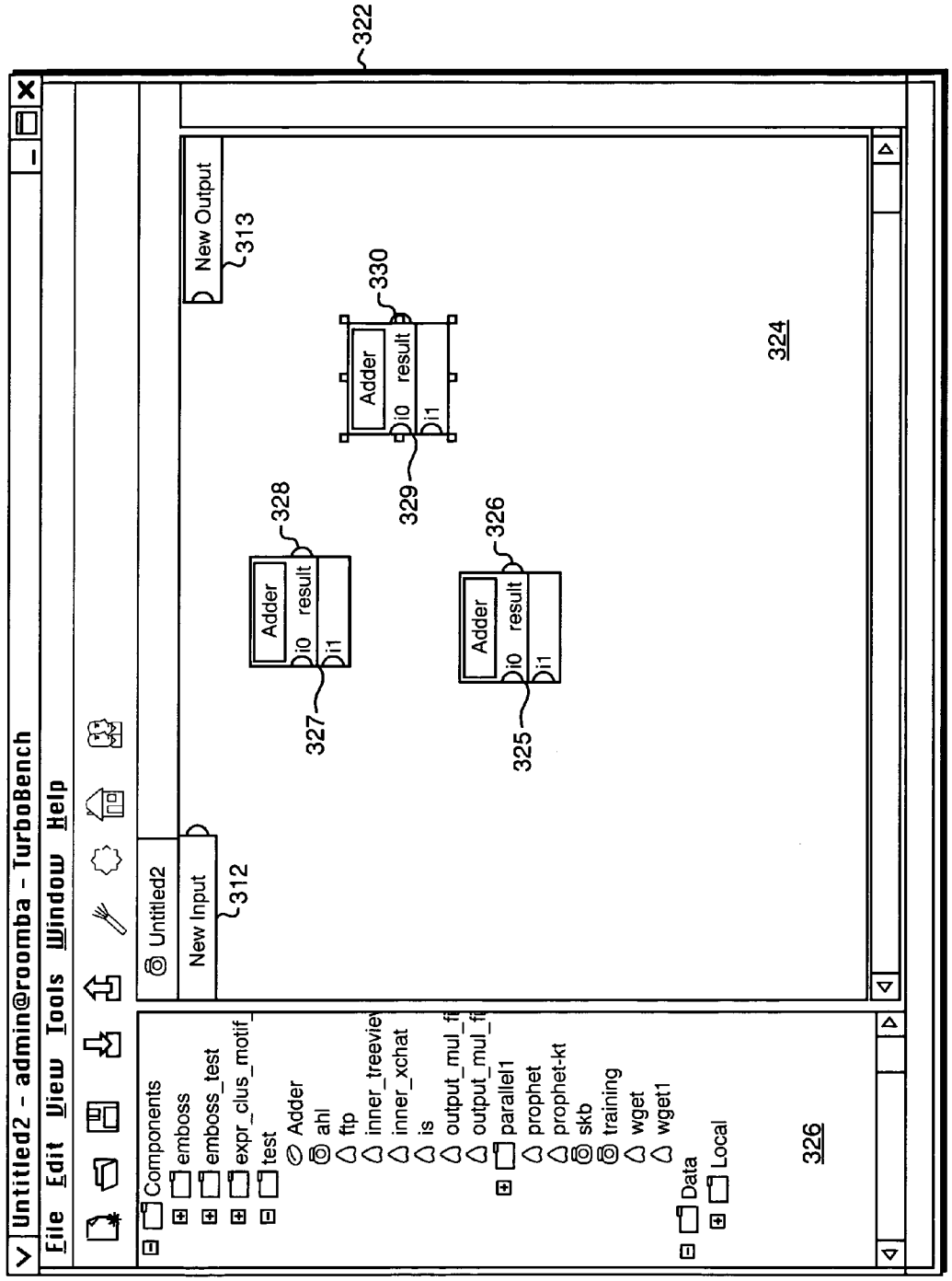
Figure 3D:
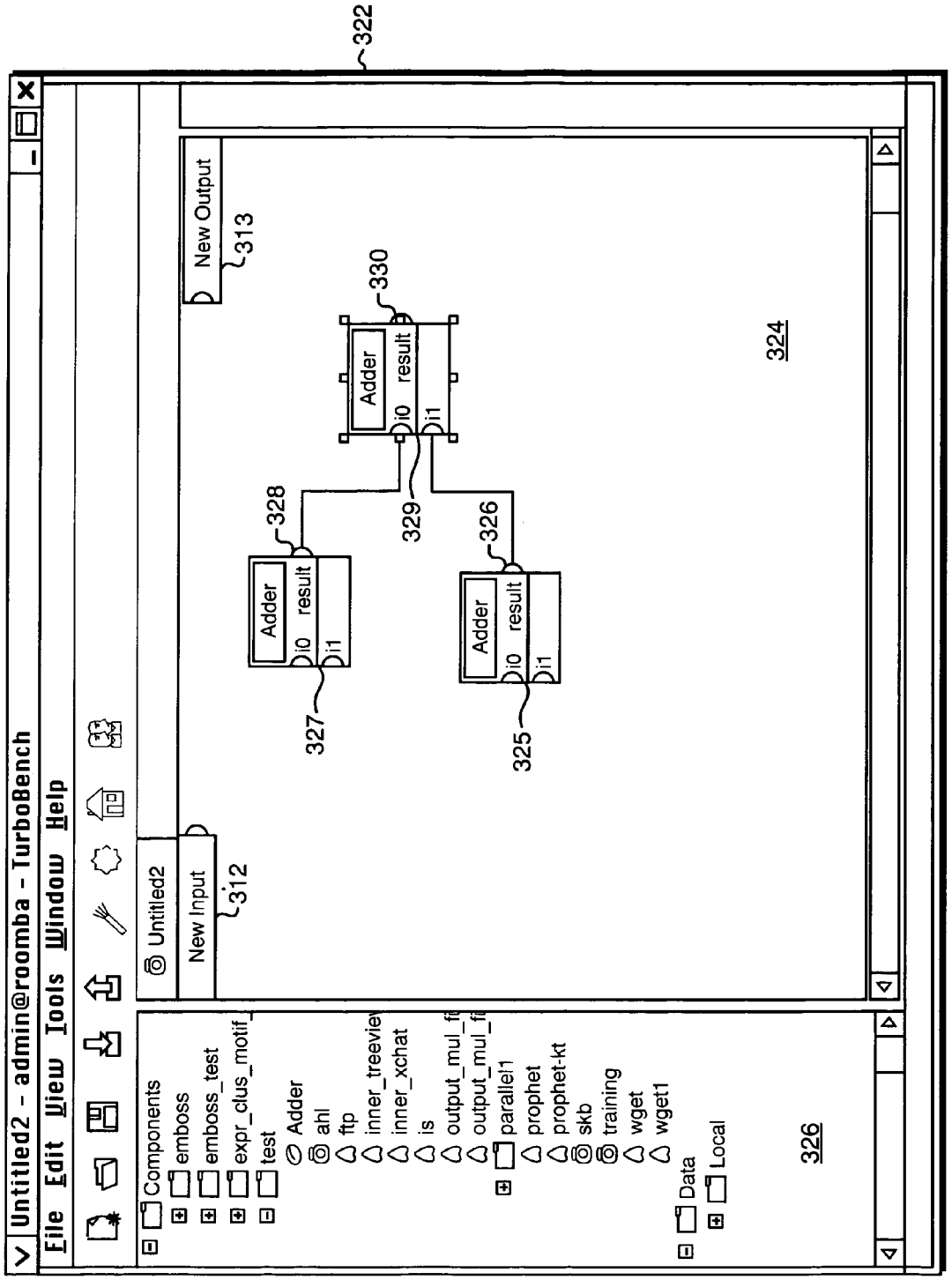
Figure 3E:
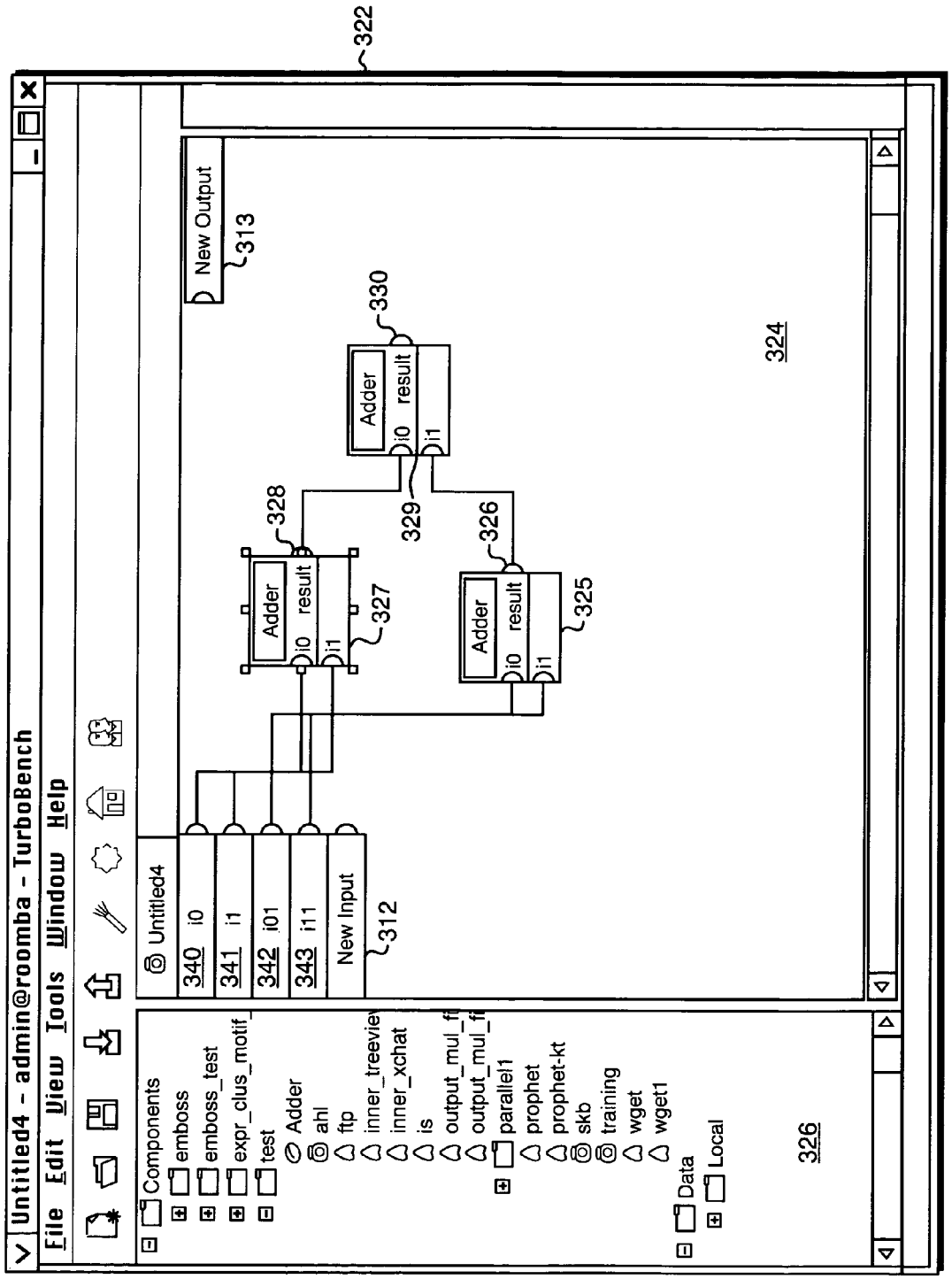
Figure 3F:
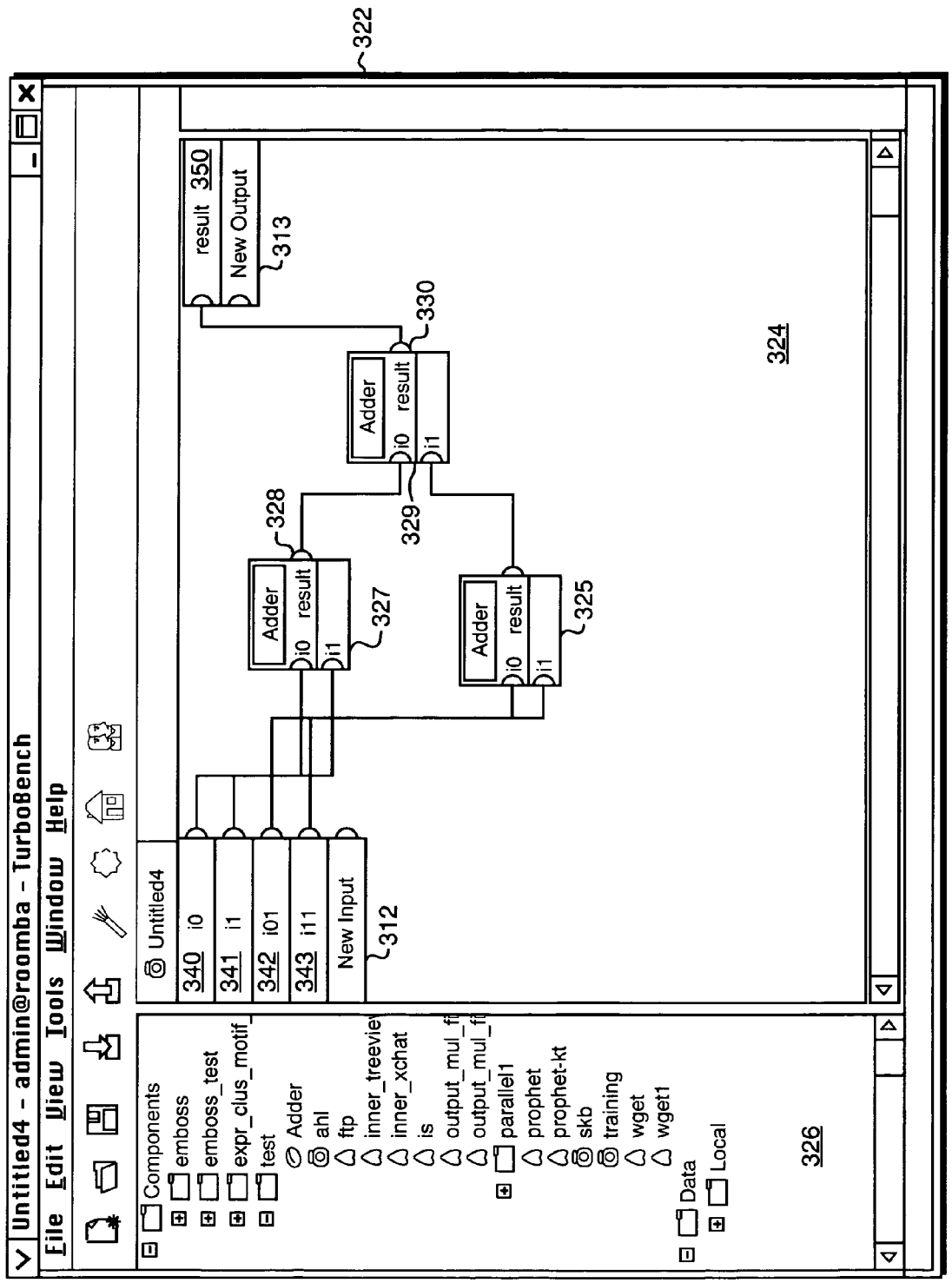

GUI 25 is also used to create a dataflow where each compute-intensive step in a dataflow is embodied in a component. GUI 25 allows the user to click and drag pre-built or user created components and input/output icons from left panel 220 to right panel 221 to create a dataflow. The creation of an exemplary dataflow is illustrated in FIGS. 2A-2B and 3A-3F using Adder components. An Adder component is used to add two numbers. As shown in FIGS. 2A and 2B, the user first clicks the new button 230 on screen 200 to display the component type screen 224, to create a dataflow. The user then selects the dataflow option 225. The dataflow component screen 300 then appears, FIG. 3A. The user may then click and drag the required components 314 from the component library of the left panel 310 to the right panel 324, FIGS. 3B and 3C. FIG. 3C illustrates a dataflow creation with three Adder components displayed in the dataflow creation screen 324 where each Adder component has two component inputs 325, 327, 329 and one component result 326, 328, 330. To connect the component result 326, 328, 330 with the input of other components 325, 327, 329, the user clicks the result 328, 326 of one of the Adder icons and then clicks the input 329 of a different Adder icon as shown in FIG. 3D. The user then connects the inputs 325, 327 of the remaining Adder components to input pins 340, 341, 342, 343, FIG. 3E. Lastly, the user connects the result 330 of the Adder component to result pin 350. The completed dataflow is illustrated in FIG. 3F.

Figure 4:
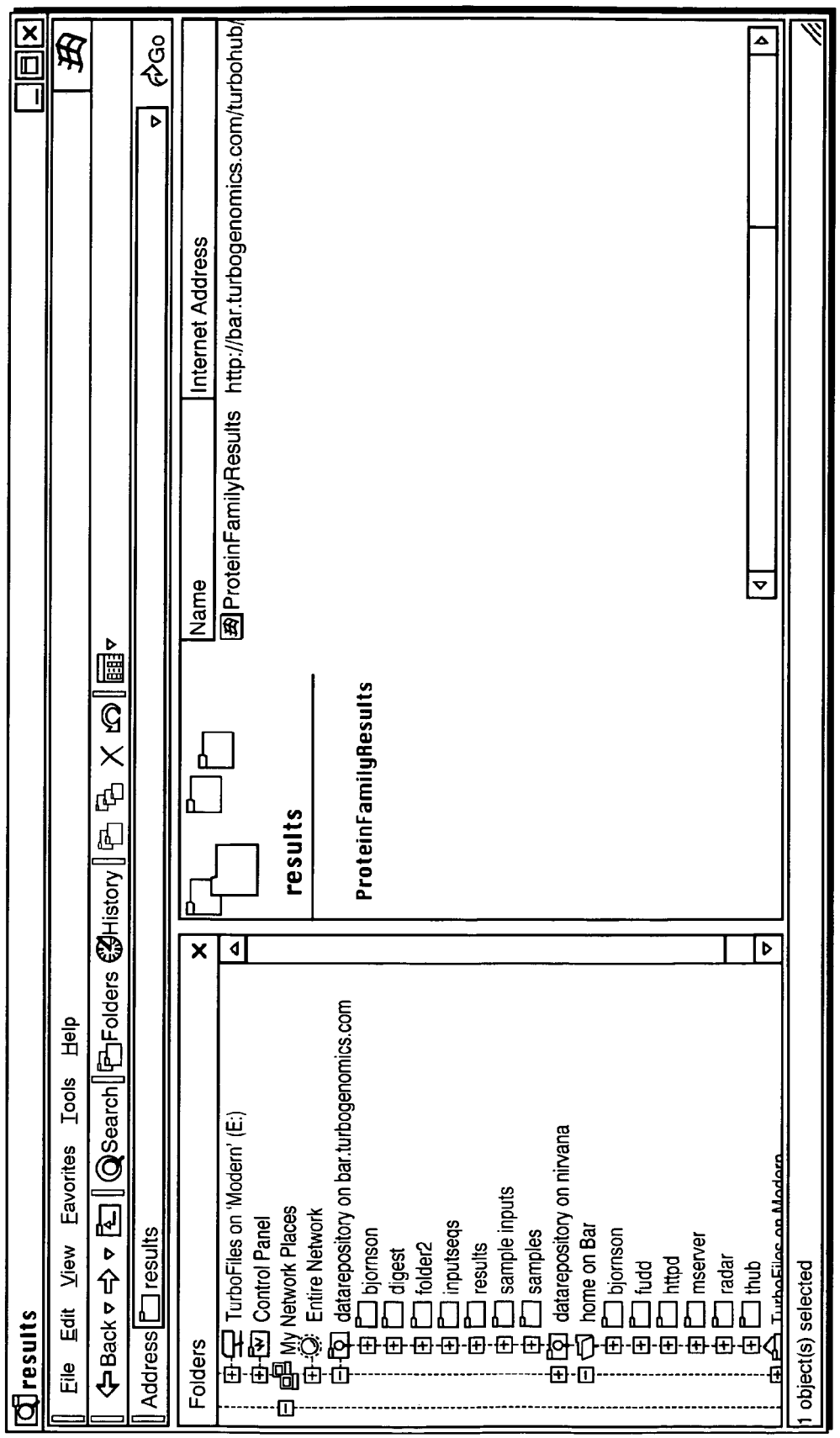
FIG. 4 illustrates an exemplary graphical user interface that may be used to input data into a data repository in connection with the present invention.

Data repository 40 functions to access and store data for components and dataflows. The data may be distributed across a plurality of systems and stored remotely from the worker 50 and master 10 computers. Data is installed in and accessed from the data repository 40 using a graphical interface such as Windows Explorer, GUI 25, WebDAV interface or other browsers. An exemplary graphical interface is illustrated in FIG. 4.

The data repository 40 may include a plurality of data storage systems. Exemplary systems include data repository on bar.turbogenomics.com and data repository on nirvana, as illustrated in FIG. 4. The plurality of systems, within data repository 40, may use different representations of data and different mechanisms for accessing and storing data. The method of the present invention provides a data repository abstraction layer. The abstraction layer allows for uniform naming of data object references and uniform data access. The uniform naming format includes a first field, representing an object type, and a second field, representing an object location of the form: <type>:<type-specific locator>. For example, an avaki object would be represented by: Avaki:/path/to/object and a DAV object would be represented by: DAV:http://davhost:port/path/to/object. The abstraction layer also provides for a generic constructor which delegates to a subconstructor either a data access or data storage process. The subconstructor is based on the object type of the data object. Uniform data access allows the user to store and retrieve data of various types including strings, byte arrays and data streams. To construct data objects in the data repository 40, the user or GUI 25 invokes: DataObj o=DataObj.create ("<type>:<type-specific locator>"). Parsing of this data object results in type="<type>" and rest="<type-specific locator>". Using pseudocode, the underlying implementation is illustrated in Table 4.

TABLE 4

DataObj DataObj.create(fullpath)
{ type=<everything to first colon>
  rest=<everything after first colon>
  // call type-specific constructor, passing it rest
  return new <type>DataObj(rest)}
Parsing the data object illustrated in Table 4 results in,
type = "<everything to first
colon>" and rest = "<everything after first colon>".

After creating the components and computer dataflow, the user must submit, to the master computer 10, the computer dataflow and the data files, stored in the data repository 40. The master computer 10 executes the dataflow on the worker computer(s) 50 by decomposing the dataflow into its constituent components and submitting the components to worker computer(s) 50 as tasks. The worker computers then fetch the components from the component library 30 for execution.

A taskbag abstraction layer manages the scheduling and communication of tasks and results between the master computer 10 and worker computers 50. The abstraction layer, shown in Table 5, is stored in the VMS 60.

TABLE 5

Taskbag creation methods
Taskbag Tb=Taskbag.create(name)
Taskbag Tb=Taskbag.createNew( )

TABLE 5-continued

Submission methods
id=Tb.submit(task)
result=Tb.getResult(id) // get result for task id
result=Tb.getResult( ) // get any result
Worker methods
(task=Tb.getTask( ) // retrieve a task to work on
Tb.putResult(result) // put the result back Encoded within the abstraction layer is scheduling logic for selection of the worker computer 50 to perform the given task where a task is comprised of a component and its input. The abstraction layer also includes code for communication logic which indicates how to transmit the task and results between the master computer 10 and worker computers 50. To execute a dataflow, the master computer 10 may submit a task to the taskbag abstraction layer without providing, to the taskbag abstraction layer, scheduling information for the submitted task or communication information for the results of the submitted task. The worker computer 50 retrieves the task from the abstraction layer, without obtaining scheduling information, from the taskbag abstraction layer, for the submitted task or communication information for the results of the submitted task. System 1 may include different taskbag abstraction layers to allow the simultaneous execution of different scheduling plans and communication mechanisms. Taskbag abstraction layers may be written using databases, virtual shared memory (e.g., JavaSpaces, Linda) or distributed object models (e.g., Corba, EBJ).

The method for executing dataflows, in accordance with the present invention, also provides for the execution of components in parallel through the automatic distribution of the components across a plurality of worker computers 50. To perform this parallel processing, the component may begin to process the data input upon receiving a minimum number of data elements rather than waiting to process the entire data input. Additionally, the component may produce a minimum number of data elements before completing the entire data input. After producing data elements, the elements will be passed to the next component for processing. For example, assume the dataflow is comprised of component A and component B. The initial data input is comprised of a data set with ten numbers of equal values $V_1$. Component A will transform each $V_1$ to $V_2$. When component A has transformed a minimum number of values $V_2$, Component B will begin to process values $V_2$.

Figure 5:
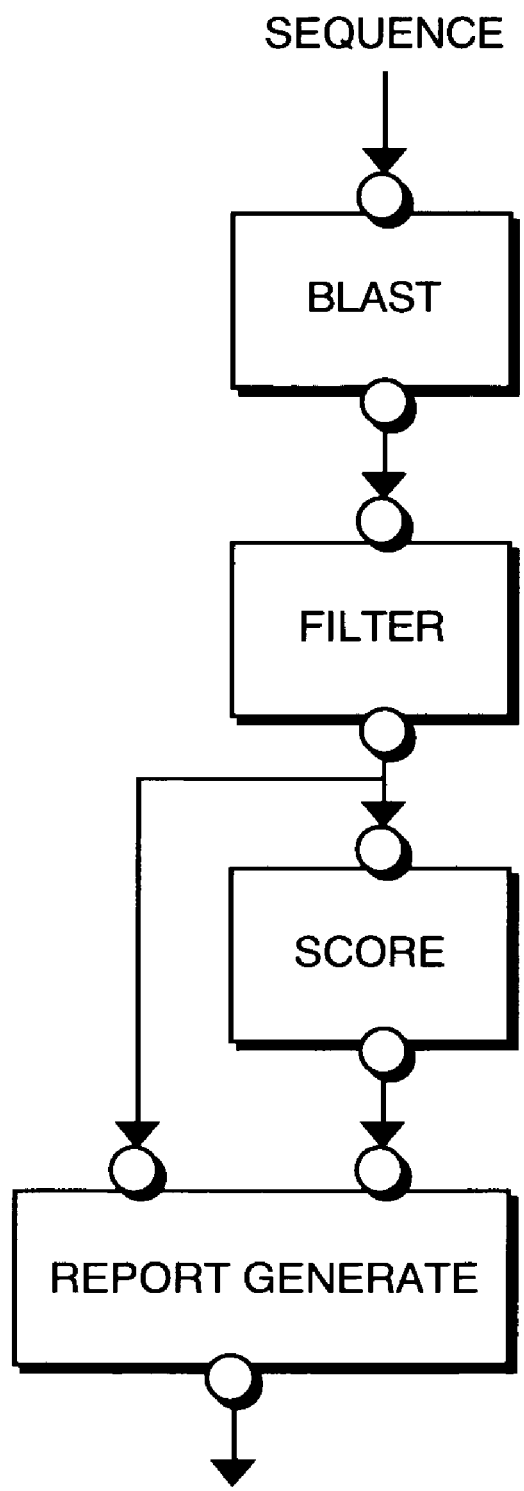
FIG. 5 is a flow chart illustrating a method of a preferred embodiment of the present invention.

The method of the present invention may also include the conditional execution of components where data satisfying a condition is written to a selected data output. Data that fails to satisfy a condition is written to a different data output. FIG. 5 illustrates a dataflow comprised of Blast, filter, score and report generate components. The filter component writes data, which satisfies a score threshold from the Blast component, to an input pin of the report generate component. Data which is below the score threshold is written to an input pin of the score component.

The method for executing dataflows, in accordance with the present invention, also provides for the execution of components by parallel replication. To perform parallel replication, a component is replicated and multiple copies of the component are stored in the component library 30. When a worker computer 50 obtains a task from a central task list, the worker computer 50 then fetches a copy of the necessary component from the component library 30 and then processes the data input. For example, component A takes a large problem and divides the problem into a number of independent sub-problems. The sub-problems are then processed on component B in parallel on different sets of worker computers 50 where each worker computer 50 has its own copy of component B which the worker obtained from the component library 30.

This parallel replication method also applies when a speed mismatch between a pair of adjacent dataflow components exists. If the upstream component is faster, than the downstream component, it will likely produce outputs more rapidly than the downstream component can process the inputs. The worker computers 50 will recognize that there are many independent sets of data input awaiting processing by the downstream component. The plurality of worker computers 50 will automatically replicate the downstream component, by fetching the downstream component from the component library 30, and then processing the data input.

The methods described above for parallel processing or parallel replication also apply to the processing of multiple dataflows when more than one dataflow is submitted to the system 1.

The execution of components is facilitated by a component interpreter abstraction layer which examines the component name and the inputs and outputs associated with the component. The component interpreter abstraction layer then selects and invokes a sub-interpreter based on the component's name, inputs and outputs and metadata. The selected sub-interpreter then executes the underlying component using the component's metadata and inputs and outputs.

Figure 6:
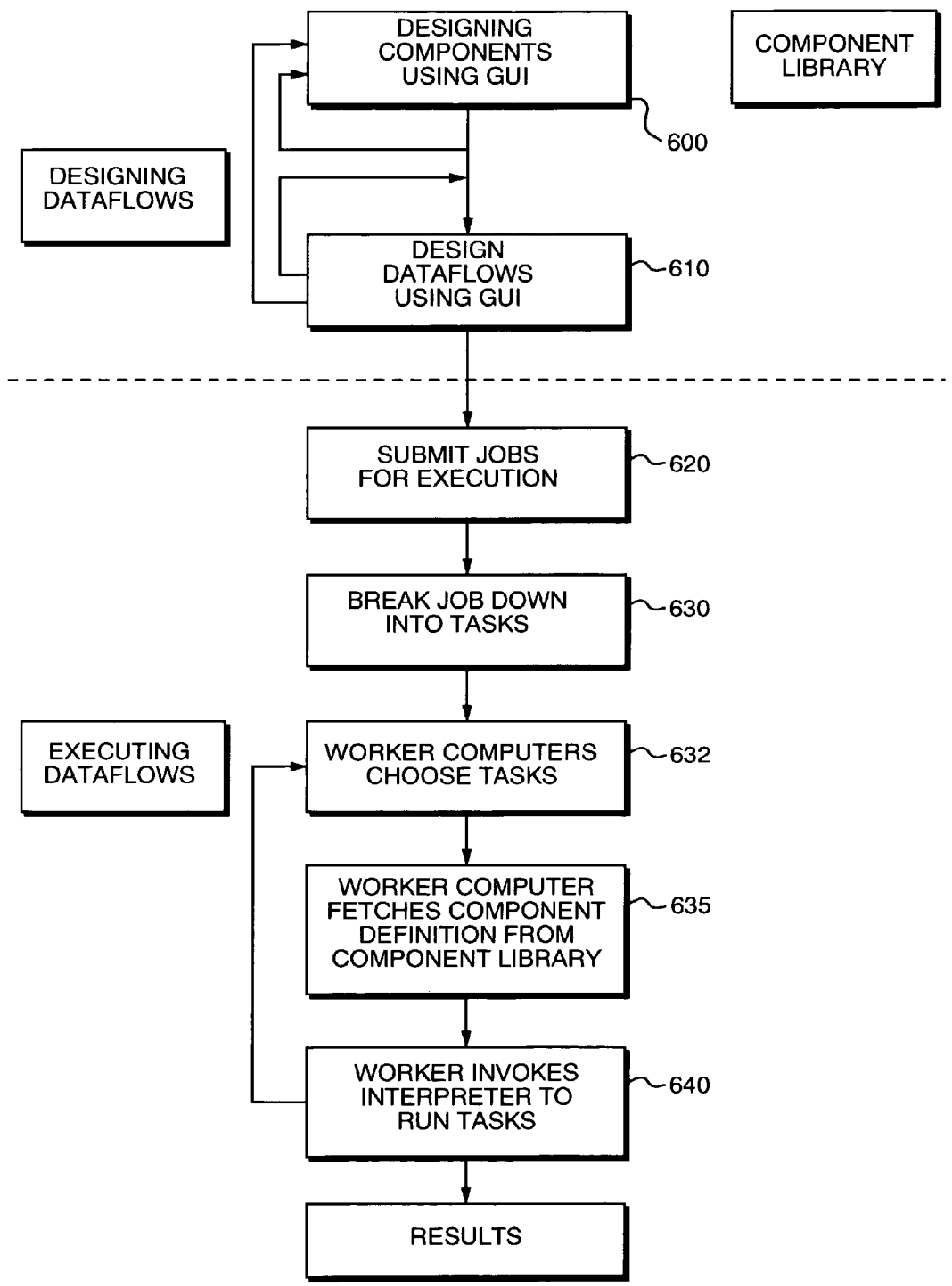
FIG. 6 is a flow chart illustrating a method of a preferred embodiment of the present invention.

With reference to FIG. 6, a flow chart illustrating a preferred embodiment of the method of the present invention is shown. In step 600, an component is defined, based on an input, an output, metadata and a sub-interpreter, using a graphical user interface 25. Each component represents a computer-implemented computational process that is performed on one or more inputs to the component. The computer-implemented computational process generates one or more outputs based on a predefined computational algorithm. This step is repeated until the user has created all the necessary components. In step 610, the user visually creates the computer dataflow on a user display using a graphical user interface 25. The user selects components, from the component library 30 of components, and graphically connects one or more input terminals of selected components with one or more output terminals of selected components. Each selected component and the one or more input terminals graphically correspond to the one or more inputs to the predefined computational algorithm associated with the component. The one or more output terminals graphically correspond to the one or more outputs generated by the predefined computational algorithm associated with the component. This step is repeated until the user has selected and connected the components needed to complete the dataflow. In step 620, a job is submitted by a master computer 10 and in step 630 breaks down the job into tasks where a task is a component and its data input. In step 632, the worker computer 50 chooses a task and in step 635 the worker computer 50 fetches the appropriate component and its arguments from the component library 30. In step 640, the work computer 50 invokes the appropriate sub-interpretation to process the task. When the worker computer 50 completes step 640, steps 632-640 are repeated until there are no remaining unprocessed tasks. Table 6 illustrates pseudocode for a worker computer (50).

TABLE 6

```
do forever { Task t = Tb.getTask( )
    Component c = task.getComponentDef( )
    Interpreter i = c.getSubInterpreter( )
    Result r = i.run(t, c)
    Tb.putResult(r)}
```

The life cycle of a workflow involves several steps and different representations. First, a user, via the GUI, builds a visual representation of the workflow. The workflow is represented by visual boxes and arrows. The workflow is then converted to a textual XML representation. This is the canonical definition that will be used by both the GUI and the runtime system. The first time a particular agent executes the workflow, the XML is converted to an in-memory graph representation. As part of this conversion, the graph may be transformed in various ways. The first time a particular agent executes the workflow, the in-memory graph is converted to a list of instructions to insert tasks to the task list. This representation is very efficient to execute, and can be cached to facilitate future executions of the same workflow. Each time the workflow is executed, the instructions are processed, submitting the steps contained in the workflow to the task list.

EXAMPLE 1

The following provides a detailed example applying the method of the present invention to a dataflow for a protein sequence classification. An important problem for many bioinformatics researchers is the classification of groups of amino-acid sequences into fine-grained categories (subfamilies) whose members have similar physical properties and may be metabolically related. For example, each of the sequences involved might be what is known as a structural domain of some protein in a certain protein family, and the goal might be to identify which of the sequences are likely to have similar function. For a typical problem, there may be tens of thousands of sequences involving millions of amino acids.

A number of approaches to this sequence classification problem are possible, but the one considered here creates the subfamilies by identifying "seed pairs" (highly similar pairs of sequences) and collecting other sequences around each seed pair based on a model of the nature of the similarity of the pair. Stated more precisely, the computation proceeds in a series of steps. First, find a number of disjoint, highly similar pairs of sequences and designate each as the seed pair for a new subfamily. Second, create a model that captures the nature of the similarities among all the sequences in the subfamily. This model will be used to measure the similarity between the subfamily and any arbitrary sequence. For this example, the model will be what is known as a Hidden Markov Model (HMM), and the measurement process for an arbitrary sequence will assign to that sequence a score indicating the likelihood that the sequence should be placed in the subfamily. Third, assess all the sequences against each subfamily model, and assign each sequence to the subfamily for which it achieves the highest score. Repeat Steps 2 and 3 using the new set of subfamilies.

The above approach to solving the sequence classification problem, although straightforward to describe, involves a significant number of computationally intensive steps. Each step requires the use of a particular bioinformatics program, and some of the steps are very time consuming. The required bioinformatics programs are: BLASTP, a program from the National Center for Biotechnology Information (NCBI) that can rapidly assess the similarity of pairs of protein sequences and is used to find seed pairs in Step 1; CLUSTALW, another program from the NCBI that aligns two or more protein or DNA sequences so as to maximize the match between the aligned sequences and is used to create the model for each seed pair in Step 2; HMMBUILD, a program that creates a hidden Markov model that describes a set of aligned sequences and is used in Step 2; HMMCALIBRATE, a program that optimizes hidden Markov models created by HMMBUILD and is used in Step 2; and HMMSEARCH, a program that scores the sequences in large sequence databases against a calibrated hidden Markov model and is used for sequence assessment in Step 3.

Although System 1 contains pre-built components for programs such as FORMATDB, BLASTALL, CLUSTALW, HMMBUILD, HMMCALIBRATE, and HMMSEARCH, the user must create additional components built specifically for the sequence classification dataflow. One such component is a script component, "FamilyFilter," encapsulating the Perl script used to select the seed pairs and create the initial set of subfamilies based on the BLASTP output in Step 2 of the dataflow. GUI 25 is used to define the interface for a component, using "pins" to represent the input and output data and mapping the pins to the corresponding variable names used in the Perl script itself. For the FamilyFilter component, the inputs will be the output of BLASTP in fasta format and a set of parameters (such as the number of seed pairs to select), and the output will be a dataset describing the seed pairs as a group.

In addition to the "Family Filer" component, two other special components are required for the sequence classification dataflow. The first of these components splits a single dataset describing a group of subfamilies into separate datasets describing each subfamily. The second reverses this process by combining a number of separate datasets describing individual subfamilies into a single dataset describing all of the subfamilies as a group. These "FamilySplitter" and "FamilyJoiner" components are used to increase the potential for parallel processing in the dataflow by creating independent subproblems and combining the results into a single solution, respectively. System 1 can replicate the components in the "parallelizable section" (between the FamilySplitter and FamilyJoiner components) in order to increase performance.

Figure 7:
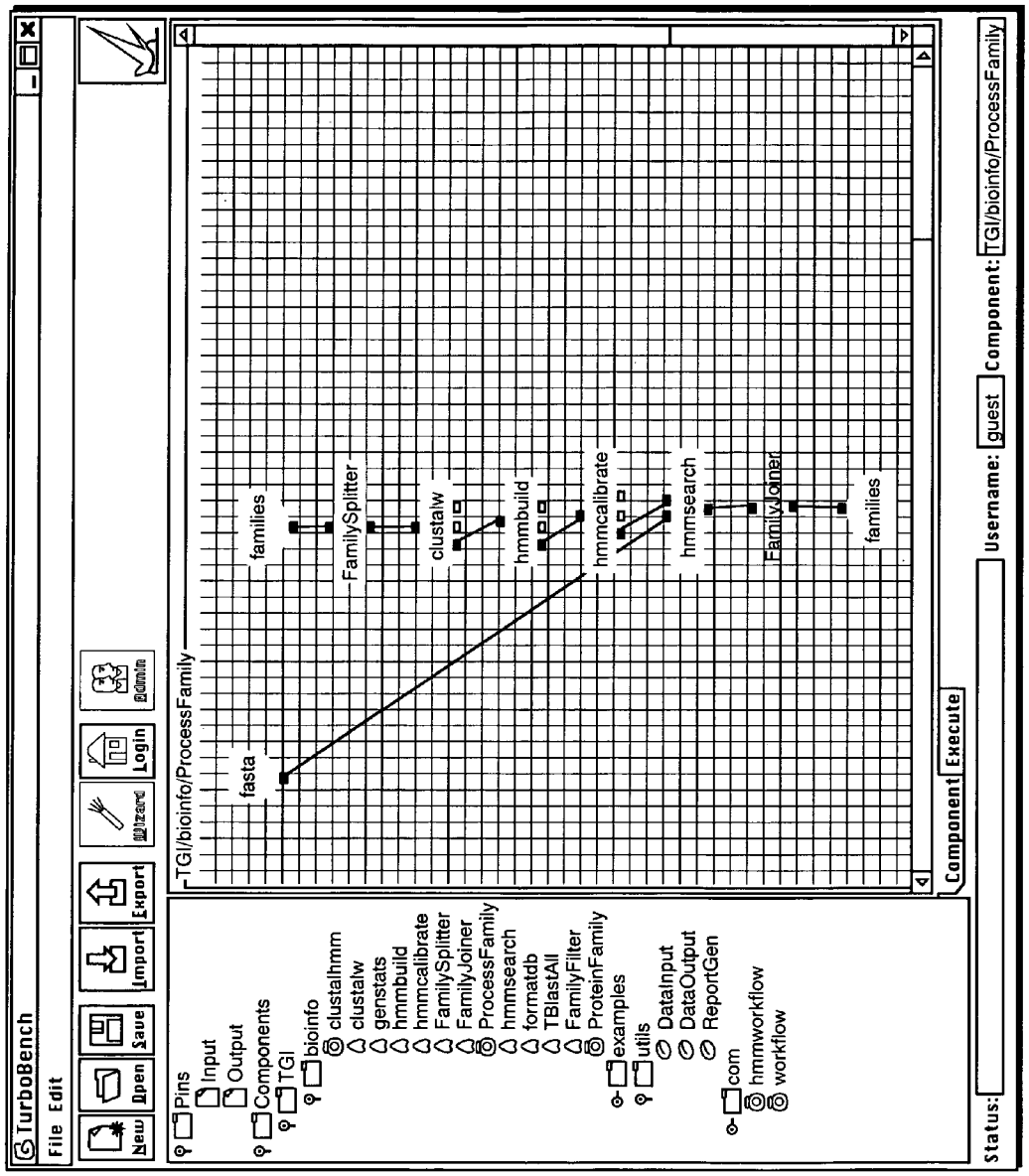
FIG. 7 illustrates an exemplary dataflow in connection with the present invention.
Figure 8:
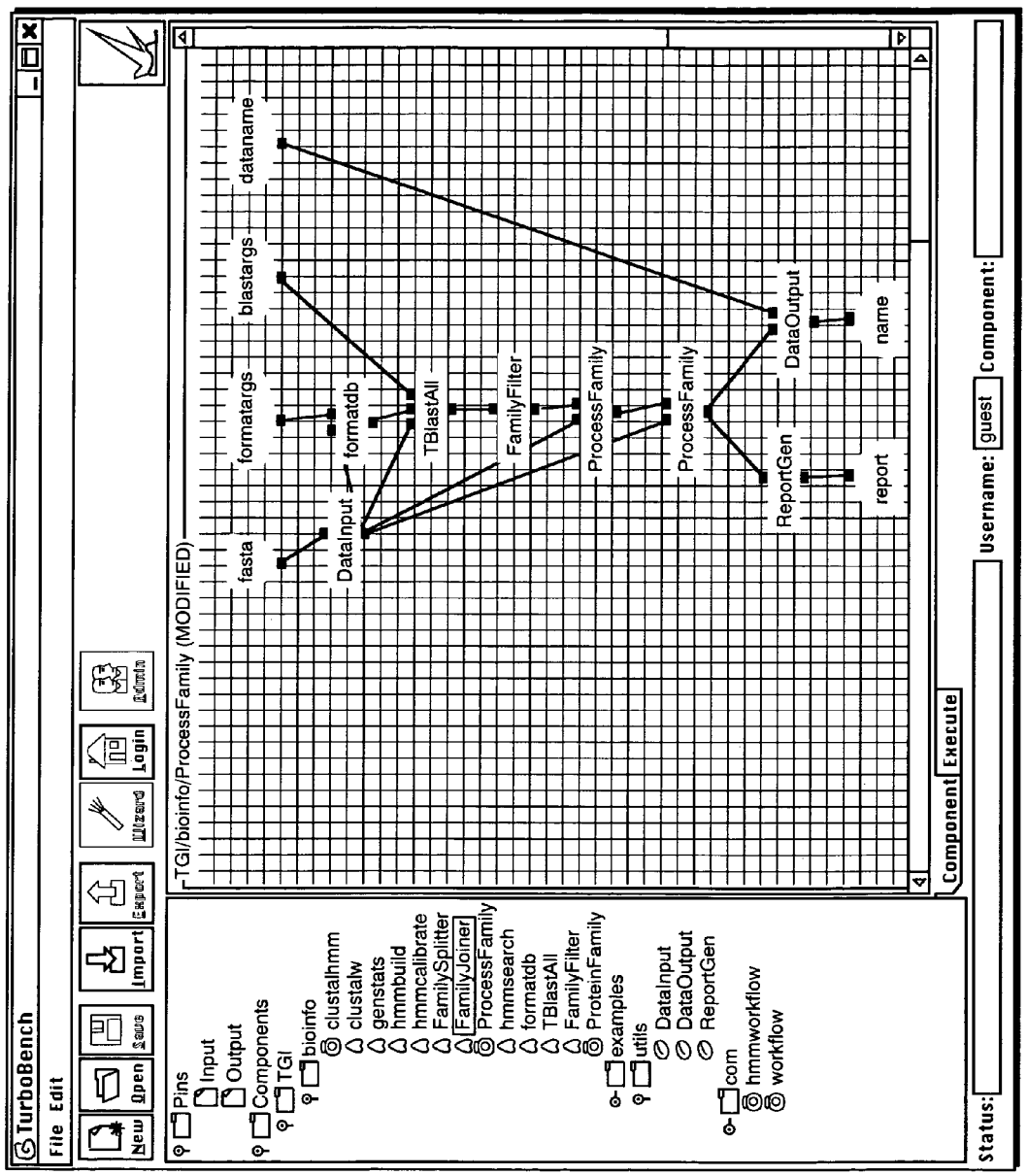
FIG. 8 illustrates an exemplary dataflow in connection with the present invention.

Once all the required components are available in the component library 30, the GUI 25 may be used to create the dataflow that will implement the sequence classification computation. Using the GUI 25, the dataflow is created visually by dragging and dropping computational components onto the design panel, creating data components corresponding to the various input and output data, and then indicating the flow of data among components by drawing data flow lines between component pins. FIG. 7 and FIG. 8 depict the GUI 25 interface for dataflow creation of the "ProcessFamily" and "ProteinFamily" dataflows, respectively.

Dataflows constitute a type of component in system 1. As a result, system 1 enables a hierarchical design process in which complex dataflows may be built up from simpler dataflows. For the sequence classification dataflow, a dataflow is created corresponding to the part of the sequence classification dataflow that takes one group of subfamilies and computes a new group of subfamilies to replace the original set (Steps 3-7 of the overall dataflow). FIG. 7 shows the "ProcessFamily" dataflow component. The ProcessFamily component has two inputs: a dataset containing all of the sequences in fasta format, and a dataset describing a group of subfamilies. The component has just one output; a dataset describing the set of subfamilies that result from Steps 3-7 of the dataflow.

Each step of the dataflow in the ProcessFamily component is described below to understand the operation of this component. FamilySplitter component takes a single input dataset describing a group of subfamilies and creates multiple output datasets, one describing each of the subfamilies in the group. Each of the output datasets is passed on independently for processing by the next component in the dataflow (CLUSTALW). The CLUSTALW component takes as its input a dataset describing the sequences in a subfamily and performs a multiple alignment of those sequences. The CLUSTALW output is passed to the HMMBUILD component, which creates a Hidden Markov Model that is then passed to the HMMCALIBRATE component for calibration. The HMMSEARCH component then takes the result of HMMCALIBRATE and creates a score for each of the original input sequences against the calibrated model. Finally, the FamilyJoiner component waits until all the HMMSEARCH results are complete and then forms a new group of families by assigning each sequence to the family whose hidden Markov model has given it the highest score. The output of FamilyJoiner is a single dataset containing data describing the new group of subfamilies.

The ProcessFamily dataflow component is built using GUI 25. When complete, that component is saved in the component library 30, whose contents are shown in the lefthand panel of the GUI 25 (see FIG. 7). The dataflow for sequence classification, "ProteinFamily," is created using the ProcessFamily component in combination with other standard components available already in system 1. The full dataflow, "ProteinFamily," is shown in FIG. 8.

The ProteinFamily dataflow component has four inputs: the name of the dataset containing all of the sequences to be classified; separate inputs containing arguments for FORMATDB and TBLASTALL, respectively; and the name to be used for the dataset containing the final result, which is the description of the optimized group of subfamilies. ProteinFamily also has two outputs: a report delivered in html for viewing in a web browser; and the name of the dataset containing the final results.

To understand the operation of the ProteinFamily dataflow, each component is discussed below and illustrated in FIG. 8. The first step is performed by the DATAINPUT component, which uses the dataset name provided as input to retrieve (via the data repository 40) the actual dataset containing the sequences in fasta format. Next, the FORMATDB component converts the fasta data into the database format used by BLAST, guided by the formatting parameters provided as a second input. The BLAST database format consists of several related files stored in a single directory. The entire directory is passed on to the TBLASTALL component, along with the original set of sequences and a number of parameters to control the operation of BLAST. The TBLASTALL component is used to perform an "all-to-all" BLASTP computation.

The BLAST results are then passed to FamilyFilter, the user-created script component that selects a number of disjoint pairs of highly similar sequences to be the seeds for the initial group of subfamilies. This process entails removing identity matches (scores for a sequence matching itself), sorting the remaining matches by e-value score, removing multiple matches for each sequence, selecting the proper number of seed pairs, and creating a description (in XML) of the resulting group of subfamilies.

The output from FamilyFilter is now fed twice through the ProcessFamily dataflow—once for each pass through Steps 3-7 of the original dataflow. In the first pass, each subfamily contains just a seed pair, while, in the second pass, each family contains all the sequences assigned to it during the first invocation of ProcessFamily. Finally, the group of subfamilies emerging from the second invocation of ProcessFamily is passed on both to the REPORTGEN component, which generates the html report, and to the DATAOUT component that stores the subfamily data in the data repository 40.

Before actually running the ProteinFamily dataflow, the input data is installed in the data repository 40. For the ProteinFamily dataflow, only the FASTA input sequences are stored in the data repository 40, since the other inputs may be entered directly when the dataflow is run.

Figure 9:
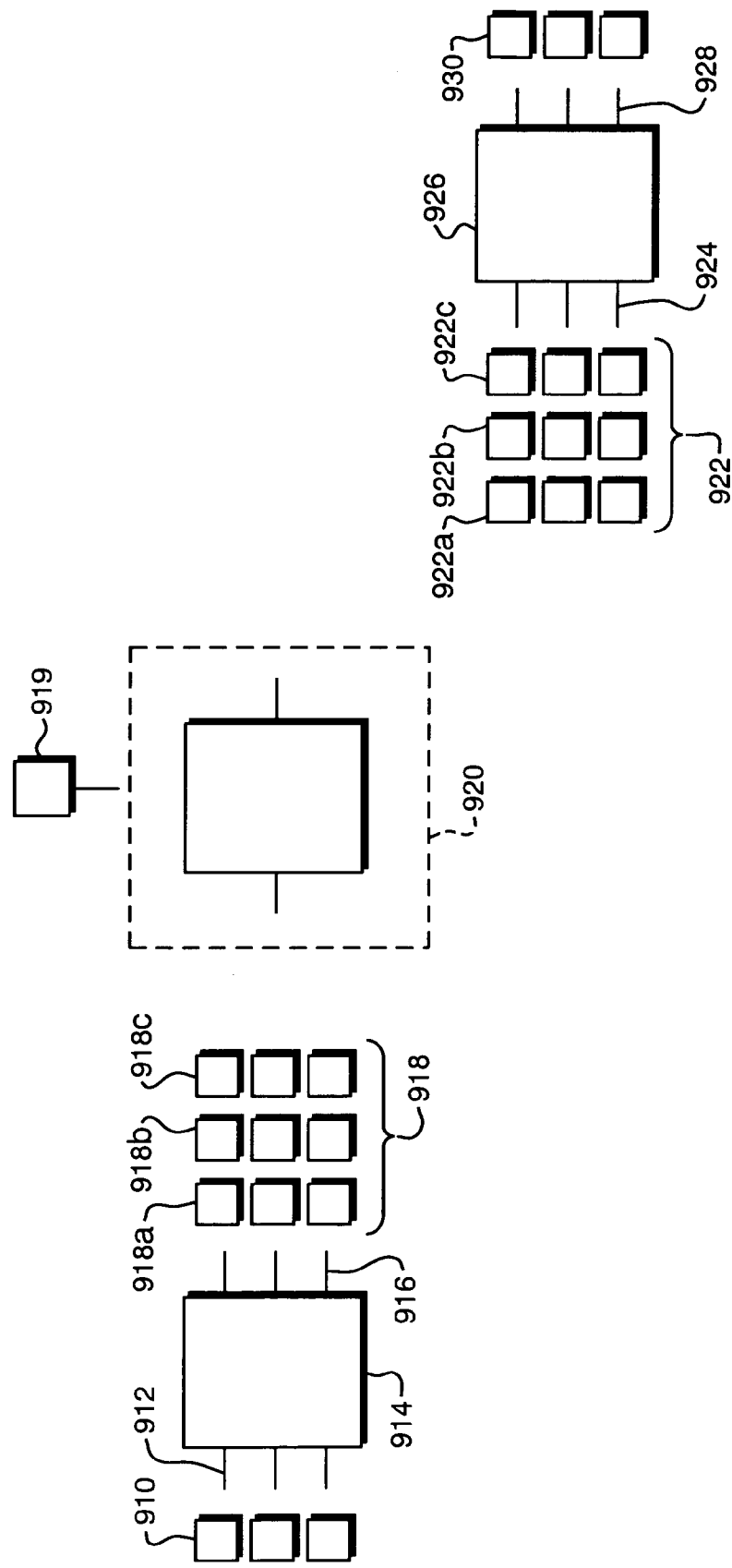
FIG. 9 illustrates an exemplary splitter component and exemplary joiner component within a workflow as implemented in connection with the present invention.

As illustrated in FIG. 9, the method of the present invention provides for the creation and execution of joiner and splitter components. Splitter and joiner components provide additional parallelism by executing the same component multiple times simultaneously within a workflow component. For example, if you have an extremely large database in your workflow that is being fed through a component, you can accelerate the execution of the component by splitting the database, executing on the split data on multiple workers, and then joining the results before sending it to the next component downstream. Furthermore, the splitter and joiner components provide for functionality beyond splitting a database early in the workflow and concatenating the results at a later point in the workflow. More generally, the splitter and joiner components provide for splitting a single monolithic sequence of computations, wherein the computation is performed in a number of separate and independent computational sequences. The outputs from multiple independent computational sequences are then joined back together into a single output for further processing. To the user of the system, parallel loops are denoted by splitter and joiner components. In the graphical user interface splitters and joiners look much the same as other components, in that they are boxes with input and output pins. However, the data lines drawn between the splitters, intermediate components, and joiners are drawn as parallel lines to emphasize the parallelism of the loop.

These joiner and splitter components may be used for the creation and execution of parallel loops. Parallel loops are used to represent loops over independent iterations. These iterations can be computed completely independently of one another, and in any order. An example is a Monte Carlo calculation, where each iteration receives a different set of starting inputs and runs the same calculation.

An exemplary workflow containing a splitter component 914, a joiner component 926 and an optional component 920 is illustrated in FIG. 9. A splitter component 914 is a specialized component that receives a single set of inputs 910 and operates on the input 910 to generate an ordered group of one or more consistent splitter output sets 918, wherein each one of the consistent splitter output sets 918a, 918b, 918c, consists of one output on each of the multiple output terminals 916. Each of the consistent output sets 918a, 918b, 918c is then passed onward independently in the workflow one after the other. A splitter component 914 may have one or more input terminals 912, a single input time, one or more input 910, one or more output terminals 916, an ordered group of one or more consistent splitter output sets 918 and multiple output times. Each consistent splitter output set 918a, 918b, 918c consists of one output on each terminal 916 produced at a single output time. The output may comprise a No Value output or a valid data output. The ordered group of consistent splitter output sets 918 may contain multiple consistent splitter output sets 918a, 918b, 918c depending upon the splitter input 910 and the splitter algorithm associated with the splitter component 914. The splitter component 914 generates the consistent splitter output sets 918a, 918b, 918c in a specific order by operating on the splitter input 910. The consistent splitter output sets 918a, 918b, 918c carries with each output an ordinal sequence number, and possibly other metadata such as a time stamp, that the joiner component 926 will use when it ultimately processes the consistent splitter output sets 918a, 918b, 918c or output derived from the consistent splitter output sets 918a, 918b, 918c. Each consistent splitter output set 918a, 918b, 918c flows independently through the workflow, until it or output derived from it reaches a joiner component 926. The consistent splitter output sets 918a, 918b, 918c do not necessarily flow in the order of their timestamps or sequence number. Before reaching the joiner component 926, the consistent splitter output sets 918a, 918b, 918c may also flow through one or more independent downstream components 920, provided that each of the downstream components 920 eventually flows to a corresponding joiner component 926. Each firing of the splitter component 914 represents a single iteration of the loop generating the complete group of set of consistent splitter output sets 918. When a splitter component 914 has finished firing, it informs all downstream components of the number of consistent splitter output sets that were generated.

Somewhere downstream from the splitter component 914, there is at least one joiner component 926 which is associated with the splitter component 914. A joiner component may be associated with a plurality of splitter components provided that each of the associated splitter components generates the same number of consistent splitter output sets. A joiner component 926 may have one or more joiner inputs 922, one or more joiner input terminals 924, one or more joiner input times, one or more joiner output terminals 928, one or more joiner outputs 930 and a single joiner output time. The joiner inputs 922 to the joiner component 926 consists of a plurality of sequentially numbered consistent joiner input sets 922a, 922b, 922c wherein each consistent joiner input set 922a, 922b, 922c delivers one joiner input to each of the joiner input terminals 924 at a single joiner input time. The joiner input received on each of the joiner input terminals 924 may be derived from an associated splitter component or from other components. All joiner inputs derived from an individual consistent splitter output set 918a, 918b, 918c with a specific ordinal sequence number generated by an associated splitter component 914 are contained in the correspondingly numbered consistent joiner input set 922a, 922b, 922c arriving at the joiner input terminals 924 of the joiner component 926. If the joiner component 926 is associated with more than one splitter component 914, then each sequentially numbered consistent joiner input set 922a, 922b, 922c contains joiner inputs derived from the correspondingly numbered splitter output set 918a, 918b, 918c from all of the associated splitter components 914. The number of joiner input terminals 924 may not be equal to the number of splitter output terminals 916. Within a consistent joiner input set 922a, 922b, 922c, some of the joiner input terminals 924 may receive inputs that are not derived from splitter components. In that event, such inputs are saved when they arrive, and copies of each of them are included in all consistent joiner input sets 922a, 922b, 922c. The joiner algorithm associated with the joiner component 926 produces a single joiner output 930 on each joiner output terminal 928. The joiner component 926 operates on the consistent joiner input sets 922a, 922b, 922c, processing each one until it determines that it has received one consistent joiner input set 922a, 922b, 922c corresponding to each of the consistent splitter output sets 918a, 918b, 918c generated by associated splitter components 914. The joiner component 926 combines the consistent joiner input sets 922a, 922b, 922c into a single result by executing a combining function on the separate joiner input.

At the user's option, somewhere downstream from the splitter component or upstream from the joiner component there may also be any number of other components. The input and output terminals of the other component(s) are connected to the input and output terminals of the splitter or joiner components as described above.

As discussed above, a splitter component produces a consistent splitter output set on each splitter terminal and the joiner component operates on a consistent joiner input set. The splitter output sets are consistent in that whatever output appears on the first splitter output terminal is designed to go with whatever output appears at the same time on the second output terminal and whatever output appears at the same time on the third output terminal, and so on. For example, a splitter component is used to alphabetically divide two inputs with each comprised of a large database of names. The splitter component will produce consistent splitter output sets at multiple times where the first consistent splitter output is all the A names from each database, the second consistent output is all the B names from each database, the third consistent output is all the C names from each database, and so on. In this case, the splitter component will have two input terminals and two output terminals corresponding to the two databases. For the first output time, the splitter component produces the first consistent splitter output set in which all the A names from the first database are produced as a single output on the first splitter output terminal, and all the A names from the second database are produced as a single output on the second splitter output terminal. For the second splitter output time, the splitter component produces the second consistent splitter output set in which all the B names from the first database are produced as a single output on the first splitter output terminal, and all the B names from the second database are produced as a single output on the second splitter output terminal. The consistent joiner input set is consistent with the consistent splitter output set, through the requirement of a 1-to-1 correspondence between the consistent joiner input sets and the consistent splitter output sets. There is, however, no requirement that the sizes or number of inputs in the consistent joiner input set have any particular relationship to the sizes or number of outputs in the corresponding consistent splitter output set. For example, returning to the alphabetical splitting of two databases, the consistent splitter output sets might be delivered to a downstream component that would compare the lists and output the list of names that are in both databases. The output of this component would then be delivered to the joiner component that would produce a merged list of all such names. Each consistent joiner input set consist of a single joiner input that is a list of names common to both databases that start with the same letter. The first consistent joiner input set would contain the list of such names starting with A, the second consistent joiner input set would contain the list of such names starting with A, and so on.

Joiner components produce their output after processing all of the consistent joiner input sets. However, a joiner may operate in several different modes. In the "in-order mode," the joiner algorithm associated with the joiner component begins execution when the first consistent joiner input set arrives at the joiner input terminals. The first consistent joiner input set is associated with a first in order consistent splitter output set generated by the associated splitter component. The joiner algorithm continues to execute as and when the next consistent joiner input set arrives at the joiner input terminals wherein the next consistent joiner input set corresponds to the next in order consistent splitter output set generated by the associated splitter component. The joiner algorithm completes execution after all consistent joiner input sets have arrived in corresponding order at the joiner input terminals. All consistent joiner input sets correspond to all consistent splitter output sets generated by the associated splitter component. A queuing function, within the joiner component as a basic Java code, identifies the order of the consistent joiner input sets through a time-stamp or a sequence number. The queuing function delivers the consistent joiner input sets to the joiner associated algorithm in the specific order as the consistent splitter output sets were produced by the splitter component.

In the "at-end mode," the joiner algorithm associated with the joiner component begins execution when all consistent joiner input sets have arrived at the joiner input terminals. All consistent joiner input sets correspond to all consistent splitter output sets generated by the associated splitter component. The joiner algorithm completes execution at any time thereafter. The queuing function, within the joiner component, collects the consistent joiner input sets. It then passes all of the consistent joiner input sets as separate input to the joiner associated algorithm which then performs its computation to produce a single set of joiner output at a single joiner output time on a single or multiple joiner output terminals.

In the "any-order mode," the joiner algorithm associated with the joiner component begins execution when a first consistent joiner input set arrives at the joiner input terminals. The first consistent joiner input set corresponds to any consistent splitter output set generated by the associated splitter component. The joiner algorithm continues execution as and when a second consistent joiner input set arrives at the joiner input terminal wherein the second consistent joiner input set corresponds to any other consistent splitter output set generated by the splitter algorithm associated with the associated splitter component. The joiner algorithm completes execution after all consistent joiner input sets have arrived at the joiner input terminals. All consistent joiner input sets correspond to all consistent splitter output sets generated by the associated splitter component.

A variety of joiner and splitter components having different functions may be used to create and execute parallel loops. Representative joiner and splitter components are as follows. An array joiner component receives a number of inputs of the same type and produces an array in order. An array splitter component takes an input array and sends each element downstream. A collection joiner component receives a number of inputs and then outputs them in a java.util.Collection. A collection splitter component takes a java.util.Collection and outputs each item. A concatenation joiner component takes a number of strings and a separator (also a string), links them together in the order sent while inserting the separator into every pair of successive strings, and returns the final merged string. A line splitter takes a text input stream and separates it into lines. A pattern splitter takes an input stream (which is a java.util.regex pattern), a regular expression (a pattern as a string), and a group index (as an integer), breaks the input stream at every occurrence of the regular expression while removing the specified group in the regular expression, attaching the remainder of the regular expression to the next segment, and returns the resulting segments. So when the group with parentheses ( ) is specified, the group is eliminated when it is split—whatever is in the parentheses is consumed, as illustrated in Table 7.

TABLE 7

("aaxbb", x, 0) □ "aa", "bb"
("aaxbbxcc", "a(x)b" 1) □ "aa", "bbxcc"
("aaxbbxcc", axb, 0) □ "a", "bxcc"
("aaxbbxcc", ax ( ) b, 1 □ "aax", "bbxcc"

Both splitter and joiner components may periodically checkpoint by suspending execution and saving a set of values as their state. Splitter components do this periodically to commit their transaction and release tasks to downstream components. Joiners components typically do this when they run out of inputs to process before the finished signal arrives.

Figure 10A:
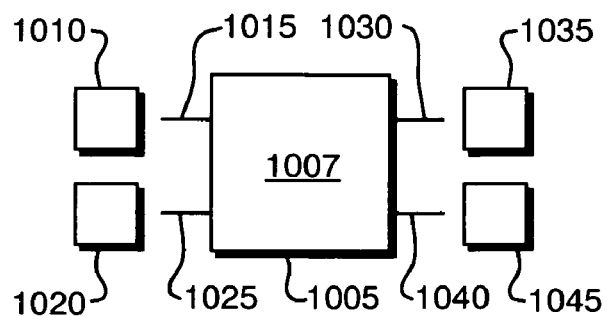
FIGS. 10A through 10C illustrate an exemplary component as implemented in connection with the present invention.
Figure 10B:
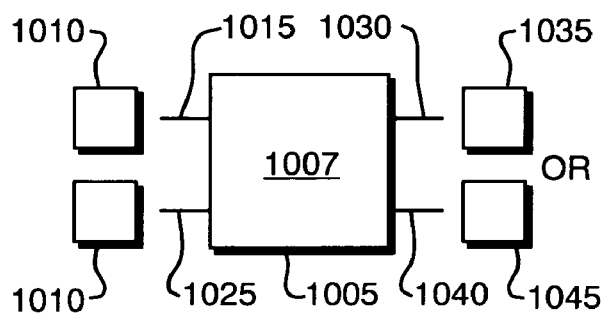
Figure 10C:
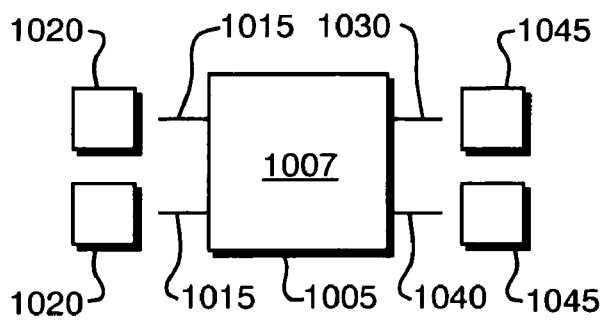

The method of the present invention also provides for the creation and execution of components that may receive No Value markers instead of valid data inputs on some of their input terminals or may provide No Value markers instead of valid data outputs to some of their output terminals. Such components may have some input terminals designated as required and other input terminals designated as optional. These functionalities apply to any type of component. When a No Value marker is received on a required input terminal, the component will not execute its associated computational algorithm, but will instead deliver a No Value marker to each of its output terminals, and those No Value markers will be delivered to any downstream components connected to the output terminals. FIG. 10A illustrates an exemplary component 1005 having a required input terminal 1015, an optional input terminal 1025, input comprising at least one of a valid data input 1010 or a No Value marker input 1020, a predefined associated computational algorithm 1007, at least one output terminal 1030, 1040 and at least one output comprising a valid data output 1035 or a No Value marker output 1045. While the exemplary component of FIG. 10A is illustrated with two input and two output terminals, the component of this invention may have any number of input terminals and output terminals. As illustrated in FIG. 10B, when the "required input component" 1005 has received inputs 1010, 1010 on all of its input terminals 1015, 1020, the predefined computational algorithm 1007 executes. Provided that none of the required input terminals 1015 receive a No Value marker input 1020, the component 1050 delivers one output 1035, 1045 to each output terminal 1030, 1040. These outputs may comprise at least one of valid data and No Value markers. As illustrated in FIG. 10C, when the component 1005 receives a No Value marker 1020 on one or more of the required input terminals 1015, the component 1005 delivers one No Value marker output 1045 to each output terminal 1030, 1040 and then performs no other action.

Figure 11A:
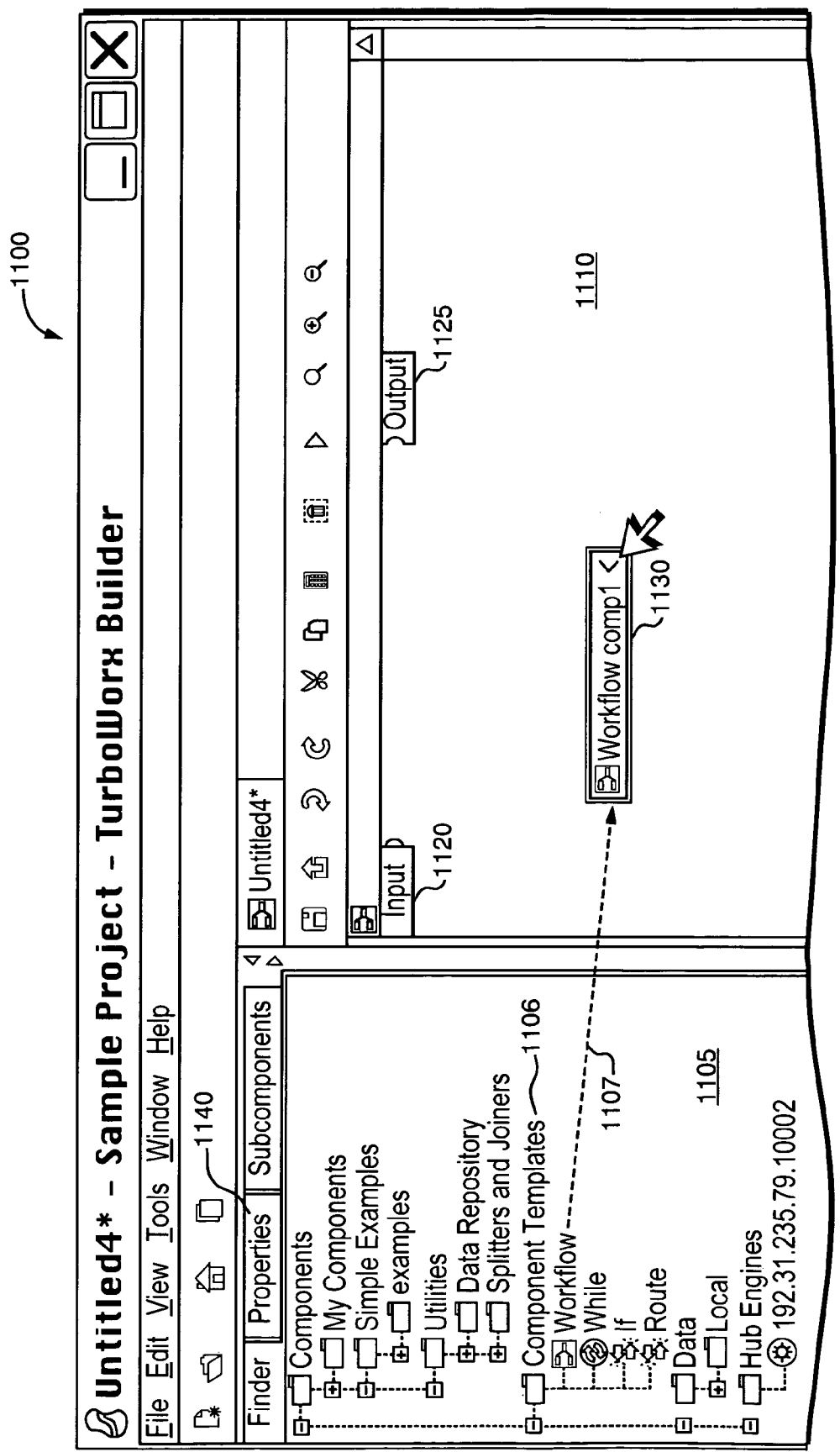
FIGS. 11 through 11D illustrates an exemplary graphical user interface that may be used for creating a dataflow component in connection with the present invention.
Figure 11B:
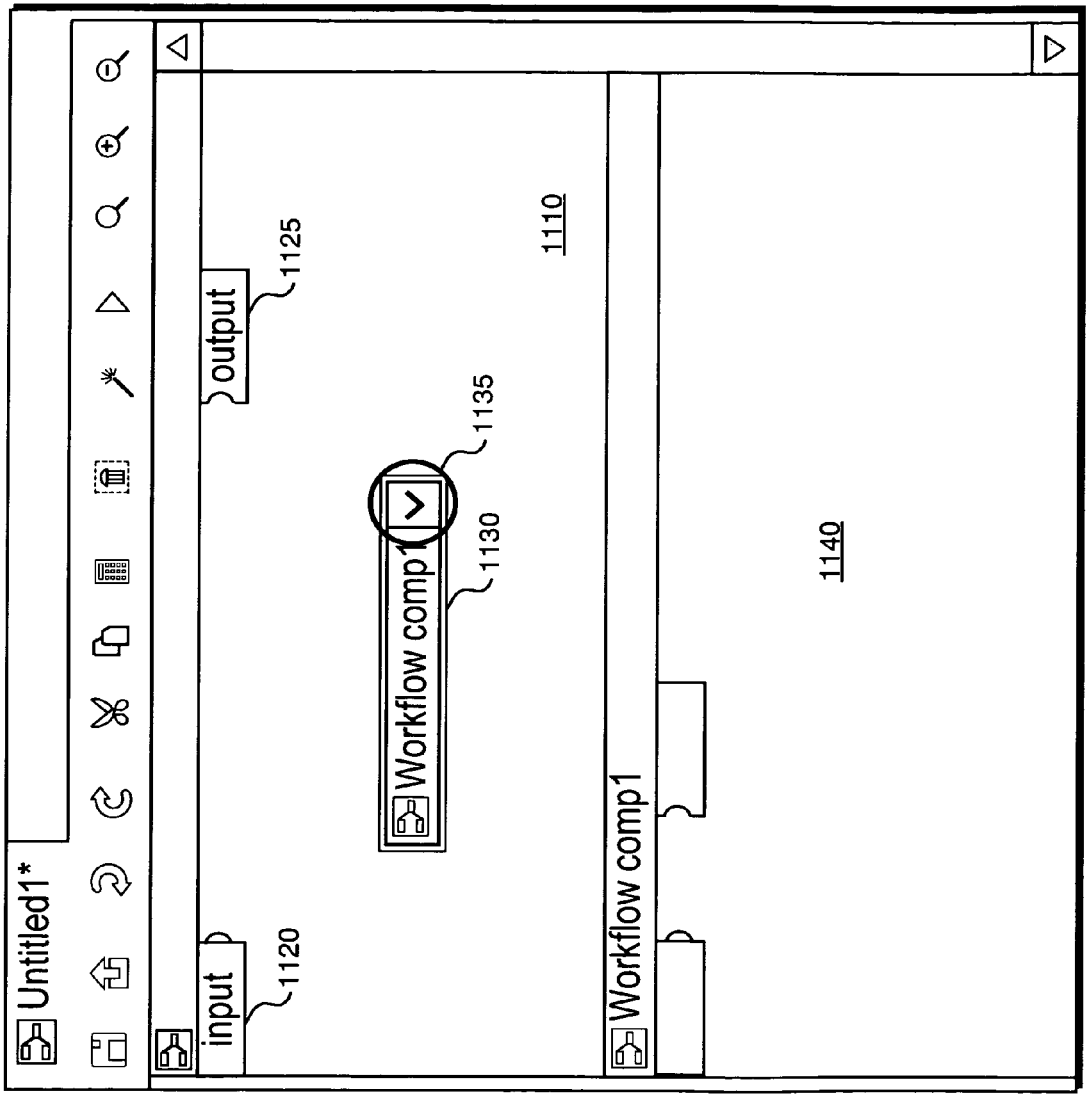
Figure 11C:
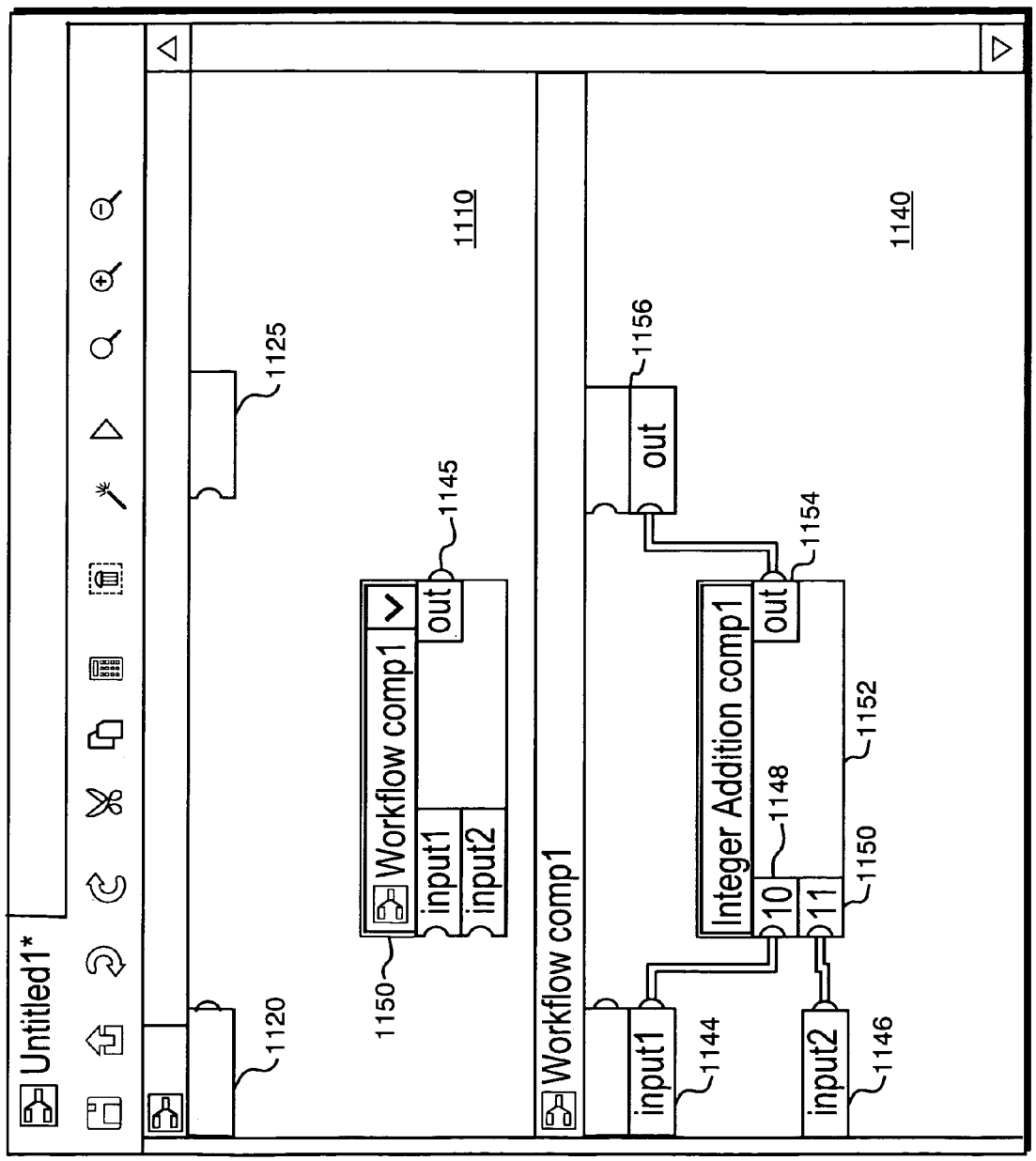
Figure 11D:
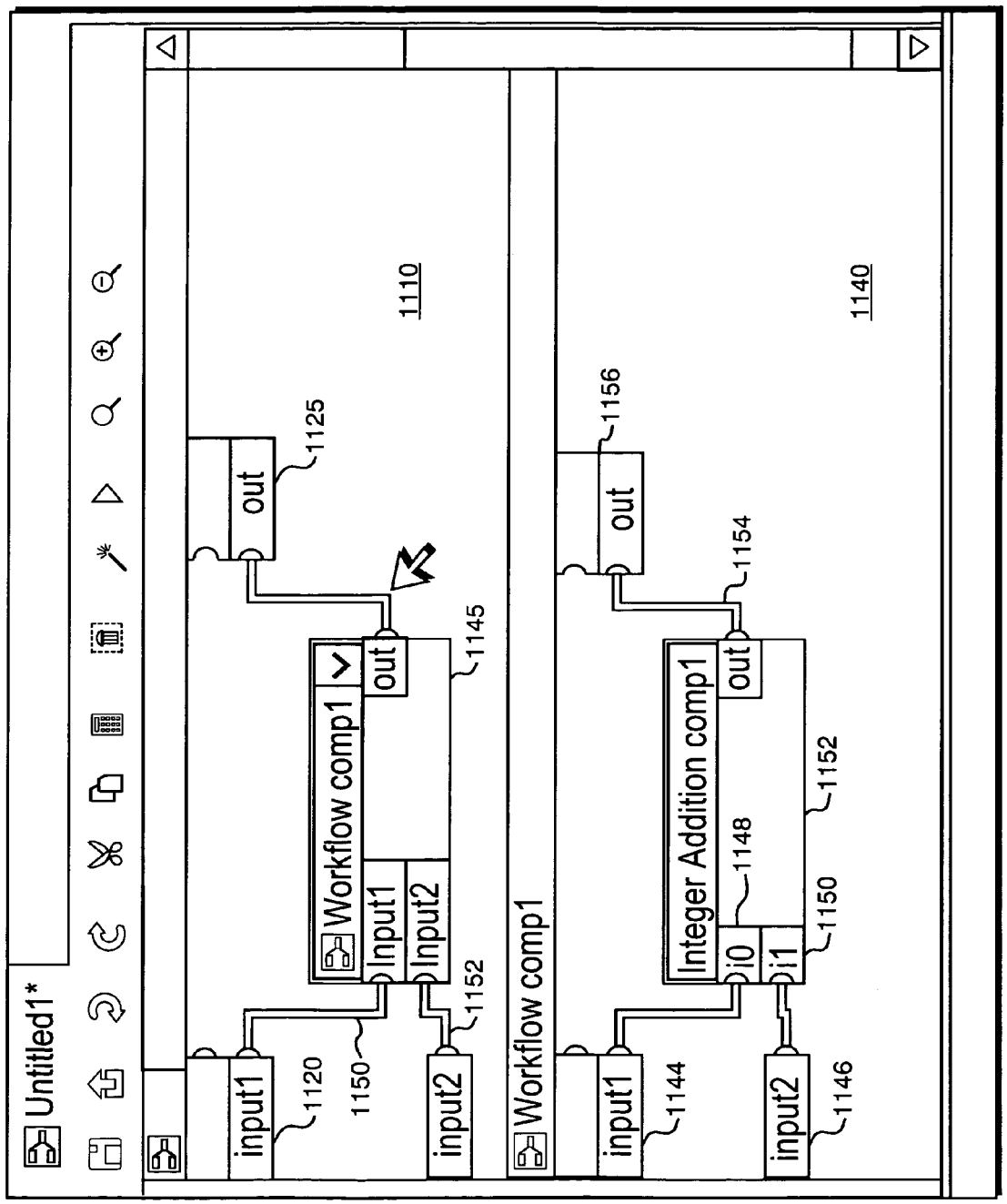

The method of the present invention also provides for the creation and execution of metaworkflow components using embedded subworkflows arranged in a hierarchical fashion. FIGS. 11A-11D illustrate the creation of an exemplary workflow component containing an embedded subworkflow. As illustrated in FIG. 11A, the main screen of GUI 1100 contains a finder panel 1105, a component work area 1110, a component templates folder 1106, a workflow icon 1107, a subworkflow component icon 1130, an input terminal template icon 1120 and an output terminal template icon 1125. To create the metaworkflow, the user clicks and drags the metaworkflow icon 1107 from the component templates folder 1106 in the finder panel 1105 into the component work area 1110. This creates a subworkflow component icon 1130 that represents the subworkflow. To build the subworkflow in the metaworkflow component, the user expands the subworkflow component icon 1130 by clicking on the v icon 1135 and a new, empty subworkflow panel 1140 appears where the user will create and modify the subworkflow, FIG. 11B. The user then builds the subworkflow by dragging and dropping component(s) 1152 or other item(s) from the finder panel 1105 to the subworkflow panel 1140, FIG. 11C. The user must create and connect any input terminals 1144, 1146 or output terminals 1156 required for the subworkflow. Each input terminal is created by connecting the input terminal template icon 1144, 1146 to an input terminal 1148, 1150 of a component in the subworkflow. Each output terminal is created by connecting an output terminal 1154 of a component 1152 in the subworkflow panel 1140 to the output terminal template icon 1156. As applicable, the user must also connect the input terminals of certain components in the subworkflow to the output terminals of other components in the subworkflow. The result is illustrated in FIG. 11C. Next as illustrated in FIG. 11D, the user creates input terminals for the metaworkflow by connecting the input terminal templates 1120 to the terminals 1150, 1152 of the subworkflow icon 1145 for the two inputs of the subworkflow. The user also creates an output terminal for the metaworkflow by connecting the output terminal 1146 of the subworkflow icon 1145 to the output terminal template icon 1125.

The metaworkflow is comprised of a collection of one or more embedded subworkflows and metadata in XML that describe the properties of the metaworkflow including the operational rules that determine how the metawork flow executes. The metadata may include one or more test conditions that are used to control the way the metaworkflow executes. Each of the subworkflows may have one or more input terminals and one or more output terminals and may contain one or more other components. The test conditions in the metadata may be embodied as expressions in a computer language such as Java, Jython, C, C++ or Perl or they may be embodied in other computable forms.

When a metaworkflow component is executed, the method provides for an optimization by waiting until the subworkflow is ready for execution before any steps are taken to prepare for execution of the subworkflow. This allows for a reduction in work in case the subworkflow is never executed for some reason.

Figure 12:
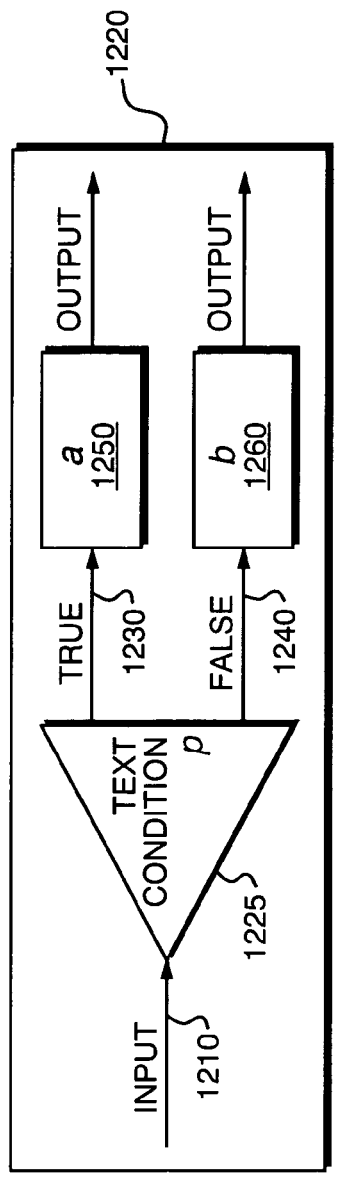
FIG. 12 illustrates an exemplary graphical user interface that may be used for creating a dataflow component in connection with the present invention.

In a further embodiment of an embedded subworkflow comprised of a hierarchical arrangement of subworkflows, the method of the present invention provides for the creation of Route components designed to have only two output terminals: a "true" output terminal and a "false" output terminal. With reference to FIG. 12, a route component 1220 is comprised of at least one input 1210, at least one corresponding input terminal 1215, a test expression 1225, a true output terminal 1230, and a false output terminal 1240. The true output terminal 1230 and the false output terminal 1240 are each connected to the input terminals of at least one downstream executable component. Upon execution, the route component 1220 delivers outputs to both the true output terminal 1230 and the false output terminal 1240 and exactly one of the outputs is a No Value marker. For example, input 1210 flowing into the input terminal 1215 of the route component 1220 is used to evaluate the defined test expression 1225. When the result of evaluating the test expression 1225 is a true value, a valid data output is passed on the true output terminal 1230 and a No Value output is passed on the false output terminal 1240. When the result of evaluating the test expression 1225 is a false value, a valid data output is passed on the false output terminal 1240 and a No Value output is passed on the true output terminal 1230.

When a Route metaworkflow is executed, the method provides for an optimization by waiting until the subworkflow is ready for execution before any steps are taken to prepare for execution of the subworkflow. This allows for a reduction in work in case the subworkflow is never executed for some reason, as would be the case if all the inputs to the Route component were No Value markers.

Figure 13A:
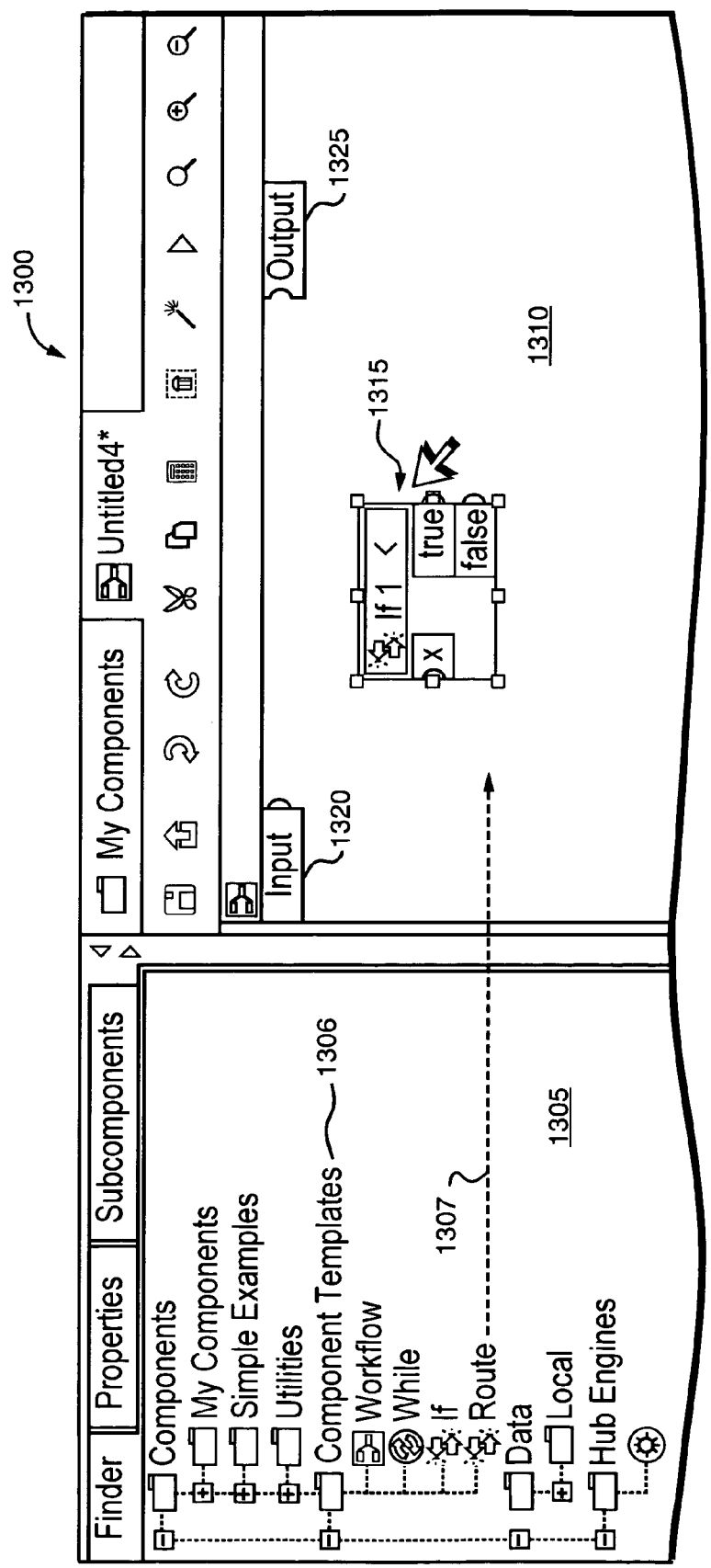
FIGS. 13A through 13C illustrate an exemplary graphical user interface that may be used for creating a dataflow component in connection with the present invention.
Figure 13B:
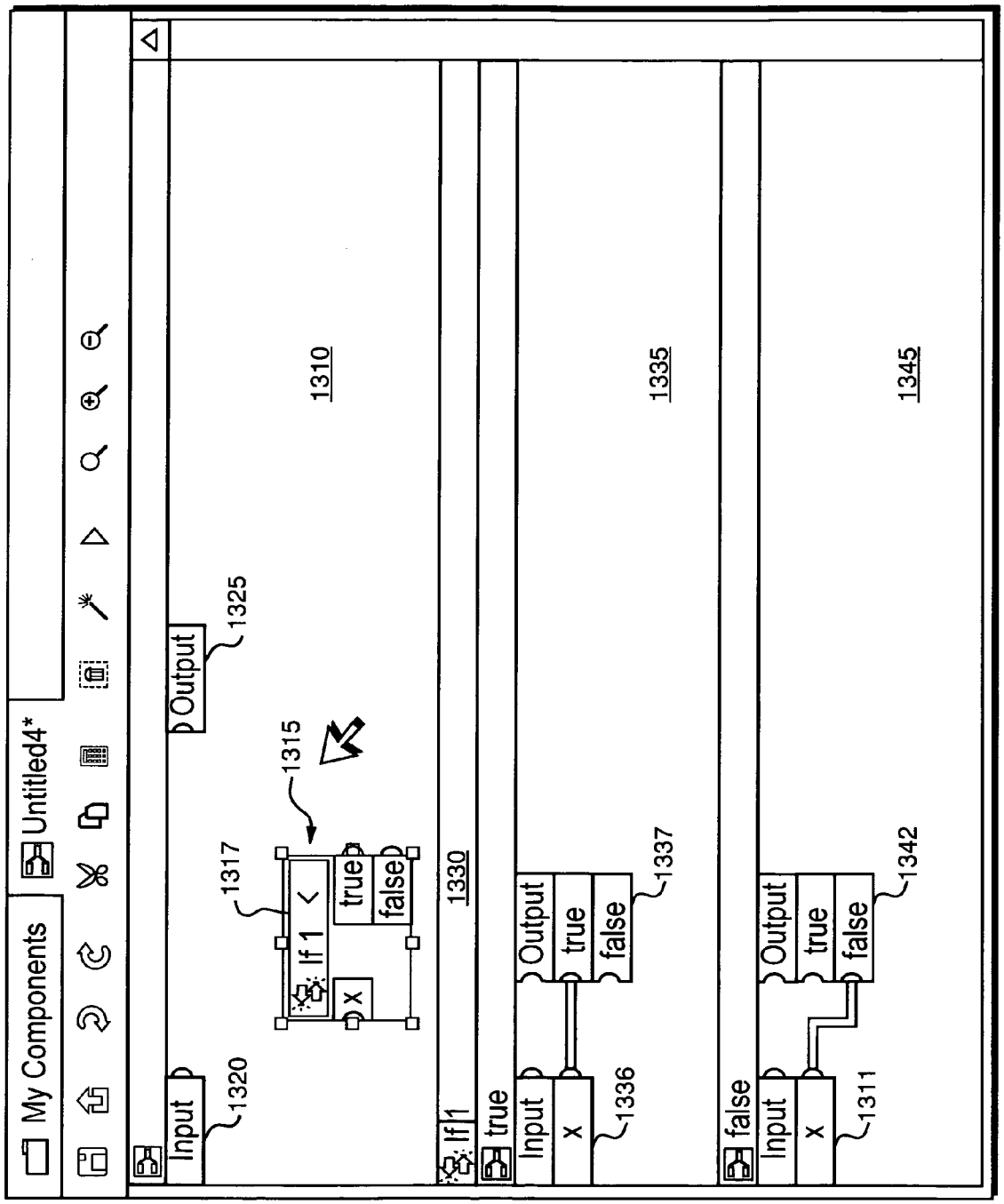
Figure 13C:
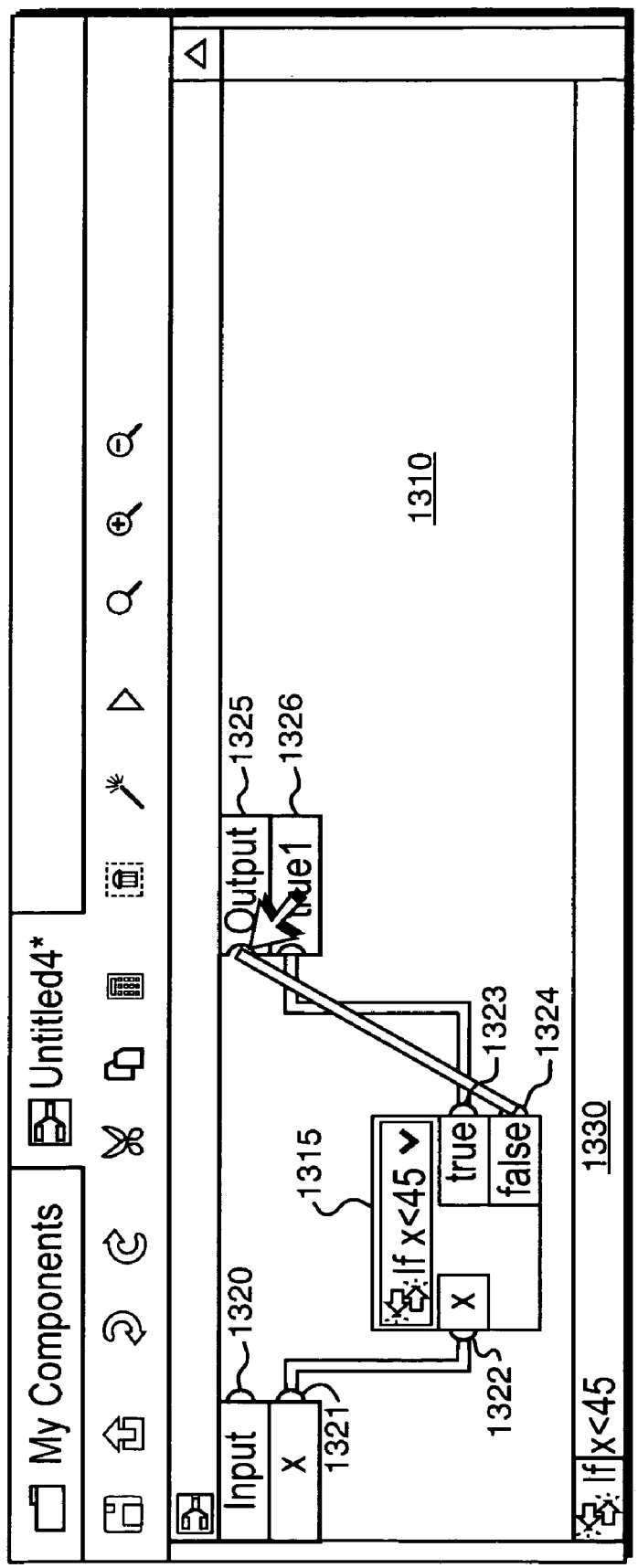

FIGS. 13A-13C illustrate the creation of an exemplary Route component. As illustrated in FIG. 13A, the main screen of GUI 1300 contains a finder panel 1305, a component work area 1310, a component template folder 1306, a component icon 1307, an input 1320, an output 1325, and a component 1315. To create the route component, a user first clicks, drags and drops component icon 1307 from the component templates folder 1306 in the finder panel 1305 to the component work area 1310. To define the test condition, the user clicks the < icon 1317 expanding the component work area to include an If test condition text box 1330, a true condition output/input connection area 1335 and a false condition input/output connection area 1340, FIG. 13B. The user types the test expression in the If test condition text box 1330 which must include the component input name and the condition. For example, if the user has assigned the default input as x, and the true test condition to be any integer less than 45, the expression would be x<45. To connect the route component 1315 to input terminal 1321 and output terminal 1326, the user clicks and drags the input 1322 to the input terminal 1326, FIG. 13C. The user then connects the true output 1323 and false output 1324 to the output terminals 1326 (or the input and output terminals of other components in the workflow).

Figure 14A:
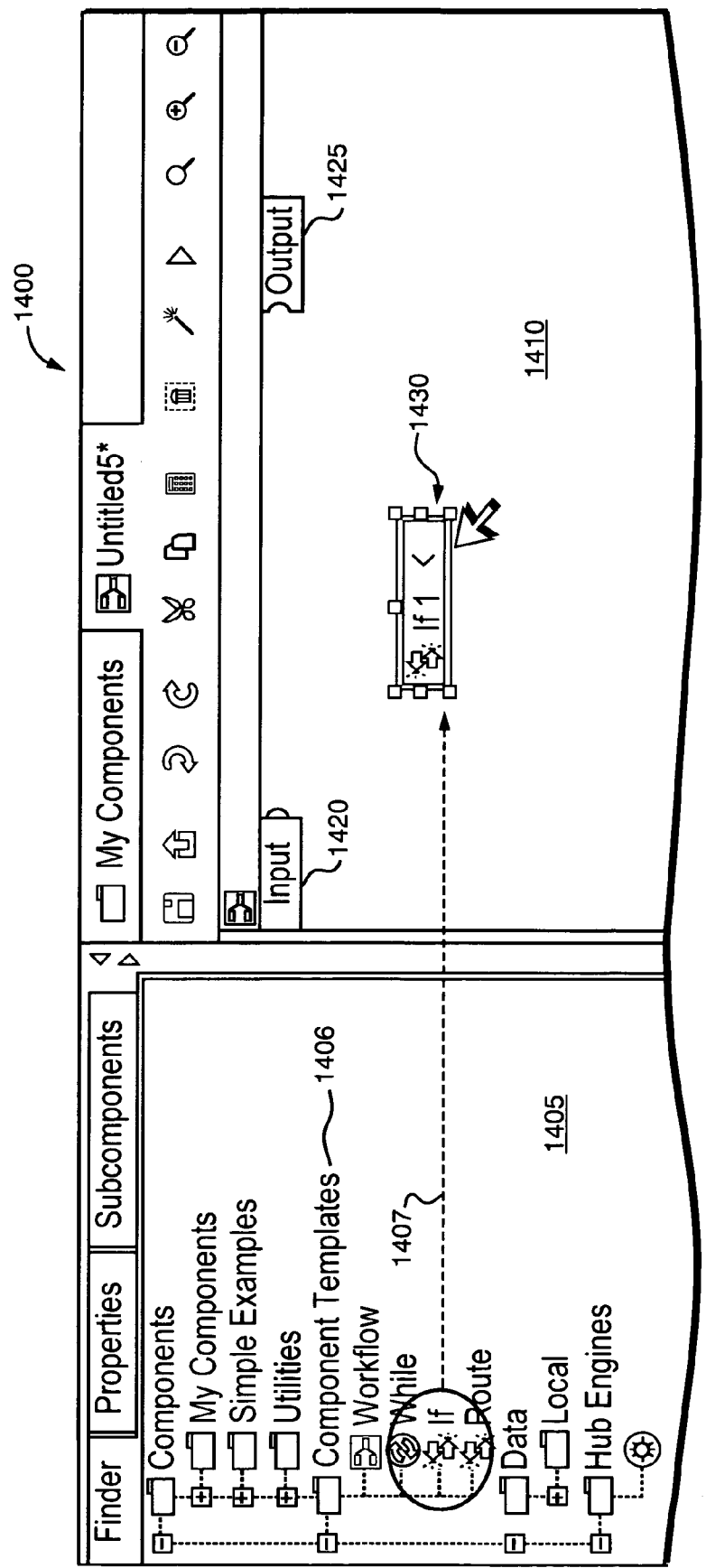
FIGS. 14A through 14D illustrate an exemplary graphical user interface that may be used for creating a dataflow component in connection with the present invention.
Figure 14B:
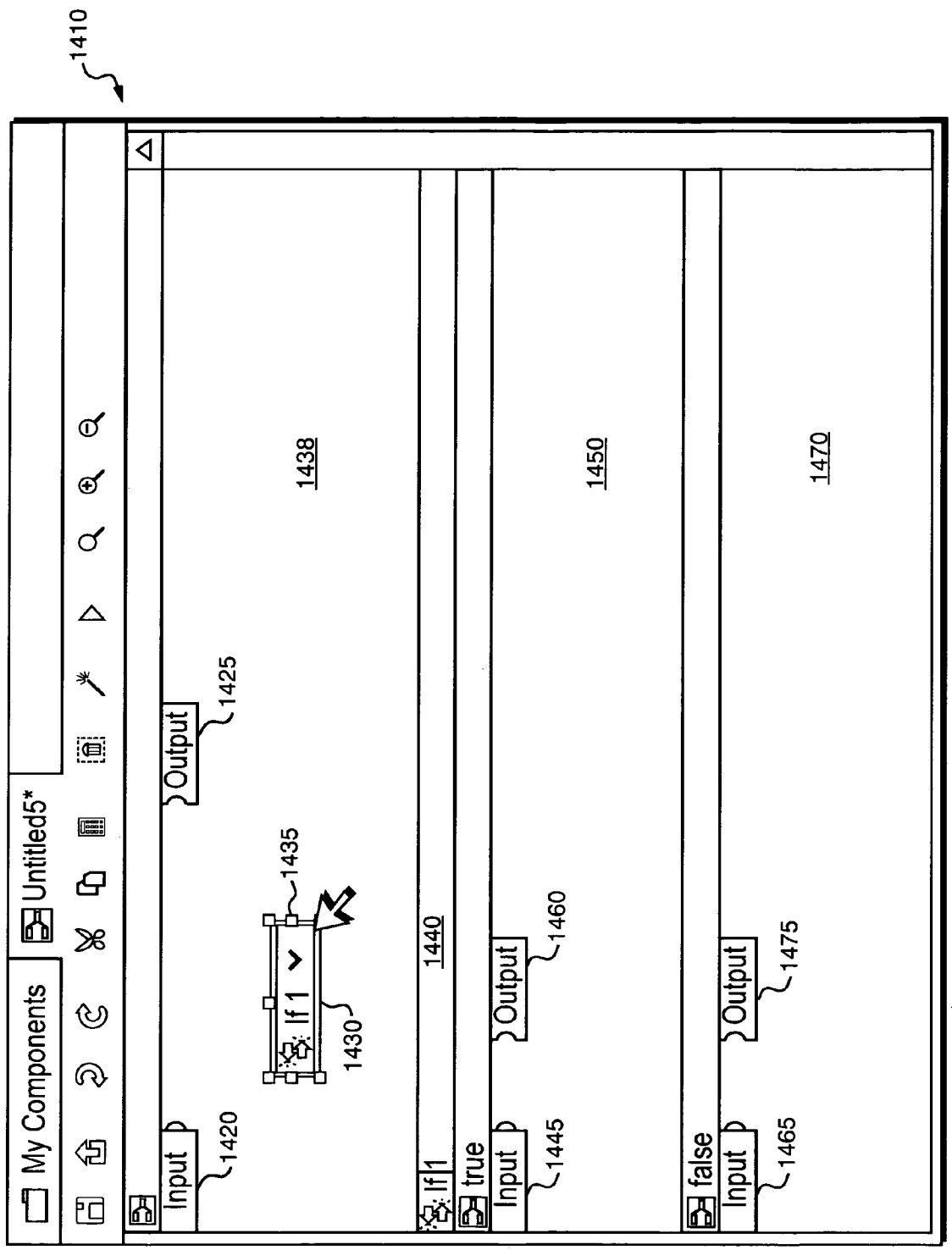

In another further embodiment of an embedded subworkflow comprised of a hierarchical arrangement of subworkflows, the method of the present invention provides for the creation and execution of an If-Then-Else component An If-Then-Else component uses the logic of If p then a else b where p is a propositional (or test) expression whose value is true or false, and a and b are subworkflows. The output of the If-Then-Else component is the value produced by a if p has the value true, and it is the value produced by b if p has the value false. The creation of an exemplary If-Then-Else metaworkflow is illustrated in FIGS. 14A-14D. As illustrated in FIG. 14A, the main screen of GUI 1400 contains a finder panel 1405, a component work area 1410, a component templates folder 1406, an If component icon 1407 and an If component 1430. The user drags and drops the If icon 1407 from the component templates folder 1406 in the finder panel 1405 to the component work area 1410. An If-Then-Else component is a metaworkflow that has a metaworkflow input, a metaworkflow output, a set of metaworkflow input terminal icons 1420, a set of metaworkflow output terminal icons 1425, and a test expression entry area 1440, FIG. 14B. The metaworkflow consists of a test expression and two metaworkflow associated executable subworkflows: a first metaworkflow associated executable subworkflow referred to as the Then subworkflow and a second metaworkflow associated executable subworkflow referred to as the Else subworkflow. Each of the two subworkflows has a set of corresponding input terminals 1455, 1465 and a set of corresponding output terminals 1460, 1475. The input terminals 1455, 1465 of each subworkflow are required to be identical to the input terminals 1420 of the metaworkflow, and inputs to the metaworkflow will be delivered to the input terminals 1455, 1465 of the subworkflows if the subworkflows are executed. The output terminals 1460, 1475 of each subworkflow are required to be identical to the output terminals 1425 of the metaworkflow, and the outputs of either subworkflow are delivered to the output terminals 1425 of the metaworkflow if either subworkflow is executed. The test expression has access to all the inputs of the If-Then-Else component, but it produces no outputs delivered to any output terminals. The user clicks on the < icon 1435 to open the panels to define the test expression. The user types the test expression in the If test condition text box 1440. The test condition can be any valid Jython expression involving the input variables that produces a Boolean value. To calculate the value of the test expression, other programming languages such as C or C++ or Perl may be used. In addition, one could use something other than an expression, so long as it eventually produced a Boolean value (true or false).

Figure 14C:
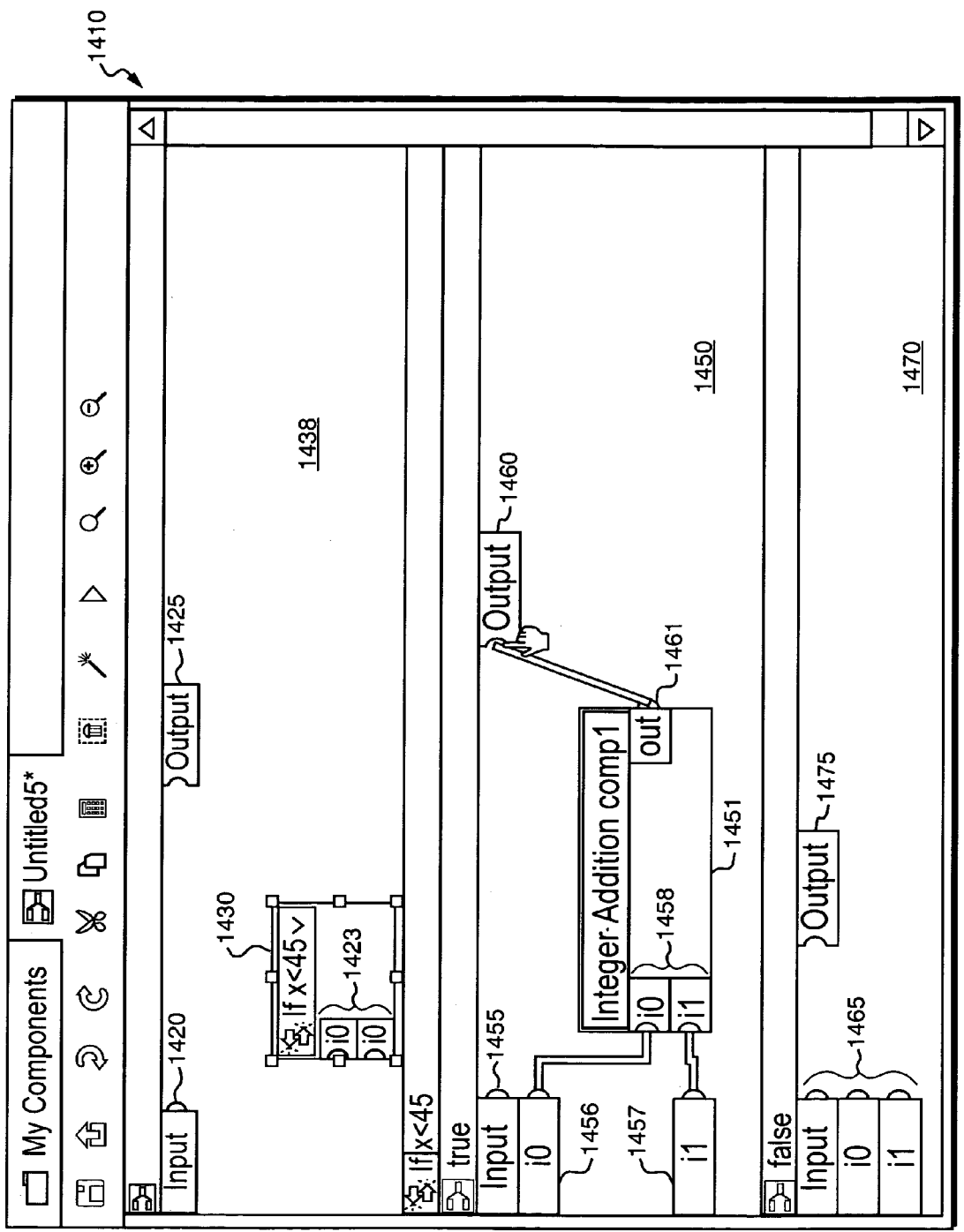
Figure 14D:
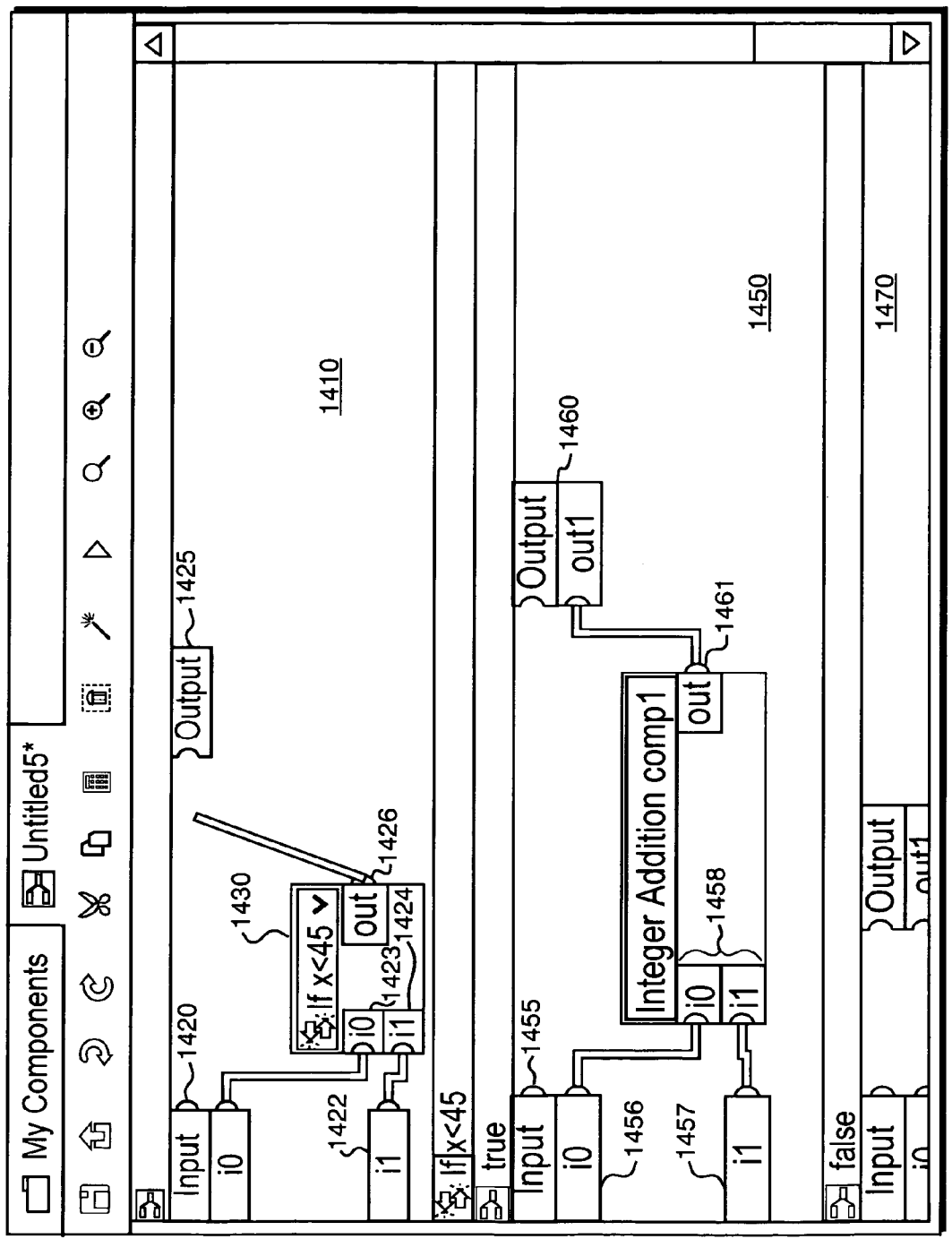

To specify the Then subworkflow that will execute if the result of the test expression is true, the user builds a subworkflow in the True panel 1450 by dragging and dropping components or other items from the finder panel and connecting them together, FIGS. 14C and 14D. In addition, the user creates input terminals 1455, 1457 and output terminals 1460 in the True panel 1450 for the True subworkflow and connects them to the components 1461 in the subworkflow. Input terminals 1455, 1457 and output terminals 1460 created in the True panel 1450 automatically appear as input terminals 1465 and output terminals 1475 in the False panel 1470 and in the component panel 1438 since it is required that the metaworkflow and the two subworkflows have identical input terminals and output terminals. In the exemplary illustration, the True subworkflow 1450 consists of a single component 1430 that adds two numbers. The user creates two input terminals labeled i0 1423 and i1 1424 for the two input numbers, and the user creates one output terminal 1426 labeled out for the result of the addition The input terminals labeled i0 1423 and i1 1424 are the inputs for the Addition component 1451 used in the illustrative Then subworkflow. Corresponding terminals i0 1456 i1 1457, and out terminal 1461 appear automatically in the component panel 1438 and the False panel 1470.

To specify the Else subworkflow that will execute if the result of the test expression is false, the user builds a subworkflow in the False panel 1470 by dragging and dropping components or other items from the finder panel and connecting them together. In addition, the user creates input and output terminals in the False panel for the False subworkflow and connects them to the components in the subworkflow. Input and output terminals created in the False panel automatically appear as additional input and output terminals in the True panel and in the component panel since it is required that the metaworkflow and the two subworkflows have identical input terminals and output terminals. In the exemplar illustration, the False subworkflow contains no components, so no computation will be performed if the result of the test condition is false. In that case, a No Value marker is delivered to the output terminal.

When an If-Then-Else component executes it operates according to the following rules. Evaluation of the conditional test expression delivers no outputs to the If-Then-Else component output terminals. If executed, each of the Then and Else subworkflows delivers one output to each of the If-Then-Else component output terminals. Evaluation of the test expression computes a single distinguishable value. If evaluation of the conditional test expression computes the distinguishable value, then only the Then subworkflow is executed. If evaluation of the conditional test expression does not compute the distinguishable value, then only the Else subworkflow is executed.

It is evident that during execution of an If-Then-Else component, only one of the Then subworkflow or the Else subworkflow will execute depending on the result of the evaluation of the test expression. To optimize the execution of an If-Then-Else component, the method provides for waiting until after the evaluation of the test expression before performing any work to prepare for execution of the Then subworkflow or the Else subworkflow. After evaluation of the test expression, the preparatory work need only be performed for the subworkflow that will actually be executed.

Figure 15:
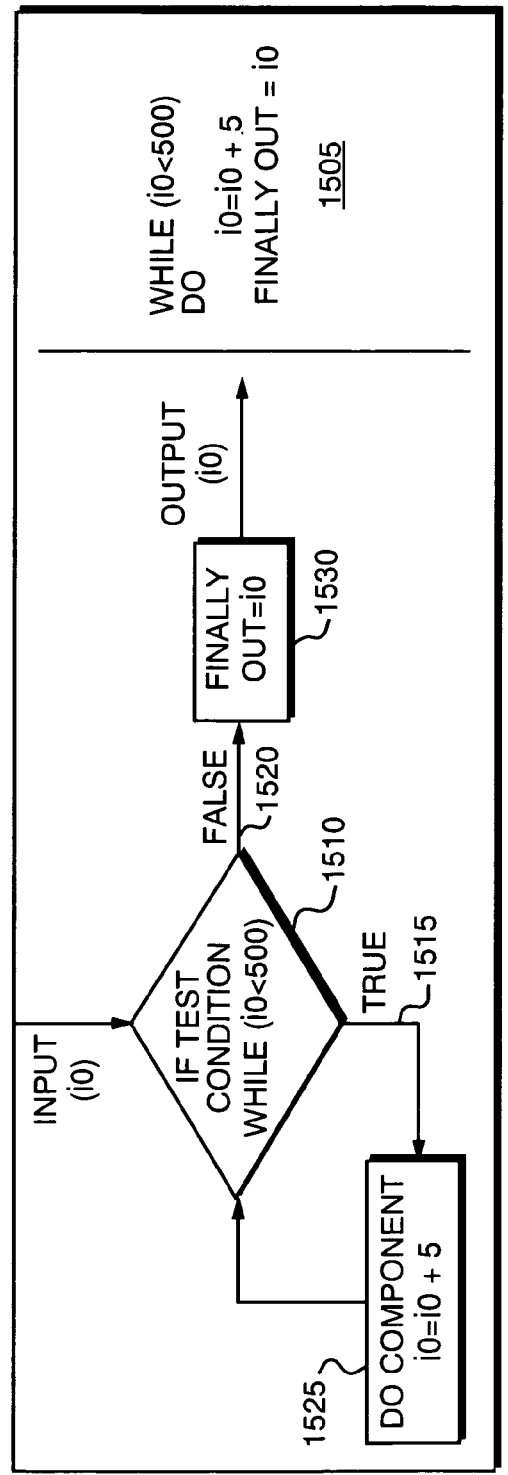
FIG. 15 illustrates an exemplary component as implemented in connection with the present invention.

In a further embodiment of a subworkflow comprised of a hieracial arrangement of components, the method of the present invention also provides for construction of While loop components. A While loop component is a metaworkflow containing a test expression and two subworkflows, the Do subworkflow and the Finally subworkflow where the Do subworkflow is executed repeatedly and iteratively as long as the test expression is true, after which the Finally subworkflow is executed once. An exemplary while loop is illustrated in FIG. 15. The while statement 1505 contains a test expression 1510 with true 1515 or false 1520 results. The Do subworkflow 1525 is executed repeatedly and iteratively, until the test condition 1510 is no longer met (false) 1520. The false value causes the do subworkflow 1525 execution to terminate and causes the execution of the Finally subworkflow 1530. Either of the Do subworkflow or the Finally subworkflow may simply pass inputs from its input terminals to its output terminals without other processing. The while loop subworkflows are subject to three constraints. First, the output terminals of the Do subworkflow must be identical to the input terminals of the Do subworkflow because the iteration may cause the outputs delivered to the output terminals of the Do subworkflow in one iteration to be received by the input terminals of the Do subworkflow in next iteration. Second, the input terminals of the Finally subworkflow must be identical to the output terminals of the Do subworkflow because the outputs delivered to the output terminals of the Do subworkflow in the final iteration will be received by the input terminals of the Finally subworkflow after the test condition fails to be met. Third, the output terminals of the Finally subworkflow must be identical to the output terminals of the While loop metaworkflow because the outputs delivered to the output terminals of the Finally subworkflow will be delivered directly to the output terminals of the While loop metaworkflow.

Figure 16A:
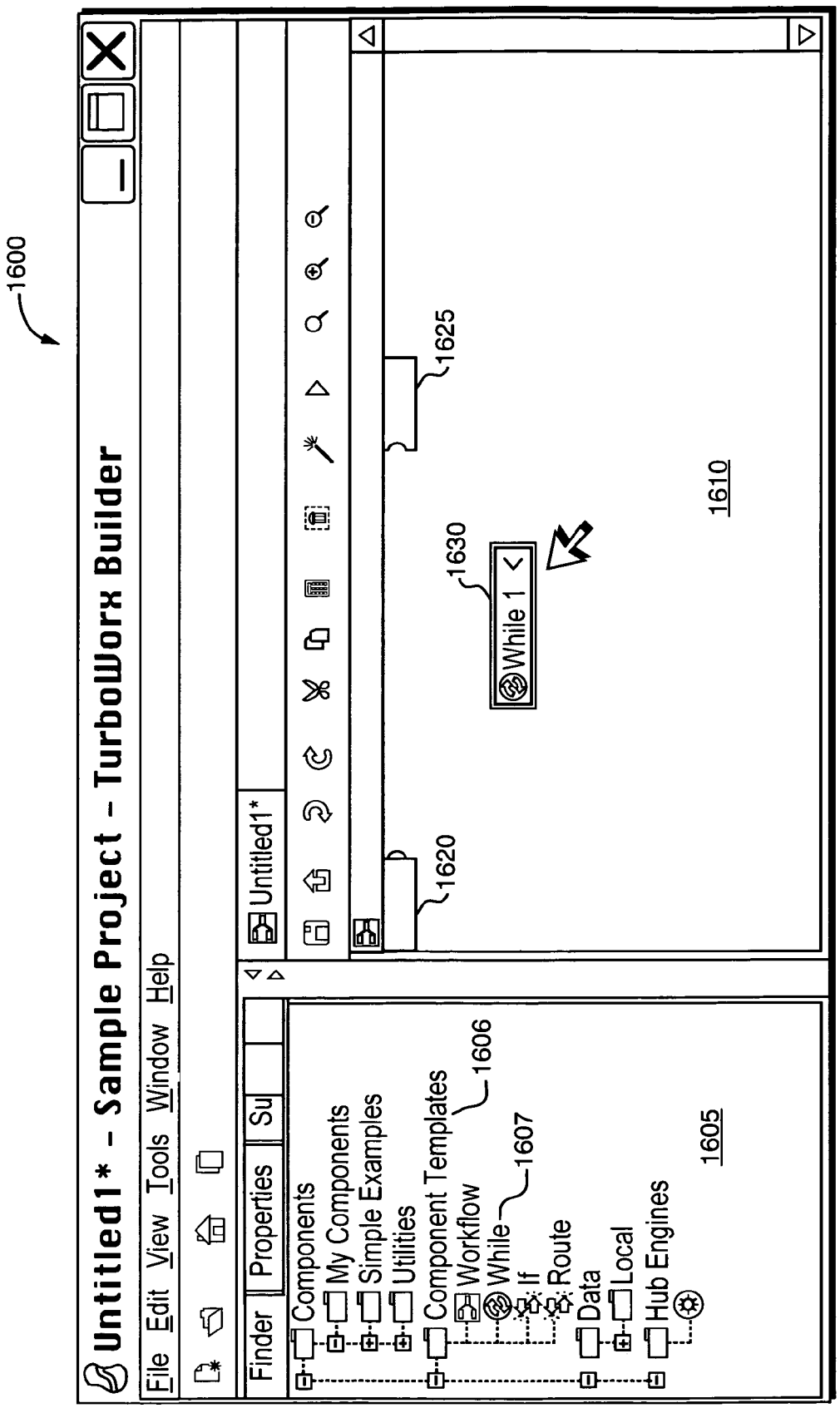
FIGS. 16A through 16H illustrate an exemplary graphical user interface that may be used for creating a dataflow component in connection with the present invention.
Figure 16B:
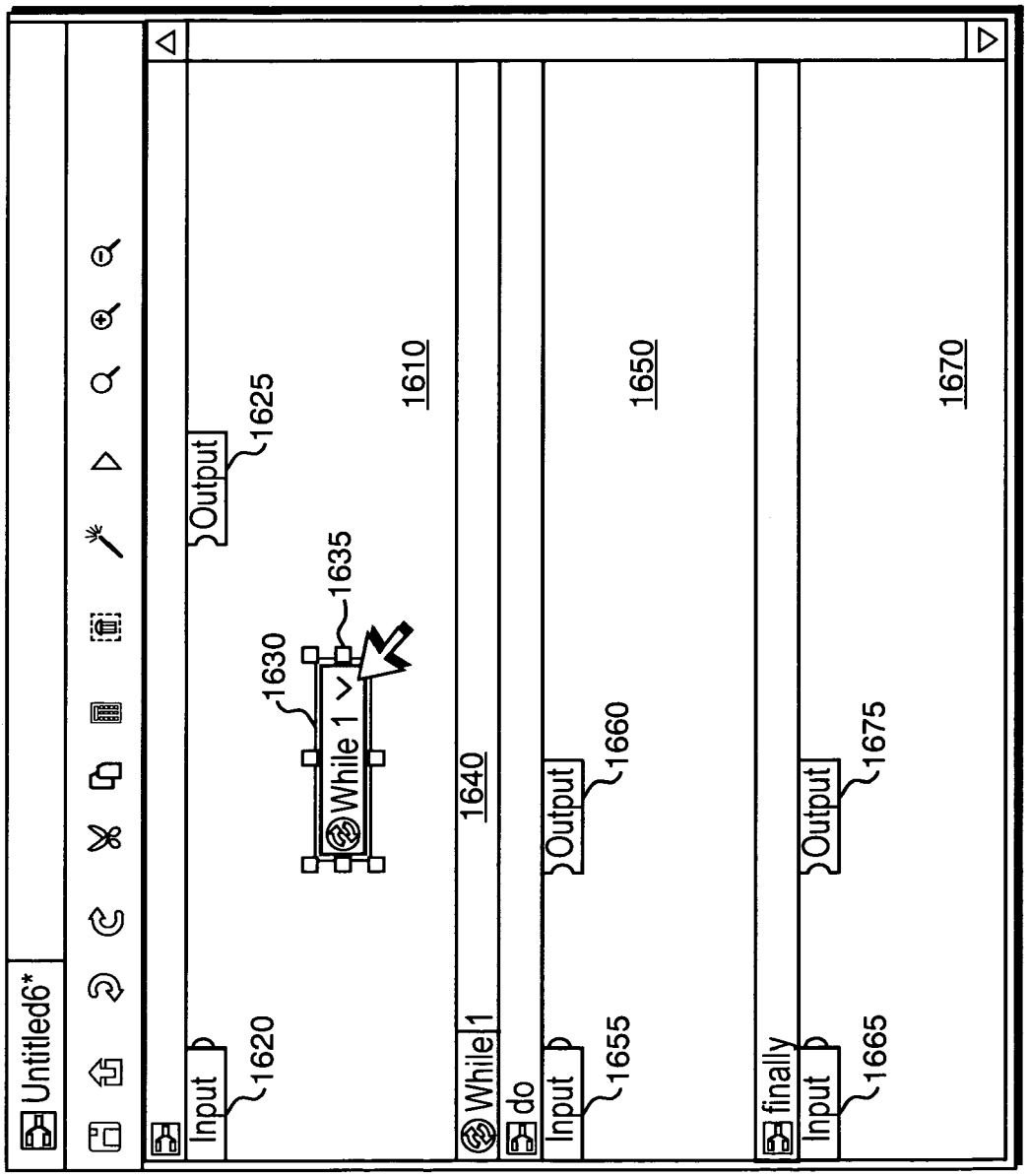

The creation of an exemplary While loop component is illustrated in FIGS. 16A-16H. The main screen 1600 of GUI contains a finder panel 1605, a component work area 1610, a component templates folder 1606, and a while subworkflow icon 1607. From the component templates folder 1606 in the finder panel 1605, the user drags and drops the while icon 1607 to the component work area 1610, FIG. 16A. The user clicks on the < button 1635 in While icon 1630 and new panels 1650, 1670 appear in the lower half of the work area allowing the user to define the parts of the While loop metaworkflow. As illustrated in FIG. 16B, the metaworkflow has a metaworkflow input, a metaworkflow output, a set of metaworkflow input terminals 1620, and a set of metaworkflow output terminals 1625. The metaworkflow consists of a test expression and two metaworkflow associated executable subworkflows: a first metaworkflow associated executable subworkflow referred to as the Do subworkflow and a second metaworkflow associated executable subworkflow referred to as the Finally subworkflow. Each of the two subworkflows has a set of corresponding input terminals 1656-1657, 1666-1667 and a set of corresponding output terminals 1662-1663, 1676. The input terminals of the each of the two subworkflows are required to be identical to the input terminals of the While loop metaworkflow, and inputs to the While loop metaworkflow will be delivered to the input terminals of either of the two subworkflows if the subworkflows are executed. The output terminals of the Do subworkflow are required to be identical to the input terminals of the While loop metaworkflow. The output terminals of the Finally subworkflow are required to be identical to the output terminals of the While loop metaworkflow. The user enters a test expression into the While test box 1640. The test expression computes a Boolean value (true or false) before each iteration. The test expression has access to all the inputs of the While loop metaworkflow, but it produces no outputs delivered to any output terminals. The test expression can be any valid Jython expression involving the inputs to the While loop metaworkflow that produces a Boolean value. The test expression could also be an expression in other programming languages such as C or C++ or Perl. In addition, one could use something other than an expression, so long as it eventually produced a single distinguishable value.

Figure 16C:
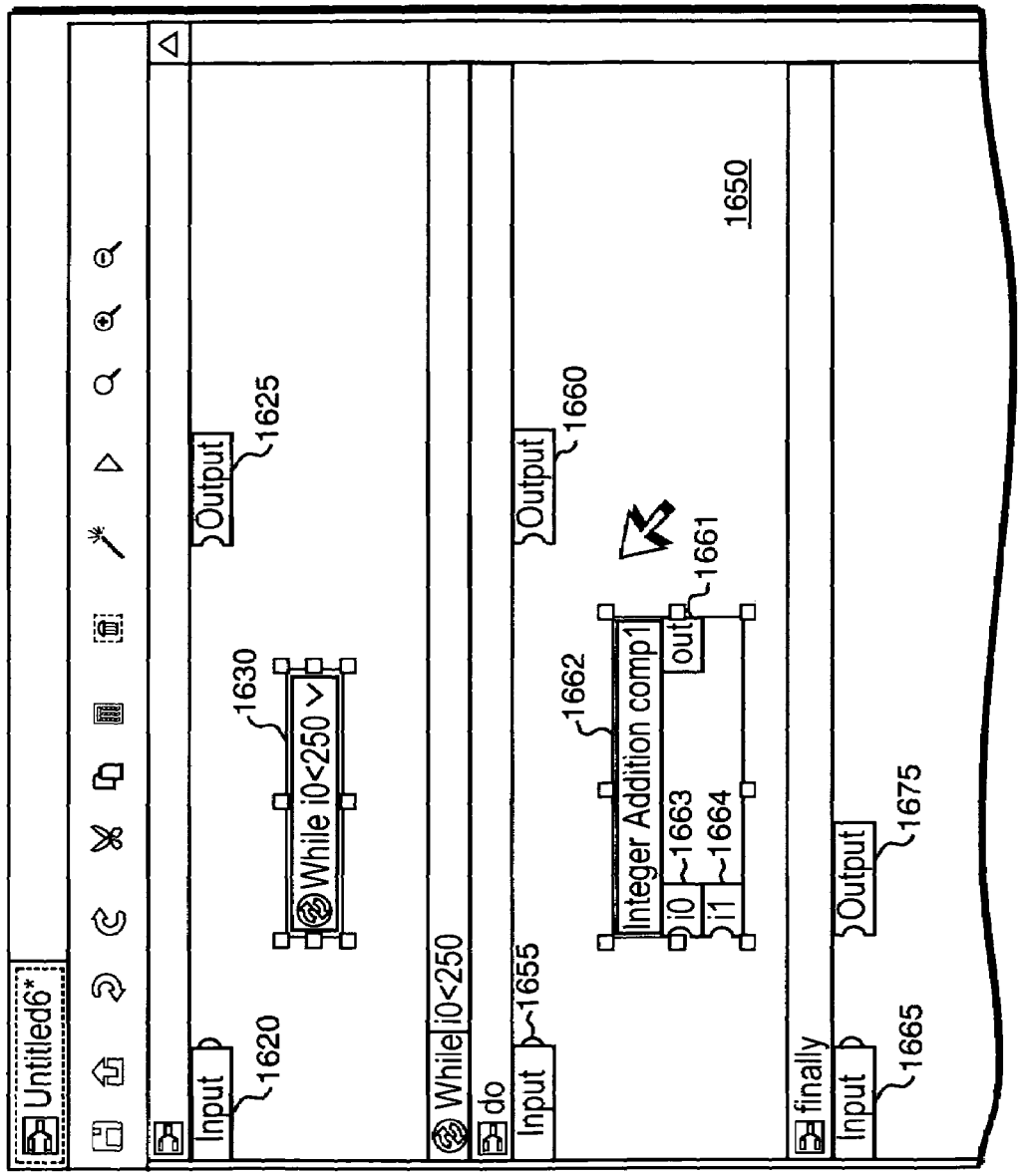
Figure 16D:
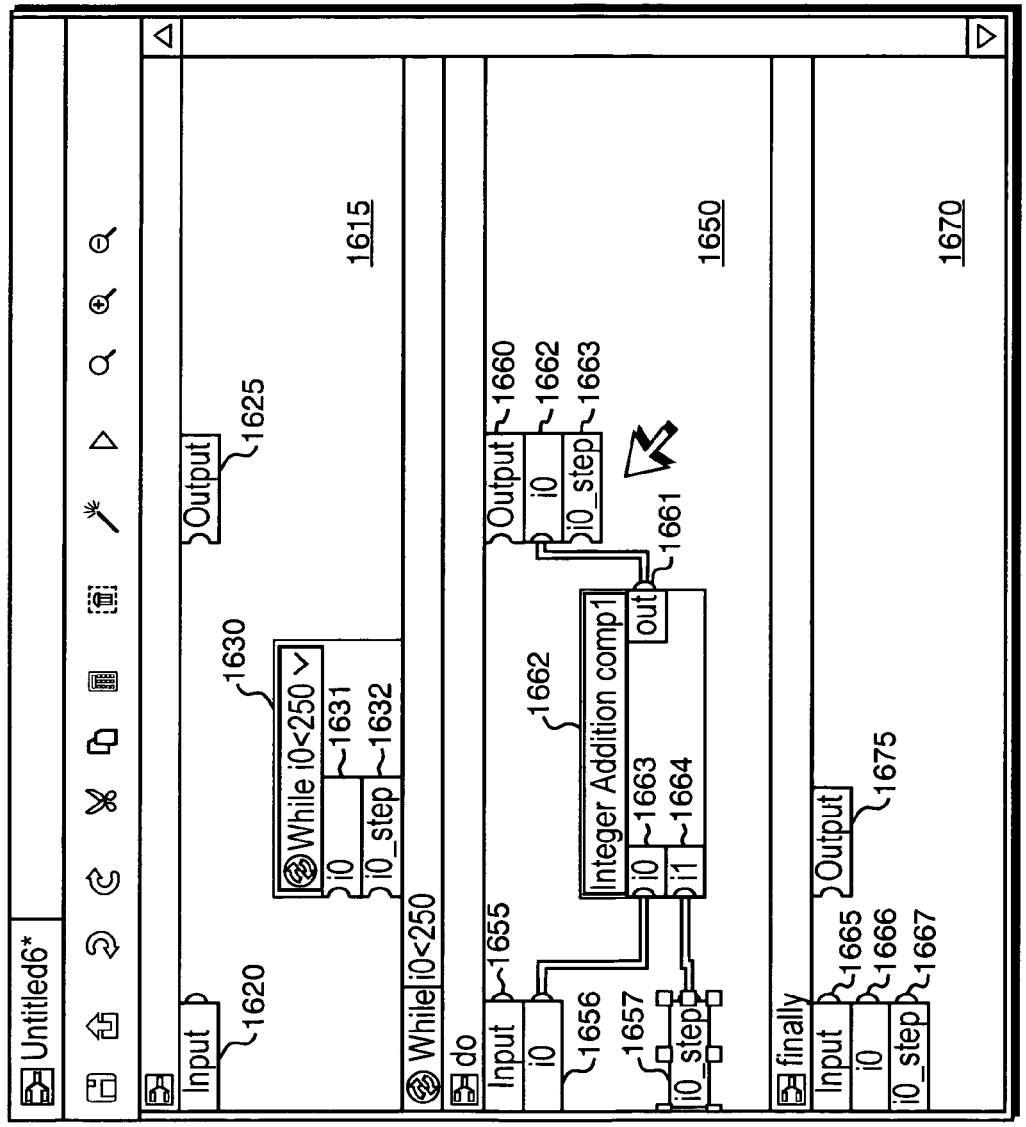
Figure 16E:
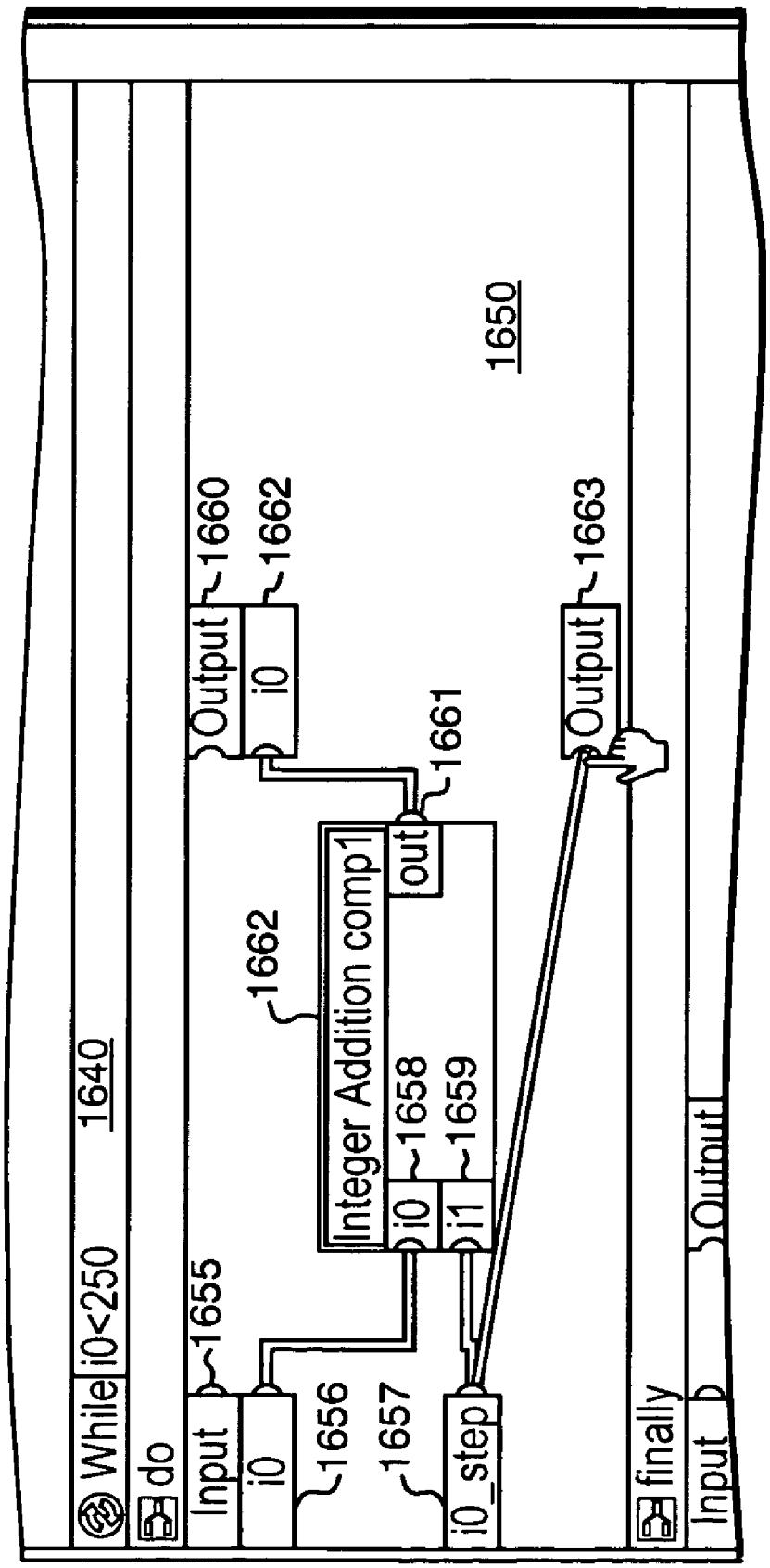
Figure 16F:
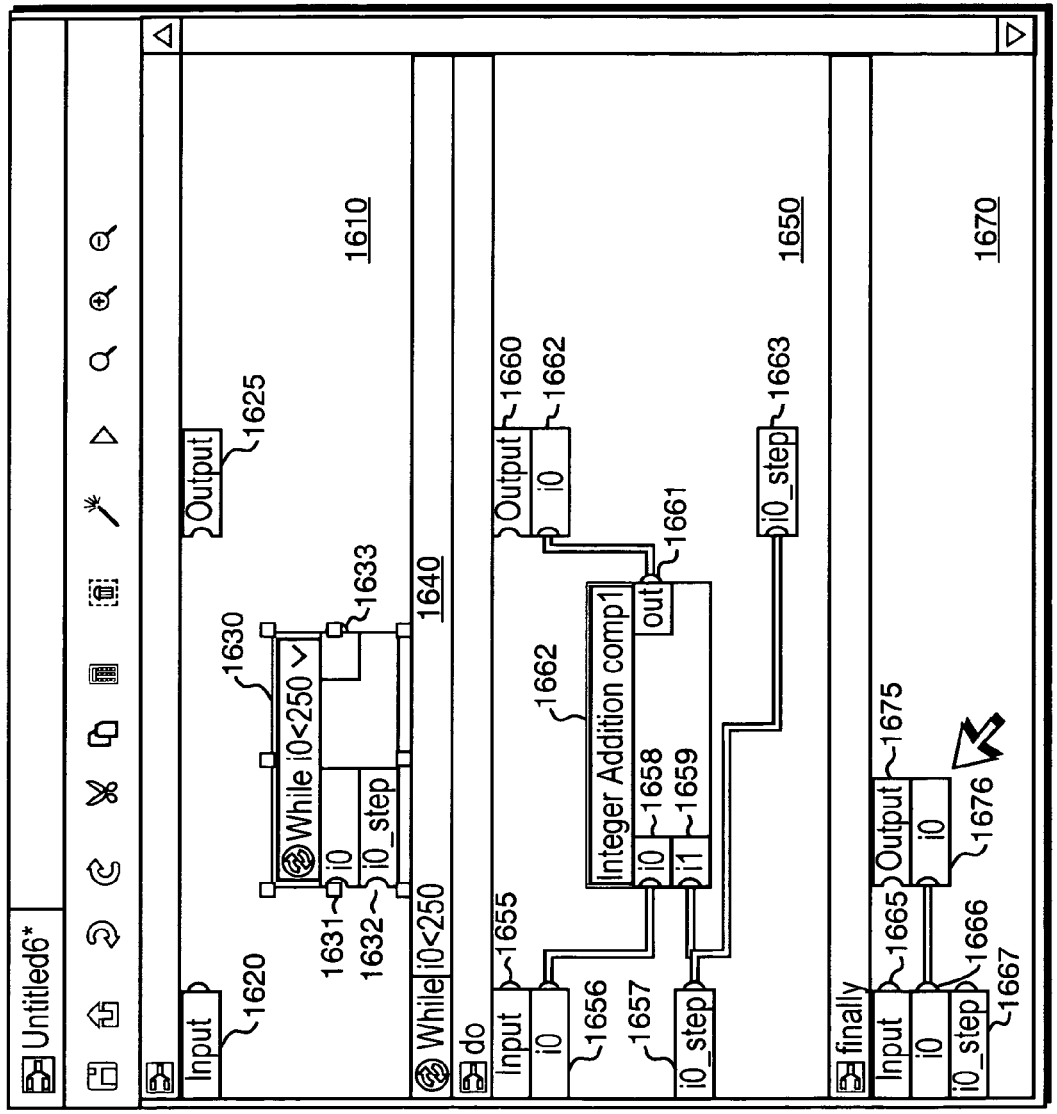
Figure 16G:
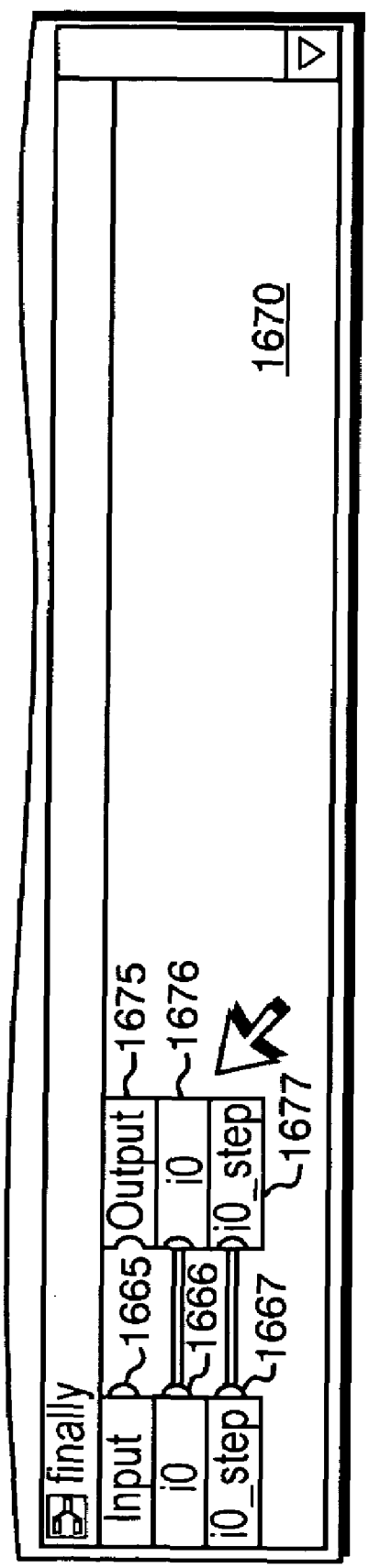
Figure 16H:
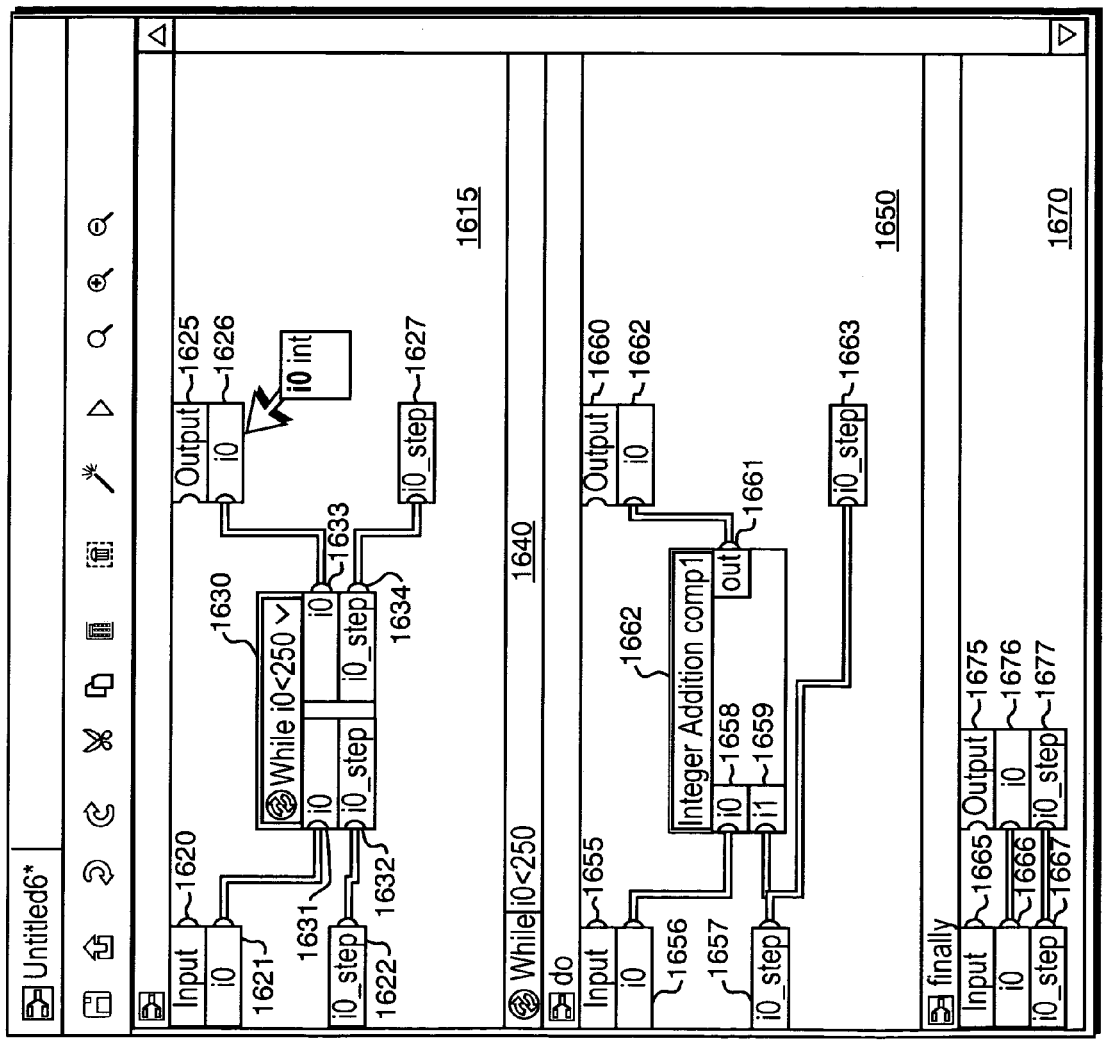

As illustrated in FIG. 16C, to specify the Do subworkflow that will execute if the result of evaluating the test expression is true, the user builds a subworkflow in the Do panel 1650 by dragging and dropping components 1662 or other items from the finder panel 1605 and connecting them together. In addition, the user creates input terminals 1665 and output terminals 1660 in the Do panel 1650 for the Do subworkflow. Input terminals 1665 created in the Do panel 1650 automatically appear as output terminals 1660 in the Do panel 1650 and as input terminals in both the Finally panel 1670 and the component panel 1615 since it is required that the input terminals of the While loop metaworkflow, the input terminals and output terminals of the Do subworkflow, and the input terminals of the Finally subworkflow all be identical. In the exemplary illustration, the Do subworkflow consists of a single component that adds two numbers. The user creates two input terminals labeled i0 1663 and i0_step 1664 for the two input numbers 1656, 1657, and correspondingly labeled terminals appear automatically as output terminals 1662, 1663 in the Do panel 1650 and as input terminals 1656, 1657 in the component panel 1615 and the Finally panel 1670, FIGS. 16D and 16E. The user then connects the input terminals 1656, 1657, 1658, 1659 and output terminals 1661, 1660, 1662 in the Do panel 1650 as appropriate to direct the flow of data in the Do subworkflow. In each loop iteration in the exemplary illustration in FIG. 16, an initial value denoted as i0 is repeatedly incremented by the constant value denoted as i0_step. Both values are carried along from one iteration to the next, although i0_step remains constant, while i0 changes.

To specify the Finally subworkflow that will execute if the result of evaluating the test condition is false, the user builds a subworkflow in the Finally panel by dragging and dropping components or other items from the finder panel and connecting them together. In addition, the user creates output terminals 1675, 1676, 1677 in the Finally panel 1670 for the Finally subworkflow and connects them to the components in the Finally subworkflow. Output terminals 1675, 1676, 1677 created in the Finally panel 1670 appear automatically as additional output terminals in the component panel 1615 since it is required that the While loop metaworkflow and the Finally subworkflow have identical output terminals. The user may also create input terminals 1665, 1666, 1667 in the Finally subworkflow, in which case those terminals appear automatically as input terminals in the component panel 1615 and as both input and output terminals in the Do panel 1650 since it is required that the input terminals of the While loop metaworkflow, the input terminals and output terminals of the Do subworkflow, and the input terminals of the Finally subworkflow all be identical. In the exemplary illustration of FIG. 16H, the Finally subworkflow contains no components, so no computation will be performed if the result of the test condition is false. However, the user must still connect the input terminals 1665, 1666, 1667 to the output terminals 1675, 1676, 1677 to indicate which inputs to the Finally subworkflow are to be delivered as outputs. In the exemplary illustration in FIG. 16H, the user has chosen to connect each of the input terminals 1665, 1666, 1667 in the Finally panel 1670 to the corresponding output terminals 1675, 1676, 1677, so both values will be delivered to the output terminals of the While loop metaworkflow.

When a While loop metaworkflow executes, it operates according to the following rules. First, the test expression is evaluated to compute a single distinguishable value. Evaluation of the test expression delivers no outputs to the While loop metaworkflow output terminals. If evaluation of the test expression computes the distinguishable value, then the inputs received on the input terminals of the While loop metaworkflow are delivered to the input terminals of the Do subworkflow, and the Do subworkflow is executed. The Do subworkflow delivers one output to each of its output terminals upon completion of the execution of the Do subworkflow. After the Do subworkflow has completed execution, a new copy of the While loop metaworkflow is created and the outputs delivered to the output terminals of the Do subworkflow are delivered to the input terminals of the new copy of the While loop metaworkflow. The original copy of the While loop metaworkflow then ceases execution and the new copy of the While loop metaworkflow is executed.

If evaluation of the test expression does not compute the distinguishable value, then the inputs received on the input terminals of the While loop metaworkflow are delivered to the input terminals of the Finally subworkflow and the Finally subworkflow is executed. The Finally subworkflow delivers one output to each of its output terminals upon completion of the execution of the Finally subworkflow. When the Finally subworkflow has completed execution, the outputs delivered to the output terminals of the Finally subworkflow are delivered to the output terminals of the While loop metaworkflow, and execution of the While loop metaworkflow is complete.

It is evident that during each iteration of the execution of the While loop metaworkflow, only one of the Do subworkflow or the Finally subworkflow will execute depending on the result of the evaluation of the test expression. To optimize the execution of the While loop metaworkflow, the method provides for waiting until after the evaluation of the test expression before preparing to execute either the Do subworkflow or the Finally subworkflow. After evaluation of the test expression, the preparatory work need only be performed for the subworkflow that will actually be executed.

The present invention may be embodied in other specific forms without departing from the spirit or essential attributes of the invention. Accordingly, reference should be made to the appended claims, rather than the foregoing specification, as indicating the scope of the invention. Although the foregoing description is directed to the preferred embodiments of the invention, it is noted that other variations and modifications will be apparent to those skilled in the art, and may be made without departing from the spirit or scope of the invention.

What is claimed:

1. An apparatus, comprising:
 a processor configured to retrieve an executable component from a component library and to create a dataflow including:
 at least one splitter having one or more splitter input terminals that correspond to a splitter input of a splitter algorithm associated with the at least one splitter, each splitter input terminal receiving its splitter input at a single splitter input time, and one or more splitter output terminals that correspond to a splitter output generated by the splitter algorithm associated with the at least one splitter, the splitter output terminals producing splitter outputs at a plurality of splitter output times; and at least one joiner associated with the corresponding at least one splitter having one or more joiner input terminals that correspond a joiner input to a joiner algorithm associated with the at least one joiner, each joiner input terminal receiving joiner input at a plurality of joiner input times, and one or more joiner output terminals that correspond to a joiner output generated by the joiner algorithm associated with the at least one joiner;

where the splitter output includes a plurality of consistent splitter output sets, and where each splitter output terminal produces a splitter output;

where the splitter algorithm associated with the at least one splitter is configured to generate the consistent splitter output sets in a specific order by operating on the splitter input, and where each consistent splitter output set flows separately downstream to one or more executable components;

where the joiner input includes a plurality of consistent joiner input sets, and where each joiner input terminal receives a joiner input;

where, for each of the consistent splitter output sets generated by the splitter algorithm associated with the associated at least one splitter, exactly one consistent joiner input set arrives at the joiner input terminals of the at least one joiner; and where, the joiner algorithm associated with the at least one joiner produces a single joiner output at the joiner output terminals upon completed execution of the joiner algorithm, the joiner output terminals producing the joiner output at a single joiner output time;

where the dataflow is capable of being decomposed into its constituent components and submitted as tasks to a worker computer.

2. The apparatus of claim 1 where the processor is further configured to:

begin execution of the joiner algorithm associated with the at least one joiner means when a first consistent joiner input set arrives at the joiner input terminals, the first consistent joiner input set corresponding to a first in order consistent splitter output set generated by the splitter algorithm;

continue to execute the joiner algorithm as and when a next consistent joiner input set arrives at the joiner input terminals, the next consistent joiner input set corresponding to a next in order consistent splitter output set generated by the splitter algorithm associated with the at least one splitter; and complete execution of the joiner algorithm after all consistent joiner input sets have arrived in corresponding order at the joiner input terminals, the all consistent joiner input sets corresponding to all consistent splitter output sets generated by the splitter algorithm associated with the associated at least one splitter.

3. The apparatus of claim 1 where the processor is further configured to:

begin execution of the joiner algorithm associated with the at least one joiner when a first consistent joiner input set arrives at the joiner input terminals, the first consistent joiner input set corresponding to any consistent splitter output set generated by the splitter algorithm associated with the associated splitter component;

continue execution of the joiner algorithm as and when a second consistent joiner input set arrives at the joiner input terminal, the second consistent joiner input set corresponding to any other consistent splitter output set generated by the splitter algorithm associated with the associated at least one splitter; and execution of the joiner algorithm after all consistent joiner input sets have arrived at the joiner input terminals, the all consistent joiner input sets corresponding to all consistent splitter output sets generated by the splitter algorithm associated with the associated at least one splitter.

4. The apparatus of claim 1 where the processor is further configured to:

begin execution of the joiner algorithm associated with the at least one joiner when all consistent joiner input sets have arrived at the joiner input terminals, the all consistent joiner input sets corresponding to all consistent splitter output sets generated by the splitter algorithm associated with the associated at least one splitter; and complete execution of the joiner algorithm at any time thereafter.

5. An article of manufacture including a tangible computer storage medium having instructions stored thereon that if executed by a processing device or multiple communicating processing devices, cause the processing device or the multiple communicating processing devices to perform a method comprising:

graphically corresponding one or more splitter input terminals of a splitter component to a splitter input of a splitter algorithm associated with the splitter component of an executable component;

receiving the splitter input at a single splitter input time at each of the one or more splitter input terminals;

graphically corresponding one or more splitter output terminals to a splitter output generated by the splitter algorithm associated with the splitter component of the executable component, the splitter output terminals producing splitter outputs at a plurality of splitter output times;

generating a plurality of consistent splitter output sets in a specific order by operating on the splitter input;

separately providing each of the consistent splitter output sets to one or more other downstream executable components;

graphically corresponding one or more joiner input terminals of a joiner component to a joiner input of a jointer algorithm associated with the joiner component; receiving the joiner input at a plurality of joiner input times at each joiner input terminal;

graphically corresponding one or more joiner output terminals to a joiner output generated by the joiner algorithm associated with the joiner component;

generating a plurality of consistent joiner input sets;

providing exactly one consistent joiner input set at the joiner input terminals of the joiner component for each of the consistent splitter output sets generated by the splitter algorithm associated with the splitter component; and providing a single joiner output at the joiner output terminals upon completing execution of the joiner algorithm, the joiner output terminals producing the joiner output at a single joiner output time.

6. The article of manufacture of claim 5, wherein the method further comprises:

beginning execution of the joiner algorithm associated with the joiner component when a first consistent joiner input set arrives at the joiner input terminals, the first consistent joiner input set corresponding to a first in order consistent splitter output set generated by the splitter algorithm;

continuing to execute the joiner algorithm as and when a next consistent joiner input set arrives at the joiner input terminals, the next consistent joiner input set corresponding to a next in order consistent splitter output set generated by the splitter algorithm associated with the splitter component; and completing execution of the joiner algorithm after all consistent joiner input sets have arrived in corresponding order at the joiner input terminals, the all consistent joiner input sets corresponding to all consistent splitter output sets generated by the splitter algorithm associated with the associated splitter component.

7. The article of manufacture of claim 5, wherein the method further comprises:

beginning execution of the joiner algorithm associated with the joiner component when a first consistent joiner input set arrives at the joiner input terminals, the first consistent joiner input set corresponding to any consistent splitter output set generated by the splitter algorithm associated with the associated splitter component;

continuing execution of the joiner algorithm as and when a second consistent joiner input set arrives at the joiner input terminal the second consistent joiner input set corresponding to any other consistent splitter output set generated by the splitter algorithm associated with the associated splitter component; and completing execution of the joiner algorithm after all consistent joiner input sets have arrived at the joiner input terminals, the all consistent joiner input sets corresponding to all consistent splitter output sets generated by the splitter algorithm associated with the associated splitter component.

8. The article of manufacture of claim 5, wherein the method further comprises:

beginning execution of the joiner algorithm associated with the joiner component when all consistent joiner input sets have arrived at the joiner input terminals, the all consistent joiner input sets corresponding to all consistent splitter output sets generated by the splitter algorithm associated with the associated splitter component; and completing execution of the joiner algorithm at any time thereafter.

9. An apparatus, comprising:

means for storing one or more instructions associated with a predefined computational algorithm;

one or more input terminals selected from the group consisting of a required input terminal and an optional input terminal, where inputs received on each of the one or more input terminals include an input selected from the group consisting of valid data for a predefined computational algorithm and a special marker;

an output corresponding to each output terminal, the outputs including at least one of valid data and the special marker;

means for executing the one or more of the instructions to implement the predefined computational algorithm, the means for executing operating responsive to receiving inputs on all of the input terminals, provided that no input received on a required input terminal comprises the special marker; and where, if the required input terminal receives the special marker, the apparatus is configured to deliver the special marker to each output terminal and performs no other action.

10. The apparatus of claim 9 further comprising:

at least two output terminals corresponding to two outputs generated by the predefined computational algorithm and connected to downstream input terminals of one or more downstream executable components; and where the computational algorithm delivers outputs to the at least two output terminals and exactly one of the outputs is the special marker.

11. A computer-implemented method, comprising:

defining a metaworkflow input, a metaworkflow output, a set of metaworkflow input terminals, and a set of metaworkflow output terminals;

associating a metaworkflow executable expression and at least two executable subworkflows to the metaworkflow,
where the at least two executable subworkflows consist of a first subworkflow and a second subworkflow,
where each of the at least two executable subworkflows consist of a set of corresponding metaworkflow associated input terminals that is identical to the set of metaworkflow input terminals, and
where each of the at least two executable subworkflows consist of a set of corresponding metaworkflow associated output terminals that is identical to the set of metaworkflow output terminals;

connecting each of the metaworkflow input terminals to the corresponding metaworkflow associated input terminals of each of the at least two executable subworkflows;

connecting each of the metaworkflow output terminals to each of the metaworkflow associated output terminals of the at least two executable subworkflows;

delivering one output from each of the two executable subworkflows to each of the metaworkflow output terminals;

computing a distinguishable value by executing a predefined computational algorithm associated with the metaworkflow executable expression on the metaworkflow input;

executing the first subworkflow responsive to the computing the distinguishable value; and executing the second subworkflow responsive to not computing the distinguishable value.

12. A computer-implemented method, comprising:

defining a metaworkflow input, a metaworkflow output, a set of metaworkflow input terminals, and a set of metaworkflow output terminals;

associating a metaworkflow executable expression and at least two executable subworkflows to the metaworkflow,
where the at least two executable subworkflows consist of a first subworkflow and a second subworkflow,
where each of the at least two executable subworkflows consist of a set of corresponding metaworkflow associated input terminals that is identical to the set of metaworkflow input terminals, and
where each of the at least two executable subworkflows consist of a set of corresponding metaworkflow associated output terminals that is identical to the set of metaworkflow output terminals;

connecting each of the metaworkflow input terminals to the corresponding metaworkflow associated input terminals of each of the at least two executable subworkflows;

connecting each of the metaworkflow output terminals to each of the metaworkflow associated output terminals of the at least two executable subworkflows;

delivering one output from each of the two executable subworkflows to each of the metaworkflow output terminals;

computing a distinguishable value by executing a predefined computational algorithm associated with the metaworkflow executable expression on the metaworkflow input;

executing the first subworkflow responsive to the computing the distinguishable value; and delivering no outputs to each of the metaworkflow output terminals from the first subworkflow responsive to the computing the distinguishable value.

13. The computer-implemented method of claim 12 further comprising:

delivering one output to each of the metaworkflow associated output terminals upon completion of the first subworkflow;

creating a new copy of the metaworkflow after execution of the first subworkflow;

delivering the outputs of the metaworkflow associated output terminals of the first subworkflow to the input terminals of the new copy of the metaworkflow;

executing the new copy of the metaworkflow after delivering the outputs to the input terminals of the new copy of the metaworkflow;

executing the second subworkflow responsive to not computing the distinguishable value;

delivering one output to each of the metaworkflow output terminals from the second subworkflow responsive to not computing the distinguishable value and to the executing the second subworkflow; and terminating the second subworkflow responsive to the delivering the one output from the second subworkflow.

14. A system configured to create and execute a computer workflow including a plurality of executable components, comprising:

a display, under control of at least one processor with access to a database, to display:

at least one splitter having one or more splitter input terminals that correspond to a splitter input of a splitter algorithm associated with the at least one splitter, each splitter input terminal receiving its splitter input at a single splitter input time, and one or more splitter output terminals that correspond to a splitter output generated by the splitter algorithm associated with the at least one splitter, the splitter output terminals producing splitter outputs at a plurality of splitter output times; and at least one joiner associated with the corresponding at least one splitter having one or more joiner input terminals that correspond a joiner input to a joiner algorithm associated with the at least one joiner, each joiner input terminal receiving joiner input at a plurality of joiner input times, and one or more joiner output terminals that correspond to a joiner output generated by the joiner algorithm associated with the at least one joiner;

where the splitter output includes a plurality of consistent splitter output sets, and where each splitter output terminal produces a splitter output;

where the splitter algorithm associated with the at least one splitter is configured to generate the consistent splitter output sets in a specific order by operating on the splitter input, and where each consistent splitter output set flows separately downstream to one or more executable components;

where the joiner input includes a plurality of consistent joiner input sets, and where each joiner input terminal receives a joiner input;

where, for each of the consistent splitter output sets generated by the splitter algorithm associated with the associated at least one splitter, exactly one consistent joiner input set arrives at the joiner input terminals of the at least one joiner; and where, the joiner algorithm associated with the at least one joiner produces a single joiner output at the joiner output terminals upon completed execution of the joiner algorithm, the joiner output terminals producing the joiner output at a single joiner output time.

15. The system of claim 7 further comprising:

a first circuit configured to execute the joiner algorithm associated with the at least one joiner when a first consistent joiner input set arrives at the joiner input terminals, the first consistent joiner input set corresponding to a first in order consistent splitter output set generated by the splitter algorithm;

a second circuit configured to continue to execute the joiner algorithm as and when a next consistent joiner input set arrives at the joiner input terminals, the next consistent joiner input set corresponding to a next in order consistent splitter output set generated by the splitter algorithm associated with the at least one splitter; and a third circuit configured to complete execution of the joiner algorithm after all consistent joiner input sets have arrived in corresponding order at the joiner input terminals, the all consistent joiner input sets corresponding to all consistent splitter output sets generated by the splitter algorithm associated with the associated at least one splitter.

16. The system of claim 14 further comprising:

a first circuit configured to execute the joiner algorithm associated with the at least one joiner when a first consistent joiner input set arrives at the joiner input terminals, the first consistent joiner input set corresponding to any consistent splitter output set generated by the splitter algorithm associated with the associated splitter component;

a second circuit configured to continue executing the joiner algorithm as and when a second consistent joiner input set arrives at the joiner input terminal, the second consistent joiner input set corresponding to any other consistent splitter output set generated by the splitter algorithm associated with the associated at least one splitter; and a third circuit configured to complete execution of the joiner algorithm after all consistent joiner input sets have arrived at the joiner input terminals, the all consistent joiner input sets corresponding to all consistent splitter output sets generated by the splitter algorithm associated with the associated at least one splitter.

17. The system of claim 15 further comprising:

a first circuit configured to begin execution of the joiner algorithm associated with the at least one joiner when all consistent joiner input sets have arrived at the joiner input terminals, the all consistent joiner input sets corresponding to all consistent splitter output sets generated by the splitter algorithm associated with the associated at least one splitter; and a second circuit configured to complete execution of the joiner algorithm at any time thereafter.

* * * * *

UNITED STATES PATENT AND TRADEMARK OFFICE
CERTIFICATE OF CORRECTION

PATENT NO. : 7,634,756 B2
APPLICATION NO. : 10/994871
DATED : December 15, 2009
INVENTOR(S) : Bjornson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,634,756 B2  Page 1 of 1
APPLICATION NO. : 10/994871
DATED : December 15, 2009
INVENTOR(S) : Robert Dean Bjornson et al.

It is certified that error appears in the above-identified patent and that said Letters Patent is hereby corrected as shown below:

Title page, item [76] line 7 (Inventors): Delete "4 E." and replace with --41 E.--;

Title page, item [60] line 31 (Related U.S. Application Data): Delete "2003." and replace with --2003 and continuation-in-part of Application No. 10/610,133, filed on Jun. 30, 2003, now Patent No. 7,614,036, which is a continuation-in-part of Application No. 09/814,056, filed on Mar. 22, 2001, now Patent No. 6,691,109.--;

Column 29, line 39 (Claim 2): After "joiner" delete "means";

Column 30, line 43 (Claim 5): Delete "jointer" and replace with --joiner--;

Column 31, line 66 (Claim 9): Delete "performs" and replace with --perform--;

Column 33, line 53 (Claim 14): Delete "ofjoiner" and replace with --of joiner--;

Column 34, line 14 (Claim 15): Delete "claim 7" and replace with --claim 14--; and Column 34, line 55 (Claim 17): Delete "claim 15" and replace with --claim 14--.

Signed and Sealed this
Fourth Day of January, 2011

David J. Kappos
*Director of the United States Patent and Trademark Office*